US011445228B2

(12) United States Patent
Oh et al.

(10) Patent No.: US 11,445,228 B2
(45) Date of Patent: Sep. 13, 2022

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Sejin Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 16/922,842

(22) Filed: Jul. 7, 2020

(65) Prior Publication Data

US 2020/0413108 A1 Dec. 31, 2020

Related U.S. Application Data

(63) Continuation of application No. 15/118,759, filed as application No. PCT/KR2016/005021 on May 12, 2016, now Pat. No. 10,848,795.

(Continued)

(51) Int. Cl.
*H04N 21/235* (2011.01)
*H04N 21/236* (2011.01)
(Continued)

(52) U.S. Cl.
CPC ....... *H04N 21/235* (2013.01); *H04L 12/1863* (2013.01); *H04L 12/1886* (2013.01);
(Continued)

(58) Field of Classification Search
CPC .... H04N 21/235; H04N 21/236; H04N 21/43; H04N 21/435; H04N 21/6112;
(Continued)

(56) References Cited

U.S. PATENT DOCUMENTS 9,009,775 B2 * 4/2015 Ko ........................ H04L 5/0044 725/146
9,203,534 B2 * 12/2015 Hwang .................. H04H 60/86
(Continued)

FOREIGN PATENT DOCUMENTS

JP 2015-73197 A 4/2015
KR 10-2012-0139520 A 12/2012
(Continued)

*Primary Examiner* — Ngoc K Vu
(74) *Attorney, Agent, or Firm* — Birch, Stewart, Kolasch & Birch, LLP

(57) ABSTRACT

A method for transmitting a broadcast signal, includes processing one or more Internet Protocol (IP) packets into link layer packets, the one or more IP packets carrying components of one or more services and service signaling information for signaling the components of one or more services; and processing the link layer packets to output the broadcast signal includes PLPs, wherein a PLP of the PLPs includes a service list table, the service list table including a service identifier identifying a service, capabilities information representing required capabilities for decoding content for the service, protocol information representing a type of protocol used to deliver the service signaling information, the type of protocol representing either ROUTE or MMTP and an IP address for an IP packet carrying the service signaling information for the service.

8 Claims, 46 Drawing Sheets

Related U.S. Application Data

(60) Provisional application No. 62/181,175, filed on Jun. 17, 2015, provisional application No. 62/171,206, filed on Jun. 4, 2015, provisional application No. 62/171,208, filed on Jun. 4, 2015, provisional application No. 62/171,210, filed on Jun. 4, 2015, provisional application No. 62/160,574, filed on May 12, 2015.

(51) Int. Cl.

| | |
|---|---|
| *H04N 21/435* | (2011.01) |
| *H04N 21/61* | (2011.01) |
| *H04N 21/43* | (2011.01) |
| *H04N 21/81* | (2011.01) |
| *H04L 12/18* | (2006.01) |
| *H04L 65/612* | (2022.01) |
| *H04L 67/02* | (2022.01) |
| *H04L 45/302* | (2022.01) |
| *H04L 65/611* | (2022.01) |

(52) U.S. Cl.

CPC ........ *H04L 45/304* (2013.01); *H04L 45/3065* (2013.01); *H04L 65/4076* (2013.01); *H04L 65/4084* (2013.01); *H04L 67/02* (2013.01); *H04N 21/236* (2013.01); *H04N 21/43* (2013.01); *H04N 21/435* (2013.01); *H04N 21/6112* (2013.01); *H04N 21/6125* (2013.01); *H04N 21/8146* (2013.01)

(58) Field of Classification Search

CPC ............ H04N 21/6125; H04N 21/8146; H04L 12/1863; H04L 12/1886; H04L 45/304; H04L 45/3065; H04L 65/4076; H04L 65/4084; H04L 67/02

See application file for complete search history.

(56) References Cited

U.S. PATENT DOCUMENTS

| | | | |
|---|---|---|---|
| 2010/0242067 A1 | 9/2010 | Song et al. | |
| 2011/0149036 A1 | 6/2011 | Suh et al. | |
| 2012/0050473 A1 | 3/2012 | Suh et al. | |
| 2012/0131625 A1 | 5/2012 | Satheesh | |
| 2012/0324523 A1* | 12/2012 | Stadelmeier ........ | H04L 27/2602 725/118 |
| 2012/0331508 A1 | 12/2012 | Väre et al. | |
| 2013/0036234 A1 | 2/2013 | Pazos et al. | |
| 2013/0291027 A1 | 10/2013 | Hwang et al. | |
| 2014/0143811 A1 | 5/2014 | Lee et al. | |
| 2014/0185515 A1 | 7/2014 | Hong et al. | |
| 2014/0317674 A1 | 10/2014 | Hwang et al. | |
| 2016/0182939 A1 | 6/2016 | DelSordo et al. | |
| 2016/0234534 A1 | 8/2016 | Kitahara et al. | |
| 2016/0360283 A1 | 12/2016 | Kitahara et al. | |
| 2017/0188112 A1 | 6/2017 | Takahashi et al. | |
| 2018/0139476 A1* | 5/2018 | Deshpande .......... | H04N 21/435 |
| 2018/0359518 A1* | 12/2018 | Deshpande ........ | H04N 21/4345 |
| 2019/0141361 A1* | 5/2019 | Deshpande ........ | H04N 21/4345 |

FOREIGN PATENT DOCUMENTS

| | | |
|---|---|---|
| KR | 10-2013-0127990 A | 11/2013 |
| KR | 10-2014-0056156 A | 5/2014 |

* cited by examiner

FIG. 3

| Syntax | No. of Bits | Format |
|---|---|---|
| LLS_table( ) { | | |
| LLS_table_id | 8 | uimsbf |
| provider_id | 8 | uimsbf |
| LLS_table_version | 8 | uimsbf |
| switch (LLS_table_id) { | | |
| case 0x01: | | |
| SLT | var | Sec. 6.3 |
| break; | | |
| case 0x02: | | |
| RRT | var | See Annex F |
| break; | | |
| case 0x03: | | |
| System Time | var | Sec. 6.4 |
| break; | | |
| case 0x04: | | |
| CAP | var | Sec. 6.5 |
| break; | | |
| default: | | |
| reserved | var | |
| } | | |
| } | | | t3010

| Element or Attribute Name | Use | Data Type |
|---|---|---|
| SLT | | |
| @bsid | 1 | unsignedShort |
| @sltCapabilities | 0..1 | string |
| sltInetUrl | 0..1 | anyURL |
| @urlType | 1 | unsignedByte |
| Service | 1..N | |
| @serviceID | 1 | unsignedShort |
| @sltSvcSeqNum | 1 | unsignedByte |
| @protected | 0..1 | boolean |
| @majorChannelNo | 0..1 | 1..999 |
| @minorChannelNo | 0..1 | 1..999 |
| @serviceCategory | 1 | unsignedByte |
| @shortServiceName | 0..1 | string |
| @hidden | 0..1 | boolean |
| @broadbandAccessRequired | 0..1 | boolean |
| @svcCapabilities | 0..1 | string |
| BroadcastSvcCignaling | 0..1 | |
| @slsProtocol | 1 | unsignedByte |
| @slsMajorProtocolVersion | 1 | unsignedByte |
| @slsMinorProtocolVersion | 1 | unsignedByte |
| @slsPlpID | 0..1 | unsignedByte |
| @slsDestinationIpAddress | 1 | string |
| @slsDestinationUdpPort | 1 | unsignedShort |
| @slsSourceIpAddress | 1 | string |
| svcInetUrl | 0..N | anyURL |
| @urlType | 1 | unsignedByte | t3020

FIG. 4

| Element or Attribute Name | Use | Data Type |
|---|---|---|
| bundleDescription | | |
| userServiceDescription | | |
| @globalServiceID | 1 | anyURL |
| @serviceID | 1 | unsignedShort |
| @serviceStatus | 0..1 | boolean |
| @fullMPDUri | 1 | anyURL |
| @sTSIDUri | 1 | anyURL |
| name | 0..N | string |
| @lang | 1 | language |
| serviceLanguage | 0..N | language |
| capabilityCode | 0..1 | string |
| deliveryMethod | 1..N | |
| broadcastAppService | 1..N | |
| basePattern | 1..N | string |
| unicastAppService | 0..N | |
| basePattern | 1..N | string | t4010

| Element or Attribute Name | Use | Data Type |
|---|---|---|
| S-TSID | | |
| @serviceID | 1 | unsignedShort |
| RS | 1..N | |
| @bsid | 0..1 | unsignedShort |
| @sIpAddr | 0..1 | string |
| @dIpAddr | 0..1 | string |
| @dport | 0..1 | unsignedShort |
| @PLPID | 0..1 | unsignedByte |
| LS | 1..N | |
| @tsi | 1 | unsignedInt |
| @PLPID | 0..1 | unsignedByte |
| @bw | 0..1 | unsignedInt |
| @startTime | 0..1 | dateTime |
| @endTime | 0..1 | dateTime |
| SrcFlow | 0..1 | srcFlowType |
| RepairFlow | 0..1 | rprFlowType | t4020

FIG. 5

| Element or Attribute Name | Use |
|---|---|
| bundleDescription | |
| userServiceDescription | |
| @globalServiceID | M |
| @serviceID | M |
| Name | 0..N |
| @lang | CM |
| serviceLanguage | 0..N |
| contentAdvisoryRating | 0..1 |
| Channel | 1 |
| @serviceGenre | 0..1 |
| @serviceIcon | 1 |
| ServiceDescription | 0..N |
| @serviceDescrText | 1 |
| @serviceDescrLang | 0..1 |
| mpuComponent | 0..1 |
| @mmtPackageId | 1 |
| @nextMmtPackageId | 0..1 |
| routeComponent | 0..1 |
| @sTSIDUri | 1 |
| @sTSIDDestinationIpAddress | 0..1 |
| @sTSIDDestinationUdpPort | 1 |
| @sTSIDSourceIpAddress | 1 |
| @sTSIDMajorProtocolVersion | 0..1 |
| @sTSIDMinorProtocolVersion | 0..1 |
| broadbandComponent | 0..1 |
| @fullMPDUri | 1 |
| ComponentInfo | 1..N |
| @ComponentType | 1 |
| @ComponentRole | 1 |
| @ComponentProtectedFlag | 0..1 |
| @ComponentId | 1 |
| @ComponentName | 0..1 |

FIG. 6
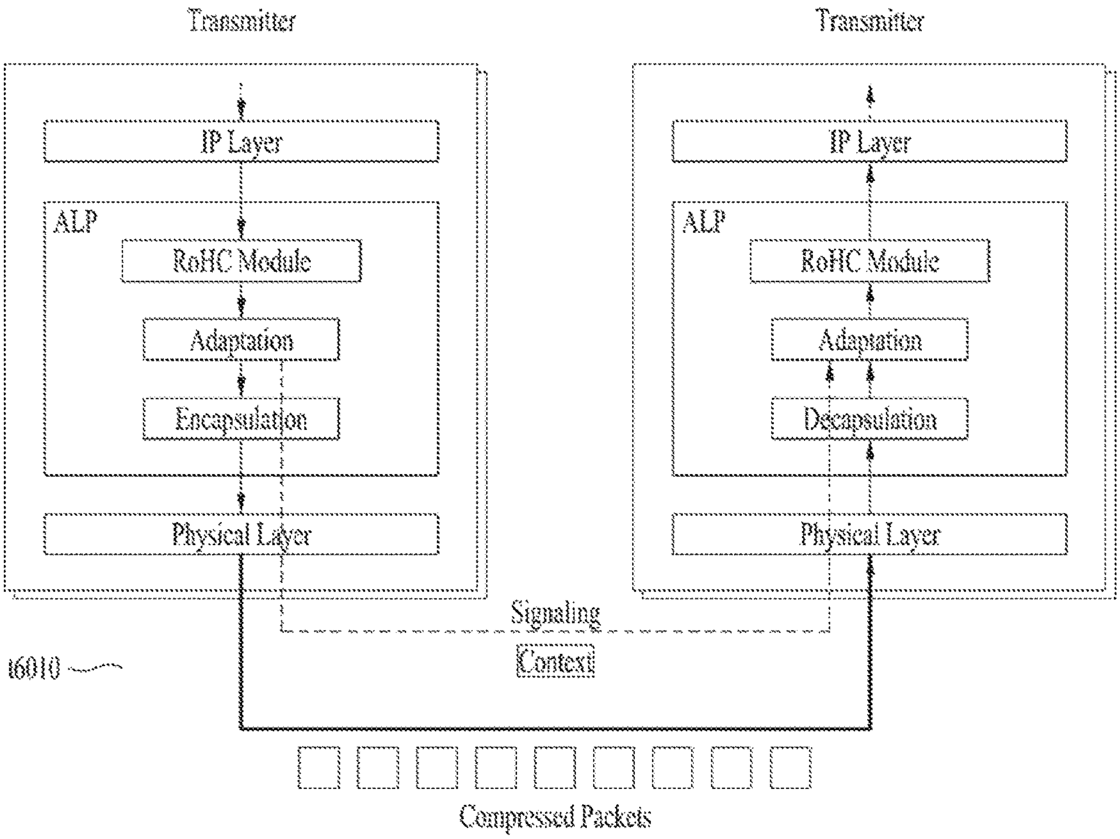
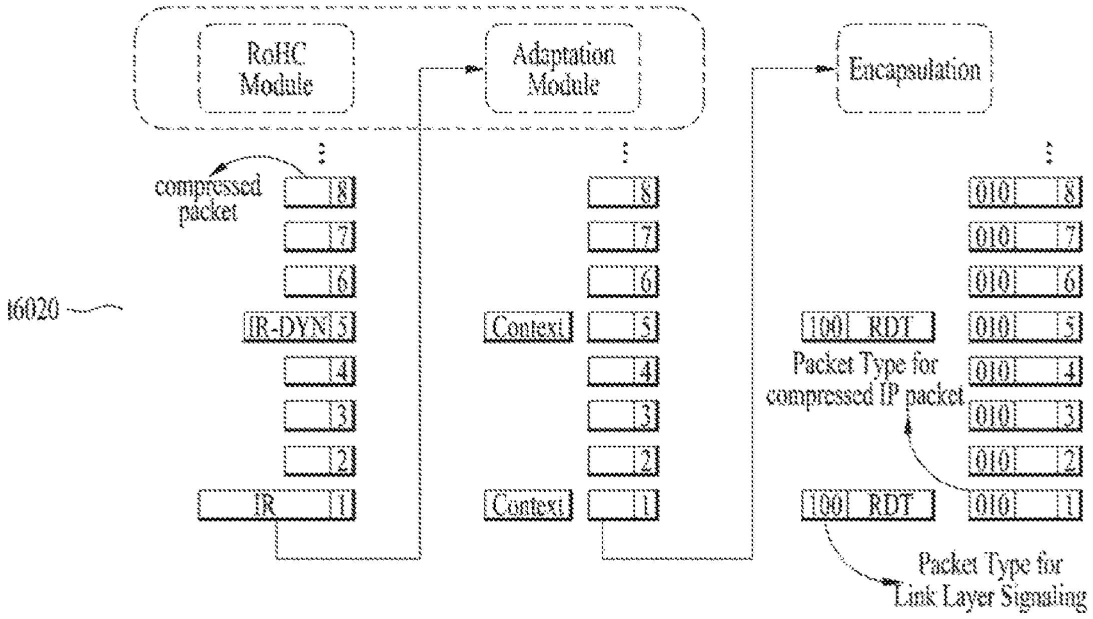

FIG. 7

| Syntax | Number of bits | Format |
|---|---|---|
| Link_Mapping_Table() { | | |
| signaling_type | 8 | 0x01 |
| PLP_ID | 6 | uimsbf |
| reserved | 2 | "11" |
| num_session | 8 | uimsbf |
| for(i = 0 ; i < num_session ; i++) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '111111' |
| if (SID_flag = = "1") { | | |
| SID | 8 | uimsbf |
| } | | |
| if (compressed_flag = = "1") { | | |
| context_id | 8 | uimsbf |
| } | | |
| } | | |
| } | | |

FIG. 11

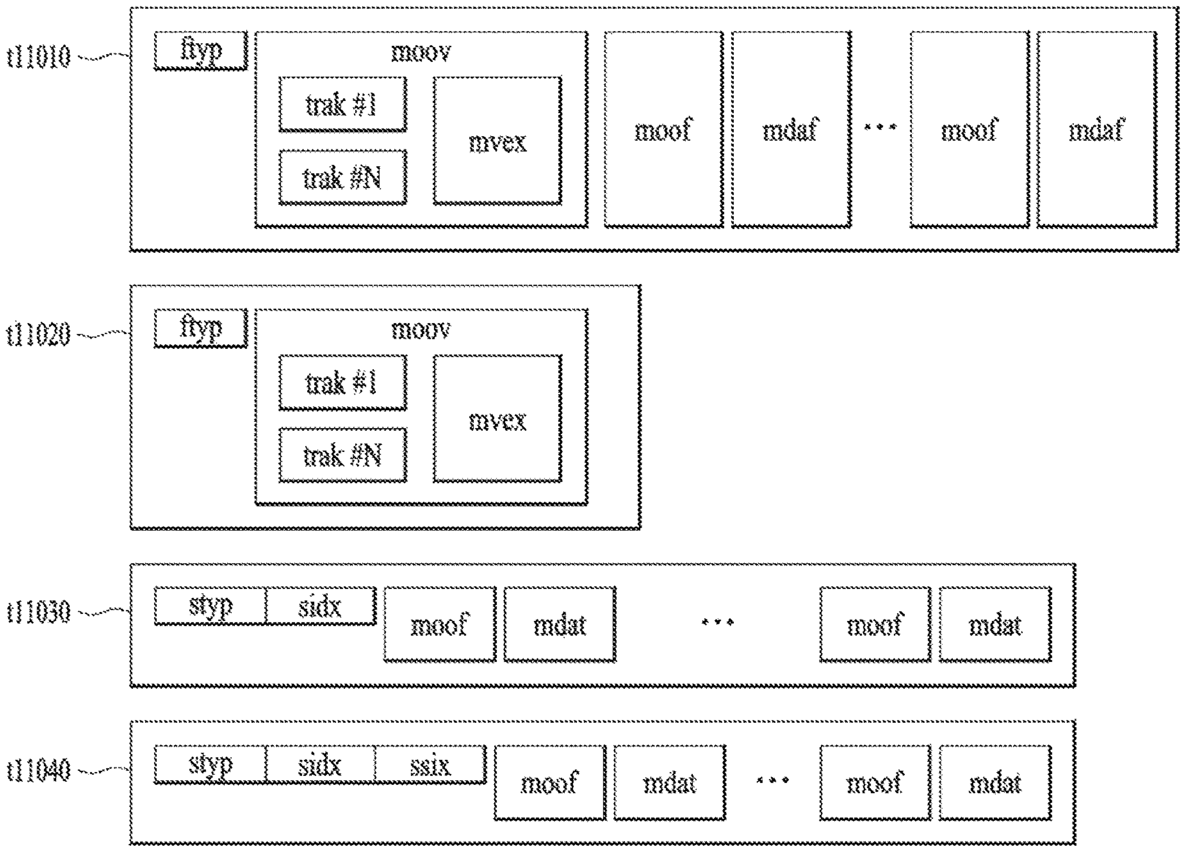

t11050

```
aligned(8) class Box (unsigned int(32) boxtype, optional
unsigned int(8)[16] extended_type)
{
    unsigned int(32) size;
    unsigned int(32) type = boxtype;
    if (size==1) {
        unsigned int(64) largesize;
    } else if (size==0) {
    // box extends to end of file
    }
    if (boxtype=='uuid') {
        unsigned int(8)[16] usertype = extended_type;
    }
}
```

```
aligned(8) class FullBox(unsigned int(32) boxtype, unsigned int(8)
v, bit(24) f) extends Box(boxtype) {
    unsigned int(8)         version = v;
    bit(24)                 flags = f;
}
```

FIG. 16 t16010

| Syntax | No. of Bits | Format |
|---|---|---|
| service_capability_descriptor() { | | |
| descriptor_tag | 8 | uimsbf |
| descriptor_length | 8 | uimsbf |
| num_capability_codes | 8 | uimsbf |
| for(int i=0; i< num_capability_codes; i++) | | |
| essential_indicator | 1 | bslbf |
| reserved | 7 | '111111' |
| capability_code | 8 | uimsbf |
| } | | |
| } | | | t16020

| Syntax | No. of Bits | Format |
|---|---|---|
| service_capability_descriptor() { | | |
| descriptor_tag | 8 | uimsbf |
| descriptor_length | 8 | uimsbf |
| num_capability_codes | 8 | uimsbf |
| for(int i=0; i< num_capability_codes; i++) | | |
| essential_indicator | 1 | bslbf |
| capability_category | 7 | uimsbf |
| capability_code | 8 | uimsbf |
| } | | |
| } | | | t16030

| Syntax | No. of Bits | Format |
|---|---|---|
| service_capability_set_descriptor() { | | |
| descriptor_tag | 8 | uimsbf |
| descriptor_length | 8 | uimsbf |
| num_capability_sets | 8 | uimsbf |
| for(int i=0; i< num_capability_sets; i++){ | | |
| reserved | 1 | uimsbf |
| capability_category | 7 | uimsbf |
| num_capability_in_set | 8 | uimsbf |
| for(int i=0; i< num_capability_in_set; i++){ | | |
| essential_indicator | 1 | bslbf |
| capability_code | 7 | uimsbf |
| } | | |
| } | | |
| } | | | t16040

| Syntax | No. of Bits | Format |
|---|---|---|
| service_capability_set_descriptor() { | | |
| descriptor_tag | 8 | uimsbf |
| descriptor_length | 8 | uimsbf |
| num_capability_sets | 8 | uimsbf |
| for(int i=0; i< num_capability_sets; i++){ | | |
| target_device | 4 | uimsbf |
| capability_category | 4 | uimsbf |
| num_capability_in_set | 8 | uimsbf |
| for(int i=0; i< num_capability_in_set; i++){ | | |
| essential_indicator | 1 | bslbf |
| capability_code | 7 | uimsbf |
| } | | |
| } | | |
| } | | |

FIG. 17

| capability_code | Meaning |
|---|---|
| 0x00 | forbidden |
| Transport protocols | |
| 0x01 | ROUTE |
| 0x02 | MMT |
| 0x03 | FLUTE |
| 0x04-0x0F | Reserved for future use |
| Video codec | |
| 0x10 | AVC |
| 0x11 | SVC |
| 0x12 | MVC |
| 0x13 | HEVC |
| 0x14 | SHVC |
| 0x15-0x1F | Reserved for future use |
| Video Resolution | |
| 0x20 | Standard definition video |
| 0x21 | High definition video |
| 0x22 | Ultra high definition video |
| 0x23-0x2F | Reserved for future use |
| Video Provision Method | |
| 0x30 | 3D video |
| 0x31 | Multi-view video |
| 0x32 | Panorama view video |
| 0x33-0x3F | Reserved for future use |
| Audio Codec | |
| 0x40 | MPEG-H audio |
| 0x41 | AC-4 audio |
| 0x42 | DTS-HD |
| 0x43-0x4F | Reserved for future use |
| Audio Channels | |
| 0x50 | Stereo |
| 0x51 | 5.1 channel |
| 0x52 | 7.1 channel |
| 0x53-0x3F | Reserved for future use |
| Closed Caption type | |
| 0x60 | SMPTE timed text |
| 0x61 | CEA-708 captions |
| 0x62-0x6F | Reserved for future use |
| FEC Algorithm | |
| 0x70 | Compact No-Code FEC scheme. |
| 0x71 | Raptor algorithm |
| 0x72-0x5F | Reserved for future use |
| Target device | |
| 0x80 | Primary device |
| 0x81 | Companion device |
| 0x82 | Inset on Primary Screen ("Picture-in-Picture") |
| 0x83-0x8F | Reserved for future use |
| Application type | |
| 0x90 | App-based enhancement |
| 0x91 | App-based service |
| 0x92-0xFF | Reserved for future use |

FIG. 18

| Element or Attribute Name | Use | Description |
|---|---|---|
| bundleDescription | | Root element of the User Service Bundle Description. |
| userServiceDescription | | A single instance of a Service. |
| @serviceId | M | Globally unique identifier of the Service. |
| @atsc:serviceId | M | Reference to corresponding service entry in LLS(FIT). The value of this attribute is the same value of serviceId assigned to the entry. |
| @atsc:fullMPDUri | M | Reference to an MPD fragment which contains descriptions for contents components of the Service delivered over broadcast and optionally, also over broadband. |
| @atsc:sTSIDUri | M | Reference to the S-TSID fragment which provides access related parameters to the Transport sessions carrying contents of this Service. |
| name | 0...N | Name of the service as given by the lang attribute |
| lang | CM | Language of the service name. The language shall be specified according to XML datatypes (XML Schema Part 2 [7]). |
| serviceLanguage | 0...N | Available languages of the service. The language shall be specified according to XML datatypes (XML Schema Part 2 [7]). |
| deliveryMethod | 1...N | Container of transport related information pertaining to the contents of the service over broadcast and (optionally) broadband modes of access. |
| atsc:broadcastAppService | 1...N | A DASH Representation delivered over broadcast, in multiplexed or non-multiplexed form, containing the corresponding media component(s) belonging to the Service, across all Periods of the affiliated Media Presentation. |
| basePattern | 1...N | A character pattern for use by the the receiver to match against any portion of the Segment URL used by the DASH client to request Media Segments of a parent Representation under its containing Period . A match implies that the corresponding requested Media Segment is carried over broadcast transport. |
| atsc:unicastAppService | 0...N | A DASH Representation delivered over broadband, in multiplexed or non-multiplexed form, containing the constituent media content component(s) belonging to the Service, across all Periods of the affiliated Media Presentation. |
| basePattern | 1...N | A character pattern for use by the the receiver to match against any portion of the Segment URL used by the DASH client to request Media Segments of a parent Representation under its containing Period . A match implies that the corresponding requested Media Segment is carried over broadband transport. |
| ServiceLevelDescriptor | 0...N | service-level description |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. | t18010

| Syntax | No. of Bits | Format |
|---|---|---|
| service_level_descriptor() { | | |
| descriptor_tag | 8 | uimsbf |
| descriptor_length | 8 | uimsbf |
| service_level_description() | var | |
| } | | | t18020

FIG. 19 t19010

| @value | Use |
|---|---|
| start_time | M |
| duration | M |
| lang | O |
| title | O | t19020

| Element or Attribute Name | | Use |
|---|---|---|
| Program | | 0..N |
| | @start_time | M |
| | @duration | M |
| | @lang | O |
| | @moreURL | O |
| | title | 0,1 | t19030

| Syntax | No. of Bits | Format |
|---|---|---|
| current_program_descriptor() { | | |
| descriptor_tag | 8 | uimsbf |
| descriptor_length | 8 | uimsbf |
| program_start_time | 32 | uimsbf |
| program_duration | 24 | uimsbf |
| program_lang | 8*3 | bslbf |
| URL_length | 8 | uimsbf |
| URL_text() | var | |
| title_length | 8 | uimsbf |
| title_text() | var | |
| } | | |

FIG. 20 t20010

| @value | Use |
|---|---|
| caption_codec | M |
| lang | M |
| caption_service_number | O |
| easy_reader_flag | O |
| aspect_ratio | O | t20020

| Element or Attribute Name | Use |
|---|---|
| Caption | 0..N |
| @caption_codec | M |
| @lang | M |
| @caption_service_number | O |
| @easy_reader_flag | O |
| @aspect_ratio | O |
| @moreURL | O | t20030

| Syntax | No. of Bits | Format |
|---|---|---|
| caption_service_descriptor() { | | |
| descriptor_tag | 8 | uimsbf |
| descriptor_length | 8 | uimsbf |
| caption_lang | 8*3 | uimsbf |
| caption_codec | 4 | uimsbf |
| easy_reader | 1 | bslbf |
| wide_aspect_ratio | 2 | bslbf |
| url_flag | 1 | bslbf |
| If(caption_codec == 0x02 ){ | | |
| caption_service_number/*m*/ | 3 | uimsbf |
| } | | |
| if(url_flag ){ | | |
| URL_length | 8 | uimsbf |
| URL_text() | var | |
| } | | |
| } | | |

FIG. 21 t21010

| @value | Use |
|---|---|
| minDisplay | M |
| maxDisplay | M |
| disparityTypeTransition | OD<br>default: false |
| 2D3DTransition | OD<br>default: false |
| 3D2DTransition | OD<br>default: false | t21020

| Element or Attribute Name | Use |
|---|---|
| 3DVideoDepth | 0..N |
| @minDisplay | M |
| @maxDisplay | O |
| @disparityTypeTransition | OD<br>default: false |
| @2D3DTransition | OD<br>default: false |
| @3D2DTransition | OD<br>default: false | t21030

| Syntax | No. of Bits | Format |
|---|---|---|
| 3d_video_descriptor() { | | |
| descriptor_tag | 8 | uimsbf |
| descriptor_length | 8 | uimsbf |
| reserved | 3 | '111' |
| included_region_disparity_info | 1 | bslbf |
| maxDisparity_flag | 1 | bslbf |
| disparity_type_transition_flag | 1 | bslbf |
| 2d_3d_transition_flag | 1 | bslbf |
| 3d_2d_transition_flag | 1 | bslbf |
| minDisparity | 16 | uimsbf |
| if(maxDisparity_flag){ | | |
| maxDisparity | 16 | uimsbf |
| } | | |
| } | | |

| | |
|---|---|
| ComponentInfo | 1...N |
| @componentType | 1 |
| @componentRole | 0..1 |
| @componentProtectedFlag | 0..1 |
| @componentId | 1 |
| @componentName | 0..1 |
| @componentGroupId | 0..1 |
| @essentialIndicator | 0..1 |
| @dependentComponentID | 0..N |
| @protocolType | 0..1 |
| @rt | 0..1 |
| @targetDevice | 0..1 |
| @componentCodec | 0..1 |
| @componentProfile | 0..1 |
| @componentLang | 0..1 |
| @width | 0..1 |
| @height | 0..1 |
| Accessibility | 0..N |
| Capability | 0..N |
| Rating | 0..N |
| Targeting | 0..N |
| ComponentDescription | 0..N |
| ComponentProperty | 0..N |

FIG. 23

| Syntax | No. of Bits | Format |
|---|---|---|
| MP_table() { | | |
| table_id | 8 | uimsbf |
| version | 8 | uimsbf |
| length | 16 | uimsbf |
| reserved | 6 | bslbf |
| MP_table_mode | 2 | bslbf |
| If (table_id == SUBSET_0_MPT_TABLE_ID) { | | |
| MMT_package_id { | | |
| MMT_package_id_length | 8 | uimsbf |
| for (i=0; i<N1; i++) { | | |
| MMT_package_id_byte | 8 | uimsbf |
| } | | |
| ... | | |
| } | | |
| number_of_assets /*N3*/ | 8 | uimsbf |
| for (i=0; i<N3; i++) { | | |
| Identifier_mapping() | | |
| asset_type | 32 | char |
| packet_id | 16 | uimsbf |
| reserved | 3 | '111' |
| asset_role_flag | 1 | bslbf |
| asset_target_flag | 1 | bslbf |
| asset_group_flag | 1 | bslbf |
| rt_flag | 1 | bslbf |
| default_asset_flag | 1 | bslbf |
| asset_clock_relation_flag | 1 | bslbf |
| if (asset_clock_relation_flag == 1) { | | |
| asset_clock_relation_id | 8 | uimsbf |
| reserved | 7 | bslbf |
| asset_timescale_flag | 1 | bslbf |
| if (asset_time_scale_flag == 1) { | | |
| asset_timescale | 32 | uimsbf |
| } | | |
| } | | |
| if (asset_role_flag== 1) { | | |
| asset_role | 8 | uimsbf |
| } | | |
| if (asset_target_flag== 1) { | | |
| asset_target | 8 | uimsbf |
| } | | |
| if (asset_group_flag== 1) { | | |
| asset_group_id | 8 | uimsbf |
| } | | |
| asset_location { | | |
| location_count | 16 | uimsbf |
| for (i=0; i<N6; i++) { | | |
| MMT_general_location_info() | 8 | uimsbf |
| } | | |
| } | | |
| asset_descriptors { | | |
| asset_descriptors_length | | |
| for (j=0; j<N5; j++) { | | |
| asset_descriptors_byte | | |
| } | | |
| } | | |
| } | | |
| } | | |

FIG. 24

| Syntax | No. of Bits | Format |
|---|---|---|
| asset_group_descriptor () { | | |
| descriptor_tag | 8 | uimsbf |
| descriptor_length | 8 | uimsbf |
| asset_group_id | 8 | uimsbf |
| num_of_asset | 8 | uimsbf |
| for(int i=0;i<num_of_asset;i++) | | |
| { | | |
| asset_id() | | uimsbf |
| } | | |
| } | | |

FIG. 25 t25010

| Accessibility | 0...N |
|---|---|
| @schemeIdUri | M |
| @value | O |
| @id | O | t25020

| Accessbility@value |
|---|
| Visually impaired |
| Hearing impaired |
| enhanced-audio-intelligibility |
| 3D supported |
| Normal |
| Easy reader | t25030

| Syntax | No. of Bits | Format |
|---|---|---|
| accessibility_descriptor () { | | |
| descriptor_tag | 8 | uimsbf |
| descriptor_length | 8 | uimsbf |
| num_of_accessiblity | 8 | uimsbf |
| for(int i=0;i<num_of_accessibility;i++) | | |
| { | | |
| accessiblity_code | 8 | uimsbf |
| } | | |
| } | | |

FIG. 27 t27010

| ComponentProperty | |
|---|---|
| @schemeIdUri | M |
| @value | O |
| @id | O | t27020

| ComponentProperty@value | Use |
|---|---|
| View_x | M |
| View_y | M |
| View_width | M |
| View_height | M |
| View_total_width | O |
| View_total_height | O |
| View_display_priority | O |
| Source_id | O | t27030

| Syntax | No. of Bits | Format |
|---|---|---|
| view_descriptor () { | | |
| descriptor_tag | 8 | uimsbf |
| descriptor_length | 8 | uimsbf |
| reserved | 5 | '11111' |
| source_id_flag | 1 | bslbf |
| view_total_info_flag | 1 | bslbf |
| view_prority_flag | 1 | bslbf |
| view_x | 16 | uimsbf |
| view_y | 16 | uimsbf |
| view_width | 16 | uimsbf |
| view_height | 16 | uimsbf |
| if(source_id_flag == '1'){ | | |
| source_id | 8 | uimsbf |
| } | | |
| if(view_total_info_flag == '1'){ | | |
| total_width | 16 | uimsbf |
| total_height | 16 | uimsbf |
| } | | |
| if(view_priority_flag == '1'){ | 8 | uimsbf |
| view_priority | | |
| } | | |
| } | | |

FIG. 29 t29010

| ComponentDescription | |
|---|---|
| @schemeIdUri | M |
| @value | O |
| @id | O | t29020

| ComponentDescription @value | Use |
|---|---|
| profile_space | M |
| tier_flag | M |
| profile_idc | M |
| profile_compatibility_indication | M |
| progressive_source_flag | O |
| interlaced_source_flag | O |
| non_packed_constraint_flag | OD default:false |
| frame_only_constraint_flag | O |
| reserved_zero_44bits | M |
| level_idc | M |
| HEVC_still_present_flag | O |
| HEVC_24hr_picture_present_flag | O |
| temporal_id_min | O |
| temporal_id_max | O | t29030

| Syntax | No. of Bits | Format |
|---|---|---|
| HEVC_descriptor() { | | |
| descriptor_tag | 8 | uimsbf |
| descriptor_length | 8 | uimsbf |
| profile_space | 2 | uimsbf |
| tier_flag | 1 | bslbf |
| profile_idc | 5 | uimsbf |
| profile_compatibility_indication | 32 | bslbf |
| progressive_source_flag | 1 | bslbf |
| interlaced_source_flag | 1 | bslbf |
| non_packed_constraint_flag | 1 | bslbf |
| frame_only_constraint_flag | 1 | bslbf |
| reserved_zero_44bits | 44 | bslbf |
| level_idc | 8 | uimsbf |
| temporal_layer_subset_flag | 1 | bslbf |
| HEVC_still_present_flag | 1 | bslbf |
| HEVC_24hr_picture_present_flag | 1 | bslbf |
| reserved | 5 | bslbf |
| if ( temporal_layer_subset_flag == '1') { | | |
| reserved | 5 | bslbf |
| temporal_id_min | 3 | uimsbf |
| reserved | 5 | bslbf |
| temporal_id_max | 3 | uimsbf |
| } | | |
| } | | |

FIG. 30 t30010

| @value | Use |
|---|---|
| hrd_management_valid_flag | M |
| picture_and_timing_info_present_flag | M |
| 90kHz_flag | O |
| N | O |
| K | O |
| num_units_in_tick | O | t30020

```
Syntax                                              No. of Bits   Format
HEVC_timing_and_HRD_descriptor() {
    hrd_management_valid_flag                           1          bslbf
    reserved                                            6          bslbf
    picture_and_timing_info_present_flag                1          bslbf
    if (picture_and_timing_info_present_flag == '1') {
      90kHz_flag                                        1          bslbf
      reserved                                          7          bslbf
      if (90kHz_flag = = '0') {
        N                                               32         uimsbf
        K                                               32         uimsbf
      }
      num_units_in_tick                                 32         uimsbf
    }
}
```

FIG. 31 t31010

| ComponentDescription@value | Use |
|---|---|
| caption_codec | M |
| lang | O |
| caption_service_number | O |
| easy_reader_flag | O |
| aspect_ratio | O |
| 3D supported | OD default:false | t31020

| Syntax | No. of Bits | Format |
|---|---|---|
| closed_caption_descriptor() { | | |
| descriptor_tag | 8 | uimsbf |
| descriptor_length | 8 | uimsbf |
| caption_lang | 8*3 | uimsbf |
| caption_codec | 4 | uimsbf |
| easy_reader | 1 | bslbf |
| wide_aspect_ratio | 2 | uimsbf |
| url_flag | 1 | uimsbf |
| reserved | 7 | '1111111' |
| 3d_supported | 1 | bslbf |
| If(caption_codec == 0x02 ){ | | |
| caption_service_number/*m*/ | 3 | uimsbf |
| } | | |
| if(url_flag ){ | | |
| URL_length | 1 | uimsbf |
| URL_text() | var | |
| } | | |
| } | | |

FIG. 32 t32010

| @value | Use |
|---|---|
| OETF_type | M |
| max_mastering_display_luminance | M |
| min_mastering_display_luminance | M |
| average_frame_luminance_level | M |
| max_frame_pixel_luminance | M |
| hdr_type_transition_flag | OD default:false |
| hdr_sdr_transition_flag | OD default:false |
| sdr_hdr_transition_flag | OD default:false |
| sdr_compatibility_flag | O | t32020

| Syntax | No. of Bits | Format |
|---|---|---|
| HDR_descriptor () { | | |
| descriptor_tag | 8 | uimsbf |
| descriptor_length | 8 | uimsbf |
| OETF_type | 8 | uimsbf |
| max_mastering_display_luminance | 32 | uimsbf |
| min_mastering_display_luminance | 32 | bslbf |
| average_frame_luminance_level | 32 | uimsbf |
| max_frame_pixel_luminance | 32 | uimsbf |
| reserved | 4 | '1111' |
| hdr_type_transition_flag | 1 | bslbf |
| hdr_sdr_transition_flag | 1 | bslbf |
| sdr_hdr_transition_flag | 1 | bslbf |
| sdr_compatibility_flag | 1 | bslbf |
| } | | |

FIG. 33 t33010

| @value | Use |
|---|---|
| contentColorGamutType | M |
| contentColorPrimaryRx | O |
| contentColorPrimaryRy | O |
| contentColorPrimaryGx | O |
| contentColorPrimaryGy | O |
| contentColorPrimaryBx | O |
| contentColorPrimaryBy | O |
| contentWhitePx | O |
| contentWhitePy | O |
| contentWCGTransition | OD default:false |
| contentSCGCompatibility | OD default:false | t33020

| @value | Use |
|---|---|
| containerColorGamutType | M |
| containerColorPrimaryRx | O |
| containerColorPrimaryRy | O |
| containerColorPrimaryGx | O |
| containerColorPrimaryGy | O |
| containerColorPrimaryBx | O |
| containerColorPrimaryBy | O |
| containerWhitePx | O |
| containerWhitePy | O |
| containerWCGTransition | OD default:false |
| containerSCGCompatibility | OD default:false |

| Syntax | No. of Bits | Format |
|---|---|---|
| WCG_descriptor () { | | |
| descriptor_tag | 8 | uimsbf |
| descriptor_length | 8 | uimsbf |
| color_gamut_type | 8 | uimsbf |
| reserved | 2 | '11' |
| color_space_transition_flag | 1 | bslbf |
| wcg_scg_transition_flag | 1 | bslbf |
| scg_wcg_transition_flag | 1 | bslbf |
| scg_compatibility_flag | 1 | bslbf |
| color_primary_flag | 1 | bslbf |
| content_wcg_flag | 1 | bslbf |
| if(color_primary_flag ==1){ | | |
| color_primaryRx | 32 | uimsbf |
| color_primaryRy | 32 | uimsbf |
| color_primaryGx | 32 | uimsbf |
| color_primaryGy | 32 | uimsbf |
| color_primaryBx | 32 | uimsbf |
| color_primaryBy | 32 | uimsbf |
| color_primaryWhitePx | 32 | uimsbf |
| color_primaryWhitePy | 32 | uimsbf |
| } | | |
| if(content_wcg_flag ==1){ | | |
| content_color_gamut_type | 8 | uimsbf |
| reserved | 2 | '11' |
| content_color_space_transition_flag | 1 | bslbf |
| content_wcg_scg_transition_flag | 1 | bslbf |
| content_scg_wcg_transition_flag | 1 | bslbf |
| content_scg_compatibility_flag | 1 | bslbf |
| content_color_primary_flag | 1 | bslbf |
| content_content_wcg_flag | 1 | bslbf |
| if(content_color_primary_flag ==1){ | | |
| content_color_primaryRx | 32 | uimsbf |
| content_color_primaryRy | 32 | uimsbf |
| content_color_primaryGx | 32 | uimsbf |
| content_color_primaryGy | 32 | uimsbf |
| content_color_primaryBx | 32 | uimsbf |
| content_color_primaryBy | 32 | uimsbf |
| content_color_primaryWhitePx | 32 | uimsbf |
| content_color_primaryWhitePy | 32 | uimsbf |
| } | | |
| } | | | t33030

FIG. 34 t34010

| @value | Use |
|---|---|
| SFRCompatibility | OD default:false |
| SFR_HFR_Transition | OD default:false |
| HFR_SFR_Transition | OD default:false | t34020

| @value | Use |
|---|---|
| PullDownType | M |
| PullDownTransition | OD default:false |
| OriginalFrameRate | O |
| OriginalScanType | O | t34030

| Syntax | No. of Bits | Format |
|---|---|---|
| HFR_descriptor () { | | |
| descriptor_tag | 8 | uimsbf |
| descriptor_length | 8 | uimsbf |
| reserved | 4 | '1111' |
| sfr_compatibility_flag | 1 | bslbf |
| sfr_hfr_transition_flag | 1 | bslbf |
| hfr_sfr_transition_flag | 1 | bslbf |
| pull_down_recovery_flag | 1 | bslbf |
| if(pull_down_recovery_flag ==1){ | | |
| pull_down_type | 8 | uimsbf |
| reserved | 5 | '1111' |
| pull_down_transition_flag | 1 | bslbf |
| original_framerate_flag | 1 | bslbf |
| original_scane_type_flag | 1 | bslbf |
| if(original_framerate_flag == 1){ | | |
| original_framerate | 8 | uimsbf |
| } | | |
| if(original_scan_type_flag == 1){ | | |
| original_scan_type | 8 | uimsbf |
| } | | |
| } | | |
| } | | |

FIG. 39 t39010

| @value | Use |
|---|---|
| codec | M |
| profile | O |
| dialog_enhancement_enabled | O |
| channel_mode | O |
| object_enabled | O |
| HOA_enabled | O |
| SAOC_enabled | O |
| referenceLayout | O |
| targetLayout | O |
| Decoder_configuration | O | t39020

| Syntax | No. of Bits | Format |
|---|---|---|
| 3d_audio_descriptor() { | | |
| descriptor_tag | 8 | uimsbf |
| descriptor_length | 8 | uimsbf |
| descriptor_tag_extension | 8 | uimsbf |
| codec | 8 | uimsbf |
| ProfileLevelIndication | 8 | uimsbf |
| config_flag | 1 | bslbf |
| referenceLayout_flag | 1 | bslbf |
| targetLayout_flag | 1 | bslbf |
| reserved_future_use | 6 | '111111' |
| if (config_flag== 1) { | | |
| dialog_enhancement_enabled | 1 | uimsbf |
| channel_mode | 2 | uimsbf |
| reserved_future_use | 2 | '111' |
| object_enabled | 1 | uimsbf |
| HOA_enabled | 1 | uimsbf |
| SAOC_enabled | 1 | uimsbf |
| } | | |
| if (targetLayout_flag== 1) { | | |
| referenceLayout | 8 | uimsbf |
| } | | |
| if (targetLayout_flag== 1) { | | |
| targetLayout | 8 | uimsbf |
| } | | |
| ConfigLength /*N*/ | 16 | uimsbf |
| if (codec== 1) { /*AC-4 */ | | |
| ac4_dsi_byte | 8*N | uimsbf |
| }else if (codec == 2)] { /*MPEG-H */ | | |
| mpegh3daConfig_bytes() | 8*N | uimsbf |
| } | | |
| for (i=0;i<N;i++) { | | |
| additional_info_byte | 8 | bslbf |
| } | | |
| } | | |

FIG. 40 t40010

| @value | Use |
|---|---|
| ac4_dialog_enhancement_enabled | O |
| ac4_channel_mode | O |
| ac4_object_enabled | O |
| ac4_HOA_enabled | O |
| referenceLayout | O |
| targetLayout | O |
| ac4_dsi_byte | O | t40020

| Syntax | No. of Bits | Format |
|---|---|---|
| ac-4_descriptor() { | | |
| descriptor_tag | 8 | uimsbf |
| descriptor_length | 8 | uimsbf |
| descriptor_tag_extension | 8 | uimsbf |
| ac4_config_flag | 1 | uimsbf |
| ac4_toc_flag | 1 | uimsbf |
| referenceLayout_flag | 1 | bslbf |
| targetLayout_flag | 1 | bslbf |
| reserved_future_use (see note) | 4 | bslbf |
| if (ac4_config_flag == 1) { | | |
| ac4_dialog_enhancement_enabled | 1 | uimsbf |
| ac4_channel_mode | 2 | uimsbf |
| reserved_future_use (see note) | 3 | bslbf |
| ac4_object_enabled | 1 | uimsbf |
| ac4_HOA_enabled | 1 | uimsbf |
| } | | |
| if (ac4_toc_flag == 1) { | | |
| ac4_toc_len | 8 | uimsbf |
| for (i=0;i<N;i++) { | | |
| ac4_dsi_byte | 8 | bslbf |
| } | | |
| } | | |
| if (referenceLayout_flag== 1) { | | |
| referenceLayout | 8 | uimsbf |
| } | | |
| if (targetLayout_flag== 1) { | | |
| targetLayout | 8 | uimsbf |
| } | | |
| for (i=0;i<N;i++) { | | |
| additional_info_byte | 8 | bslbf |
| } | | |
| } | | |

FIG. 41 t41010

| @value | Use |
|---|---|
| profile | M |
| dialog_enhancement_enabled | O |
| channel_mode | O |
| object_enabled | O |
| HOA_enabled | O |
| SAOC_enabled | O |
| referenceLayout | O |
| targetLayout | O |
| Decoder_configuration | O | t41020

| Syntax | No. of Bits | Format |
|---|---|---|
| mpeg_h_descriptor() { | | |
| descriptor_tag | 8 | uimsbf |
| descriptor_length | 8 | uimsbf |
| descriptor_tag_extension | 8 | uimsbf |
| mpegh3daProfileLevelIndication | 8 | uimsbf |
| mpegh_config_flag | 1 | bslbf |
| referenceLayout_flag | 1 | bslbf |
| targetLayout_flag | 1 | bslbf |
| reserved_future_use | 6 | '111111' |
| if (mpegh_config_flag== 1) { | | |
| dialog_enhancement_enabled | 1 | uimsbf |
| channel_mode | 2 | uimsbf |
| reserved_future_use | 2 | '111' |
| object_enabled | 1 | uimsbf |
| HOA_enabled | 1 | uimsbf |
| SAOC_enabled | 1 | uimsbf |
| } | | |
| if (referenceLayout_flag== 1) { | | |
| referenceLayout | 8 | uimsbf |
| } | | |
| if (targetLayout_flag== 1) { | | |
| targetLayout | 8 | uimsbf |
| } | | |
| mpegh3daConfigLength /*N*/ | 16 | uimsbf |
| mpegh3daConfig_bytes() | 8*N | uimsbf |
| for (i=0;i<N;i++) { | | |
| additional_info_byte | 8 | bslbf |
| } | | |
| } | | | t42010

| @value | Use |
|---|---|
| source_id | M |
| object_x | M |
| object_y | M |
| object_width | M |
| object_height | M |
| total_width | O |
| total_height | O |
| spatial_set_id | O |
| object_display_priority | O | t43010

| @value | Use |
|---|---|
| source_id | M |
| object_x | M |
| object_y | M |
| object_width | M |
| object_height | M |
| total_width | O |
| total_height | O |
| spatial_set_id | O |
| dependent_source_id | O |
| object_display_priority | O |

FIG. 44

```
<?xml version="1.0" encoding="UTF-8"?>
<MPD
  xmlns="urn:mpeg:dash:schema:mpd:2011"
  type="dynamic"
  mediaPresentationDuration="PT10S"
  minBufferTime="PT1S"
  profiles="urn:mpeg:dash:profile:isoff-on-live:2011">

<ProgramInformation>
    <Title>Example of a DASH Media Presentation Description using Spatial Relationship Description to
indicate a main video and a video containing sign language</Title>
  </ProgramInformation>
    <Period>
    <!-- Main Video -->
    <AdaptationSet segmentAlignment="true" subsegmentAlignment="true" subsegmentStartsWithSAP="1">
      <Role schemeIdUri="urn:mpeg:dash:role:2011" value="main"/>
      <SupplementalProperty schemeIdUri="urn:mpeg:dash:srd:201x" value="0, 0, 0, 1920, 1080, 1920, 1080, "/>
      <Representation mimeType="video/mp4" codecs="avc1.42c033" width="1920" height="1080"
bandwidth="1055223" startWithSAP="1">
        <BaseURL>main_video.mp4</BaseURL>
        <SegmentBase indexRangeExact="true" indexRange="839-990"/>
      </Representation>
    </AdaptationSet>
    <!-- Video containing sign language-->
    <AdaptationSet segmentAlignment="true" subsegmentAlignment="true" subsegmentStartsWithSAP="1">
      <Role schemeIdUri="urn:mpeg:dash:role:2011" value="sign"/>
      <Role schemeIdUri="urn:mpeg:dash:role:2011" value="supplementary"/>
      <SupplementalProperty schemeIdUri="urn:mpeg:dash:srd:201x" value="1, 1280, 600, 640, 480,,,0"/>
      <Representation mimeType="video/mp4" codecs="avc1.42c028" width="640" height="480"
bandwidth="769458" startWithSAP="1">
        <BaseURL> sign_video.mp4</BaseURL>
        <SegmentBase indexRangeExact="true" indexRange="8xx-xxxx"/>
      </Representation>
    </AdaptationSet>
  </Period>
</MPD>
```

FIG. 45 t45010

| Role@value |
|---|
| caption |
| subtitle |
| main |
| alternate |
| supplementary |
| commentary |
| dub |
| description |
| sign |
| metadata |
| enhanced-audio-intelligibility |
| multiple | t45020

| Element or Attribute Name | Use |
|---|---|
| @componentRole | |
| @profiles | O |
| ... | |
| Role | 0 ... N |
| ... | |
| EssentialProperty | 0 ... N |
| SupplementalProperty | 0 ... N |

FIG. 46

```
...
<Period>
  <AdaptationSet segmentAlignment="true" subsegmentAlignment="true" subsegmentStartsWithSAP="1">
    <Role schemeIdUri="urn:mpeg:dash:role:2014" value="multiple"/>
    <Representation mimeType="video/mp4" codecs="avc1.42c01e" width="1280" height="720"
bandwidth="226597" startWithSAP="1">
      <BaseURL> mosaic_video_hd.mp4</BaseURL>
      <SegmentBase indexRangeExact="true" indexRange="837-988"/>
      <SubRepresentation>
        <EssentialPropertyschemeIdUri="urn:mpeg:dash:srd:2014" value="0,0,0,1280,720,1280,720"/>
        <SupplementaryProperty schemeIdUri="urn:mpeg:dash:alternative:2015"
value="http://example.com/a_service/my.mpd">
      </SubRepresentation>
      <SubRepresentation>
        <EssentialProperty schemeIdUri="urn:mpeg:dash:srd:2014" value="0,960,540,320,180"/>
        <SupplementaryProperty schemeIdUri="urn:mpeg:dash:alternative:2015"
value="http://example.com/p_service/my.mpd">
      </SubRepresentation>
...
``` t46010 t46020

```
...
<Period>
  <AdaptationSet segmentAlignment="true" subsegmentAlignment="true" subsegmentStartsWithSAP="1">
    <Role schemeIdUri="urn:mpeg:dash:role:2011" value="multiple"/>
    <Representation mimeType="video/mp4" codecs="avc1.42c01e" width="1280" height="720"
bandwidth="226597" startWithSAP="1">
      <BaseURL> mosaic_video_hd.mp4</BaseURL>
      <SegmentBase indexRangeExact="true" indexRange="837-988"/>
      <SubRepresentation>
        <Role schemeIdUri="urn:mpeg:dash:role:2011" value="main"/>
        <EssentialPropertyschemeIdUri="urn:mpeg:dash:srd:2014" value="0,0,0,1280,720,1280,720"/>
        <SupplementaryProperty schemeIdUri="urn:mpeg:dash:alternative:2015"
value="http://example.com/a_service/my.mpd">
      </SubRepresentation>
      <SubRepresentation>
        <Role schemeIdUri="urn:mpeg:dash:role:2011" value="sign"/>
        <EssentialProperty schemeIdUri="urn:mpeg:dash:srd:2014" value="0,960,540,320,180"/>
        <SupplementaryProperty schemeIdUri="urn:mpeg:dash:alternative:2015"
value="http://example.com/p_service/my.mpd">
      </SubRepresentation>
...
```

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS REFERENCE TO RELATED APPLICATIONS

This application a Continuation of U.S. patent application Ser. No. 15/118,759 filed on Aug. 12, 2016 (now U.S. Pat. No. 10,848,795 issued on Nov. 24, 2020), which is the National Phase of PCT International Application No. PCT/KR2016/005021, filed on May 12, 2016, which claims priority under 35 U.S.C. 119(e) to U.S. Provisional Application Nos. 62/160,574 filed on May 12, 2015, 62/171,206 filed on Jun. 4, 2015, 62/171,208 filed on Jun. 4, 2015, 62/171,210 filed on Jun. 4, 2015, and 62/181,175 filed on Jun. 17, 2015, all of these applications are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

The present invention provides a system capable of effectively supporting future broadcast services in an environment supporting future hybrid broadcasting using terrestrial broadcast networks and the Internet and related signaling methods.

The present invention can effectively support future broadcast services in an environment supporting future hybrid broadcasting using terrestrial broadcast networks and the Internet.

The present invention can support a method for providing detailed signaling with respect to service components included in a broadcast service.

The present invention can support a method of efficiently providing a variety of information such as 3D, caption, WCG and HDR in a method of delivering a broadcast service.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 11 is a diagram showing the structure of a media file according to an embodiment of the present invention;

FIG. 16 is a diagram showing a capability descriptor according to an embodiment of the present invention;

FIG. 17 is a diagram showing capability codes according to an embodiment of the present invention;

FIG. 18 is a diagram showing the form of a descriptor according to an embodiment of the present invention;

FIG. 19 is a diagram showing a method of signaling broadcast program related information according to an embodiment of the present invention;

FIG. 20 is a diagram showing a method of signaling caption related information according to an embodiment of the present invention;

FIG. 21 is a diagram showing a method of signaling 3-dimensional (3D) related information according to an embodiment of the present invention;

FIG. 22 is a diagram showing a part of a USBD according to another embodiment of the present invention;

FIG. 23 is a diagram showing a part of an MP table according to an embodiment of the present invention;

FIG. 24 is a diagram showing an asset group descriptor according to an embodiment of the present invention;

FIG. 25 is a diagram showing accessibility information according to an embodiment of the present invention;

FIG. 27 is a diagram showing component property information according to an embodiment of the present invention;

FIG. 29 is a diagram showing HEVC video component description information according to an embodiment of the present invention;

FIG. 30 is a diagram showing HEVC timing & HRD information according to an embodiment of the present invention;

FIG. 31 is a diagram showing caption information according to an embodiment of the present invention;

FIG. 32 is a diagram showing HDR information according to an embodiment of the present invention;

FIG. 33 is a diagram showing WCG information according to an embodiment of the present invention;

FIG. 34 is a diagram showing HFR information/pull down information according to an embodiment of the present invention;

FIG. 39 is a diagram showing 3D audio information according to an embodiment of the present invention;

FIG. 40 is a diagram showing AC-4 audio information according to an embodiment of the present invention;

FIG. 41 is a diagram showing MPEG-H audio information according to an embodiment of the present invention;

FIG. 44 is a diagram showing an embodiment describing the above-described view configuration information as a descriptor on an MPD;

FIG. 45 is a diagram showing role information according to an embodiment of the present invention;

FIG. 46 is a diagram showing an embodiment describing the above-described role information as a descriptor on an MPD;

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc. The present invention proposes a physical profile (or system) optimized to minimize receiver complexity while achieving performance required for special uses.

Figure 1:
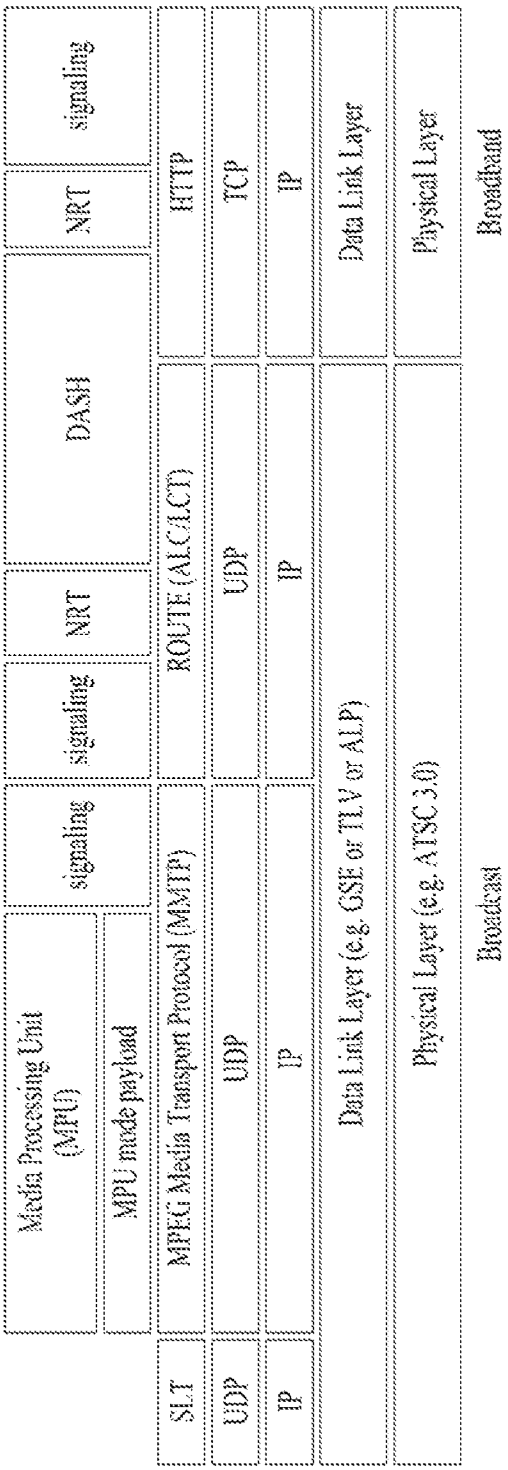
FIG. 1 illustrates a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
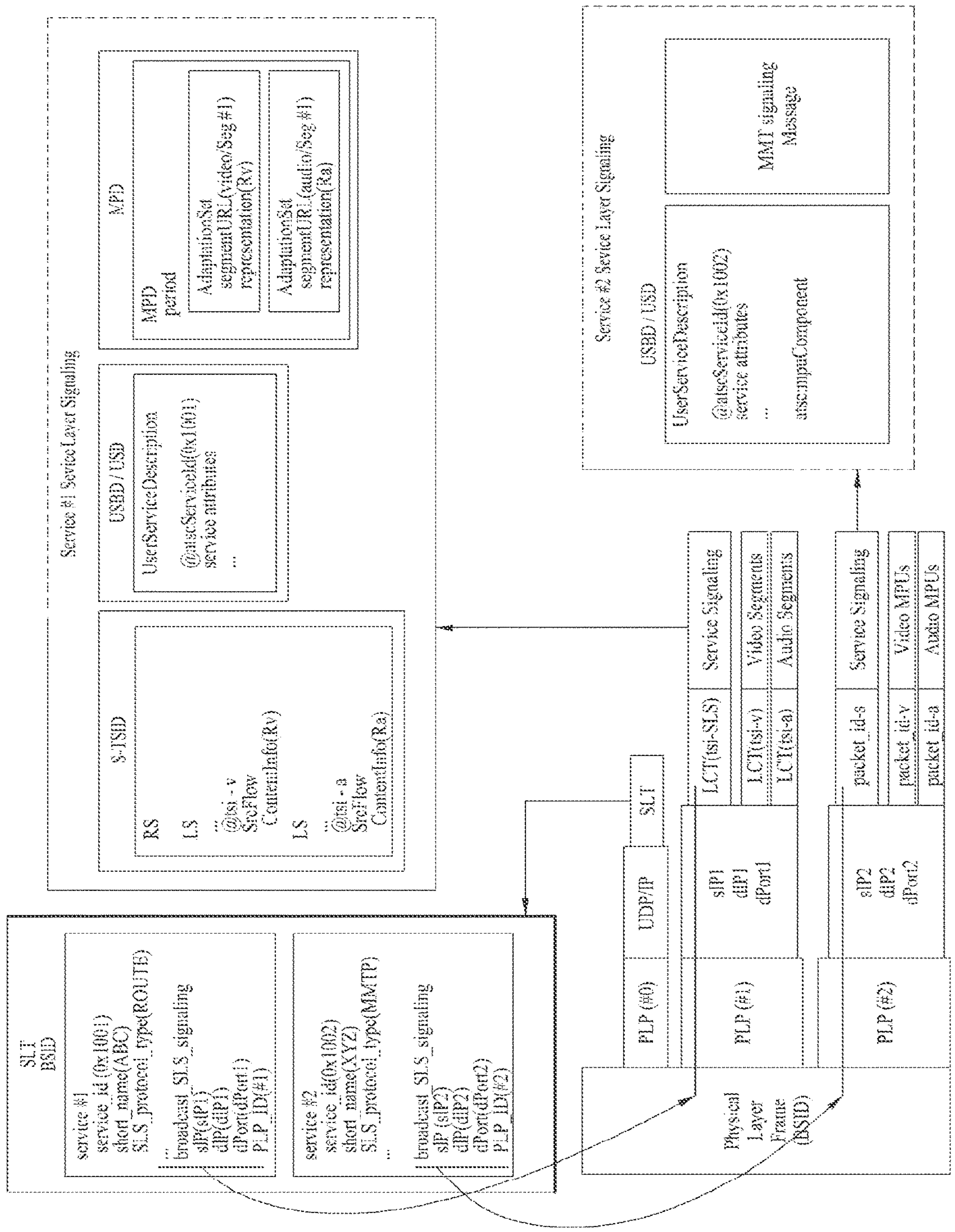
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a physical layer pipe (PLP) along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
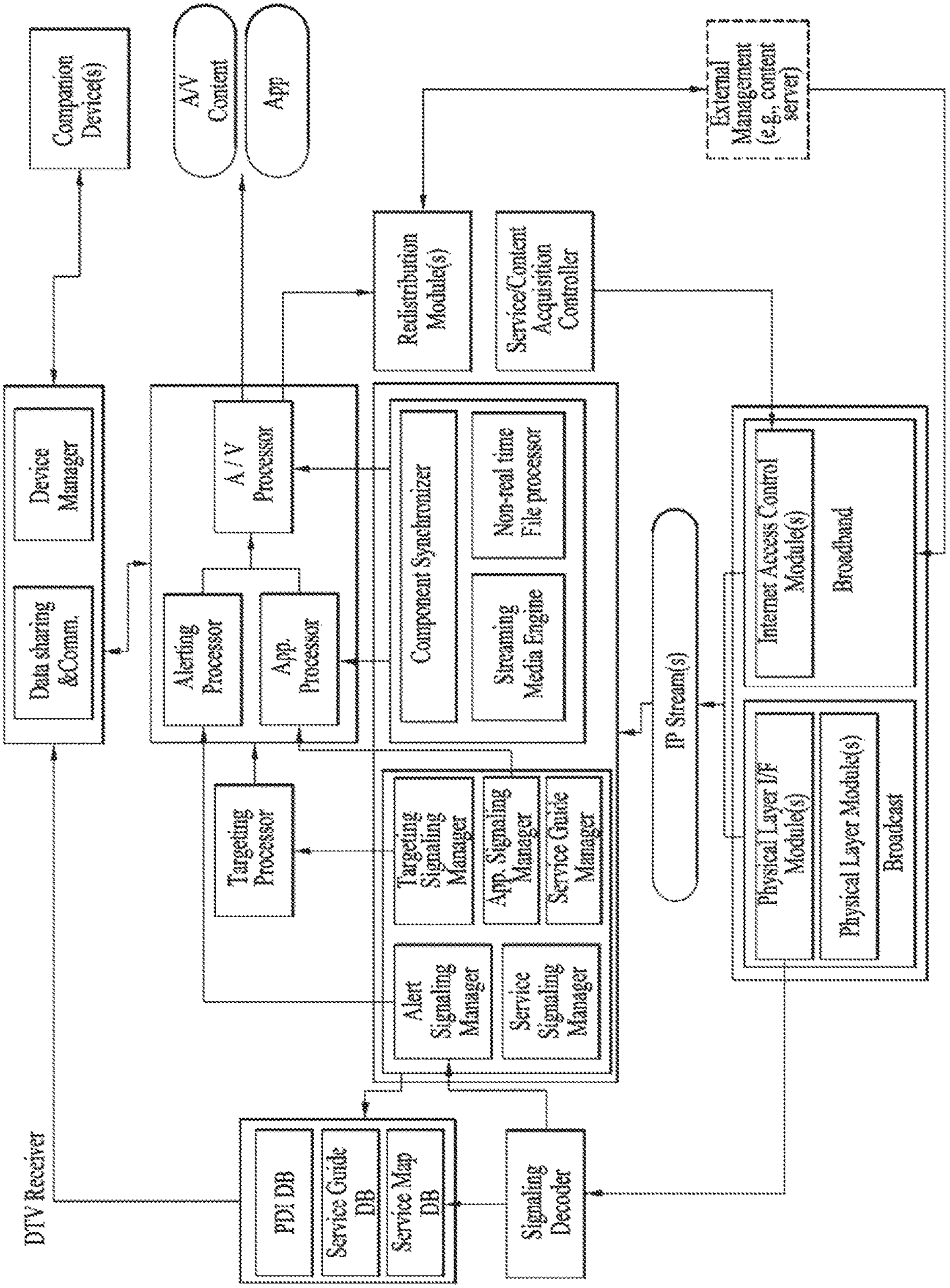
FIG. 8 is a diagram illustrating a hybrid broadcast reception apparatus according to an embodiment of the present invention.

FIG. 8 is a diagram illustrating a hybrid broadcast reception apparatus according to an embodiment of the present invention.

The hybrid broadcast system may transmit a broadcast signal over a terrestrial broadcast network and the Internet. A hybrid broadcast reception apparatus may receive a broadcast signal over a terrestrial broadcast network (broadcast) and the Internet (broadband). The hybrid broadcast reception apparatus may include a physical layer module, a physical layer I/F module, a service/content acquisition controller, an Internet access control module, a signaling decoder, a service signaling manager, a service guide manager, an application signaling manager, an alert signal manager, an alert signal parser, a targeting signal parser, a streaming media engine, a non-real-time file processor, a component synchronizer, a targeting processor, an application processor, an A/V processor, a device manager, a data sharing and communication unit, a redistribution module, a companion device and/or external modules.

The physical layer module(s) may receive and process a broadcast related signal through a terrestrial broadcast channel, convert the broadcast related signal into an appropriate form and transmit the converted signal to the physical layer I/F module.

The physical layer I/F module(s) may acquire an IP datagram from the information acquired from the physical layer module. In addition, the physical layer I/F module may convert the acquired IP datagram into a specific frame (e.g., RS frame, GSE, etc.)

The service/content acquisition controller may perform control operation for acquiring a service, content and signaling data related thereto through a broadcast channel and/or a broadband channel.

The Internet access control module(s) may control operation of the receiver for acquiring services, content, etc. through the broadband channel.

The signaling decoder may decode signaling information acquired through the broadcast channel.

The service signaling manager may extract, parse and manage signaling information related to service/content and service scan from the IP datagram.

The service guide manager may extract announcement information from the IP datagram, manage a service guide (SG) database and provide a service guide.

The application signaling manager may extract, parse and manage signaling information related to application acquisition from the IP datagram.

The alert signaling parser may extract, parse and manage signaling information related to alerting from the IP datagram.

The targeting signaling parser may extract, parse and manage signaling information related to targeting or service/content personalization from the IP datagram. In addition, the targeting signal parser may deliver the parsed signaling information to the targeting processor.

The streaming media engine may extract and decode audio/video data for A/V streaming from the IP datagram.

The non-real-time file processor may extract, decode and manage file type data such as NRT data and application from the IP datagram.

The component synchronizer may synchronize services and content such as streaming audio/video data and NRT data.

The targeting processor may process personalization related operation of services/content based on targeting signaling data received from the targeting signal parser.

The application processor may process application related information, downloaded application states and display parameters.

The A/V processor may perform audio/video rendering related operation based on the decoded audio and video data and application data.

The device manager may perform connection with an external device and data exchange operation. The device manager may perform management operation of an external device, such as addition/deletion/update of the external device connectable thereto.

The data sharing and communication unit may process information related to data transmission and exchange between the hybrid broadcast receiver and the external device. Here, the transmittable and exchangeable data may be signaling, A/V data, etc.

The redistribution module(s) may acquire information related to future broadcast services and content when the broadcast receiver does not directly receive a terrestrial broadcast signal. In addition, the redistribution module may support broadcast service and content acquisition by a future broadcast system when the broadcast receiver does not directly receive a terrestrial broadcast signal.

The companion device(s) may be connected to the broadcast receiver of the present invention to share data including audio, video or signaling. The companion device may be an external device connected to the broadcast receiver.

The external module may provide a broadcast service/content and may be a future broadcast service/content server, for example. The external module may be an external device connected to the broadcast receiver.

Figure 9:
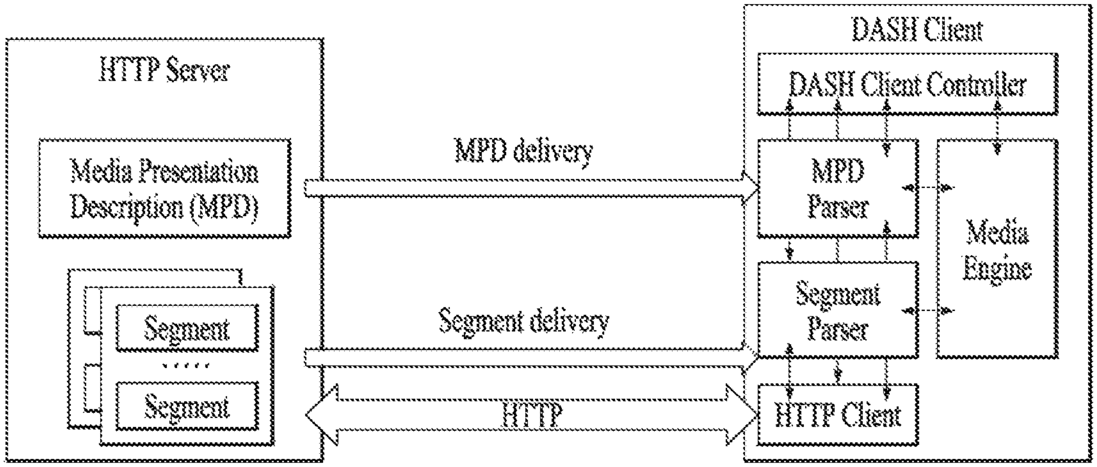
FIG. 9 is a diagram showing overall operation of a DASH based adaptive streaming model according to an embodiment of the present invention.

FIG. 9 is a diagram showing overall operation of a DASH based adaptive streaming model according to an embodiment of the present invention.

The present invention proposes a future media service provision method for providing content capable of supporting a high dynamic range (HDR). The present invention proposes metadata and a method of delivering the metadata if HDR content capable of being expressed with a variety of luminances is provided. Content may be adaptively adjusted according to the scene-by-scene properties of the content and content may be provided with improved image quality.

In the case of a UHD broadcast, content luminance which cannot be expressed in the past may be expressed and a high sense of realism may be provided. By introduction of HDR, the luminance expression range of the content may increase such that a difference in scene-by-scene properties of content may increase than before. In order to efficiently represent the scene-by-scene features of content on the display, metadata may be defined and delivered to a receiver. The receiver may appropriately provide the image of the content according to the intention of a service provider based on the received metadata.

The present invention proposes a method of signaling an HDR parameter related to the video track and video sample of content for providing HDR based on a media file such as ISOBMFF. The present invention proposes a method of storing and signaling HDR flags and/or parameters related to the video track (stream). The present invention proposes a method of storing and signaling HDR flags and/or parameters related to a video sample, a video sample group or a video sample entry. The present invention proposes a method of storing and signaling an SEI NAL unit including HDR related information.

The method of storing/delivering HDR information according to the present invention may be used to generate content supporting the HDR. That is, the method of the present invention may be used upon generating the media file of content supporting the HDR, upon generating a DASH segment operating on the MPEG DASH or upon generating a MPU operating on MPEG MMT. The receiver (including a DASH client, an MMT client, etc.) may acquire HDR information (flag, parameter, box, etc.) through a decoder to efficiently provide content based on the HDR information.

The HDR configuration box or HDR related flag information may be simultaneously present in several boxes of a media file, a DASH segment or an MMT MPU. In this case, the HDR information defined in an upper box may be overridden by HDR information defined in a lower box. For example, if HDR information is simultaneously included in a tkhd box and a vmhd box, HDR information of the tkhd box may be overridden by the HDR information of the vmhd box.

A DASH based adaptive streaming model according to the shown embodiment may describe operation between an HTTP server and a DASH client. Here, dynamic adaptive streaming over HTTP (DASH) is a protocol supporting HTTP based adaptive streaming, which may dynamically support streaming according to network state. Accordingly, it is possible to seamlessly play AV content back.

First, a DASH client may acquire an MPD. The MPD may be received from a service provider such as an HTTP server. The MPD may be delivered according to the above-described delivery embodiment. The DASH client may request segments from the server using access information of the segments described in the MPD. Here, this request may be made according to the network state.

The DASH client may acquire the segments, process the segments in a media engine and display the segments on a screen. The DASH client may request and acquire a necessary segment in real time according to a playback time and/or a network state (adaptive streaming). It is possible to seamlessly play content back.

The MPD may be a file including detailed information for enabling a DASH client to dynamically acquire a segment and may be expressed in the form of XML. This MPD may be equal to the above-described MPD in some embodiments.

A DASH client controller may generate a command for requesting an MPD and/or a segment according to network state. In addition, the controller may perform control such that an internal block such as a media engine uses the acquired information.

The MPD parser may parse the acquired MPD in real time. A DASH client controller may generate a command capable of acquiring a necessary segment.

A segment parser may parse the acquired segment in real time. An internal block such as a media engine may perform specific operation according to the information included in the segment.

An HTTP client may request a necessary MPD and/or a segment from an HTTP server. In addition, the HTTP client may deliver the MPD and/or the segment acquired from the server to the MPD parser or the segment parser.

The media engine may display the content on the screen using the media data included in the segment. At this time, information on the MPD may be used.

Figure 10:
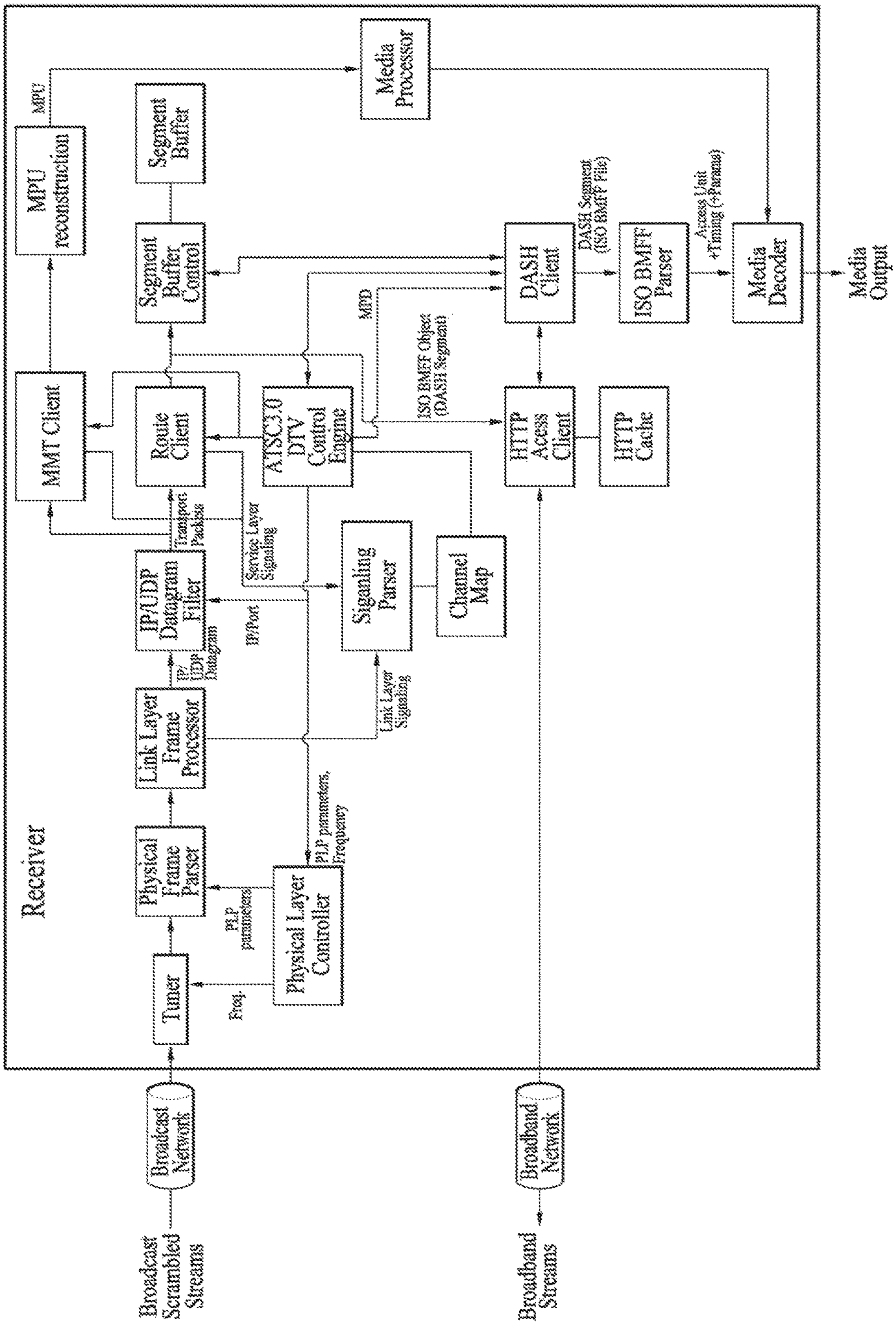
FIG. 10 is a block diagram showing a receiver according to an embodiment of the present invention.

FIG. 10 is a block diagram showing a receiver according to an embodiment of the present invention.

The receiver according to the shown embodiment may include a tuner, a physical layer controller, a physical frame parser, a link layer frame processor, an IP/UDP datagram filter, a DTV control engine, a route client, a segment buffer control unit, an MMT client, an MPU reconstruction unit, a media processor, a signaling parser, a DASH client, an ISO BMFF parser, a media decoder and/or an HTTP access client. The blocks of the receiver may be hardware processors.

The tuner may receive and process a broadcast signal through a terrestrial broadcast channel and convert the broadcast signal into an appropriate format (physical frame, etc.). The physical layer controller may control operation of the tuner and the physical frame parser using RF information of a broadcast channel to be received. The physical frame parser may parse the received physical frame and acquire a link layer frame through processing related thereto.

The link layer frame processor may acquire link layer signaling from the link layer frame or acquire an IP/UDP datagram and perform related operation. The IP/UDP datagram filter may filter a specific IP/UDP datagram from the received IP/UDP datagram. The DTV control engine may serve as an interface between components and control operation of each component through parameter delivery.

The route client may process ROUTE packets supporting real-time object transmission, collect and process several packets and generate one or more ISO base media file format (ISOBMFF) objects. The segment buffer control unit may control a buffer related to segment transmission between the ROUTE client and the DASH client.

The MMT client may process MPEG media transport (MMT) protocol packets supporting real-time object transmission and collect and process several packets. The MPU reconstruction unit may reconfigure the media processing unit (MPU) from the MMTP. The media processor may collect and process the reconstructed MPU.

The signaling parser may acquire and parse DTV broadcast service related signaling and generate and/or manage a channel map based on the DTV broadcast service related signaling. This may process low level signaling and service level signaling.

The DASH client may perform operation related to real-time streaming or adaptive streaming and process the acquired DASH segment. The ISO BMFF parser may extract audio/video data and parameters related thereto from the ISO BMFF object. The media decoder may decode and/or present the received audio and video data. The HTTP access client may request specific information from the HTTP server and process a response to the request.

FIG. 11 is a diagram showing the structure of a media file according to an embodiment of the present invention.

In order to store and transmit media data such as audio or video, a standardized media file format may be defined. In some embodiments, the media file of the present invention may have a file format based on the ISO BMFF.

The media file according to the present invention may include at least one box. Here, the box may be a data block or object including media data or metadata related to the media data. The boxes may form a hierarchical structure and data may be classified such that a media file has a format suitable for storage and/or transmission of mass media data. In addition, the media file may have a structure for enabling a user to easily access media information through movement to a specific point of media content.

The media file according to the present invention may include an ftyp box, a moov box and/or an mdat box.

The ftyp box (file type box) may provide file type or compatibility related information of the media file. The ftyp box may include configuration version information of media data of the media file. The decoder may identify the media box by referring to the ftyp box.

The moov box (movie box) may include metadata of the media data of the media file. The moov box may serve as a container for all metadata. The moov box may be a box of a highest layer of the metadata related boxes. In some embodiments, one moove box may be present in the media file.

The mdat box (media data box) may contain actual media data of the media file. The media data may include audio samples and/or video samples. The mdat box may serve as a container containing such media samples.

In some embodiments, the above-described moov box may further include an mvhd box, a trak box and/or an mvex box as sub boxes.

The mvhd box (movie header box) may include media presentation related information of the media data included in the media file. That is, the mvhd box may include the media generation time, change time, time specification, period, etc. of the media presentation.

The trak box (track box) may provide information related to the track of the media data. The track box may include stream related information, presentation related information, and access related information of the audio track or the video track. A plurality of trak boxes may be present according to the number of tracks.

The trak box may further include a tkhd box (track header box) as a sub box. The tkhd box may include information on the track indicated by the trak box. The tkhd box may include the generation time, change time, and track identifier of the track.

The mvex box (movie extend box) may indicate that the below-described moof box is present in the media file. In order to know all media samples of a specific track, the moof boxes needs to be scanned.

The media file according to the present invention may be divided into a plurality of fragments in some embodiments (t14010). To this end, the media file may be divisionally stored or transmitted. The media data (mdat box) of the media file may be divided into a plurality of fragments and each fragment may include a moof box and an mdat box. In some embodiments, in order to use fragments, information on the ftyp box and/or the moov box may be necessary.

The moof box (movie fragment box) may provide metadata of the media data of the fragment. The moof box may be a box of a highest layer of boxes related to the metadata of the fragment.

The mdat box (media data box) may include actual media data as described above. This mdat box may include the media samples of the media data corresponding to the fragment.

In some embodiments, the moof box may further an mfhd box and/or a traf box as sub boxes.

The mfhd box (movie fragment header box) may include information on association between the plurality of divided fragments. The mfhd box may include a sequence number to indicate the sequence of the media data of the fragment. In addition, whether the divided data is omitted may be checked using the mfhd box.

The traf box (track fragment box) may include information on the track fragment. The traf box may provide metadata of the divided track fragment included in the fragment. The traf box may provide metadata to decode and play back the media samples of the track fragment. A plurality of traf boxes may be present according to the number of track fragments.

In some embodiments, the above-described traf box may further include a tfhd box and/or a trun box as sub boxes.

The tfhd box (track fragment header box) may include the header information of the track fragment. The tfhd box may provide basic sample sizes, periods, offsets and identifiers of the media samples of the track fragment indicated by the above-described traf box.

The trun box (track fragment run box) may include information related to the track fragment. The trun box may include information such as a media sample-by-media sample period, a size and a playback time.

The media file or the fragments of the media file may be processed into segments and the segments may be transmitted. The segments may include an initialization segment and/or a media segment.

The file of the illustrated embodiment (t14020) may include information related to initialization of the media decoder except for media data. This field may correspond to the above-described initialization segment, for example. The initialization segment may include the above-described ftyp box and/or the moov box.

The file of the illustrated embodiment (t14030) may include the above-described fragment. This file may correspond to the above-described media segment, for example. The media segment may include the above-described moof box and/or mdat box. In addition, the media segment may further include a styp box and/or a sidx box.

The styp box (segment type box) may provide information for identifying the media data of the divided fragment. The styp box may perform the same role as the above-described ftyp box with respect to the divided fragment. In some embodiments, the styp box may have the same format as the ftyp box.

The sidx box (segment index box) may provide information indicating the index of the divided fragment. Accordingly, it is possible to indicate the sequence of the divided fragment.

In some embodiments (t14040), an ssix box may be further included. The ssix box (sub segment index box) may provide information of the indices of sub segments when the segment is divided into sub segments.

The boxes of the media file may include further extended information based on a box or a full box of the illustrated embodiment (t14050). In this embodiment, a size field and a largesize field may indicate the length of the box in bytes. A version field may indicate the version of the box format. A type field may indicate the type or identifier of the box. A flags field indicates a flag related to the box.

Figure 12:
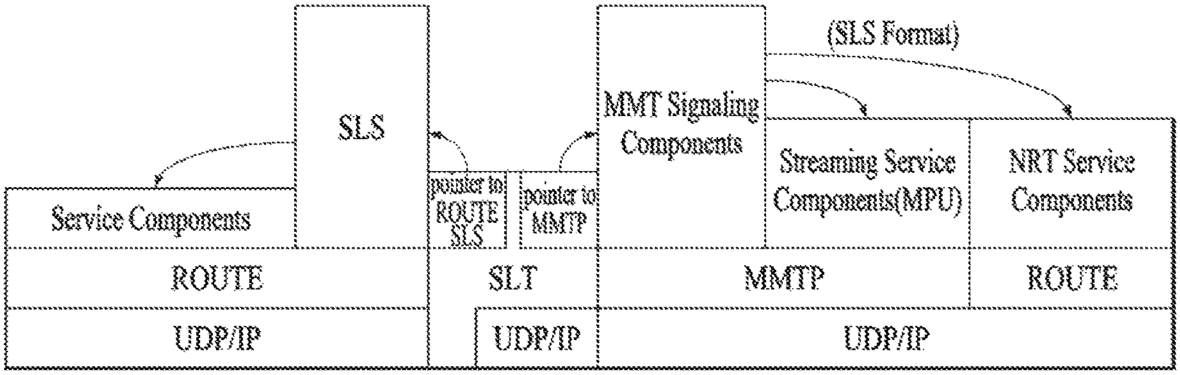
FIG. 12 is a diagram illustrating a bootstrapping process through an SLT according to an embodiment of the present invention.

FIG. 12 is a diagram illustrating a bootstrapping process through an SLT according to an embodiment of the present invention.

As described above, SLS bootstrapping may be performed through bootstrap information of an SLT. As described above, the SLT may be processed into IP/UDP and transmitted or may be transmitted without being processed into IP/UDP. In general, low level signaling (LLS) such as SLT may be delivered by a most robust method in transmission.

If the SLS is transmitted by the ROUTE protocol, the receiver may access the SLS through the bootstrap information of the SLT. Using the information of the ROUTE SLS, the service components of the service may be acquired. Here, the SLS and the service components may be transmitted by the ROUTE, UDP and IP protocols.

If the SLS is transmitted by the MMT protocol, the receiver may access the SLS through the bootstrap information of the SLT. Using the information of the MMTP SLS, the service components of the service may be acquired. The MMTP SLS may include a USBD and/or MMTP message. As described above, the USBD may reference to the MMTP message and the MPT message of the MMTP message may provide information for acquiring streaming components delivered by the MMT protocol. The USBD of the MMT may further reference an S-TSID for acquiring the NRT components of the service delivered by the ROUTE protocol. In addition to the above-described MPT message, other MMTP messages for providing other information may be defined. Here, the SLS and the service components may be transmitted by the MMT, UDP and IP protocols. Here, the NRT components may be transmitted by the ROUTE, UDP and IP protocols. The detailed bootstrapping method has been as described above.

Figure 13:
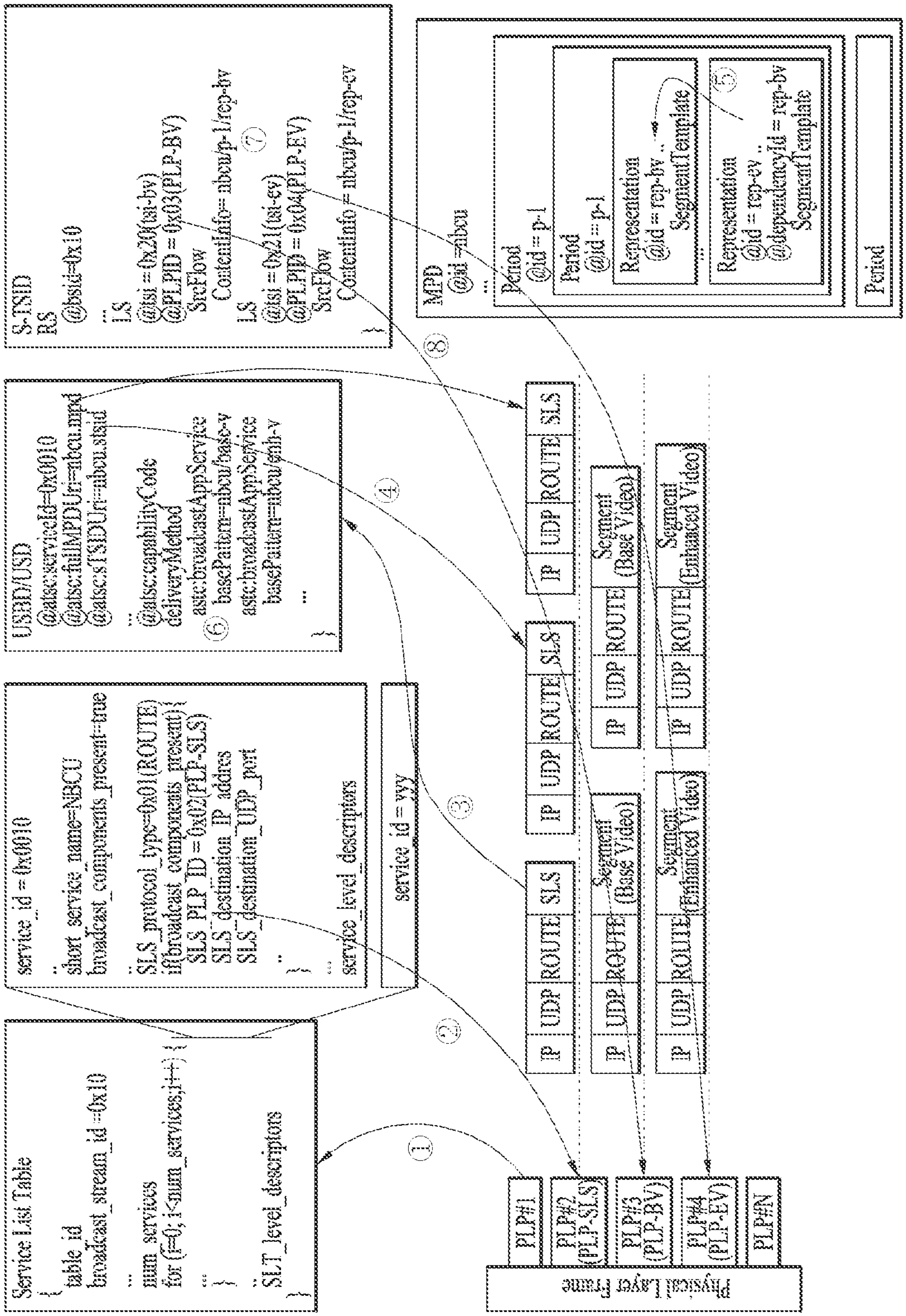
FIG. 13 is a diagram illustrating ROUTE protocol based signaling flow according to an embodiment of the present invention.

FIG. 13 is a diagram illustrating ROUTE protocol based signaling flow according to an embodiment of the present invention.

First, the receiver may acquire an SLT from a physical layer frame (signal frame). The SLT has been described above. Through the SLT, information on a path for acquiring the SLS related to a specific service may be acquired. The SLS (USBD, etc.) may be acquired from the path (transport session, etc.).

Information on the path capable of acquiring the MPD and the S-TSID from the USBD may be acquired and the MPD and the S-TSID may be acquired therefrom. The SLS fragments were as described above. A DASH representation may be selected through the MPD and information such as a segment URL and an ID related to the DASH representation may be acquired. In the illustrated embodiment, information on a representation @id=rep-bv for a base layer of scalable coding content and/or a representation @id=rep-ev for an enhancement layer may be acquired. Here, the representation may correspond to the service component of the service.

Whether segments associated with the DASH representations are transmitted over the broadcast network or broadband network may be checked using the information on the USBD. If the segments are transmitted over the broadcast network, a path (transport session, etc.) capable of acquiring the segments may be acquired using the S-TSID. The receiver may acquire, decode and play the segments back. The detailed bootstrapping process has been described above.

Figure 14:
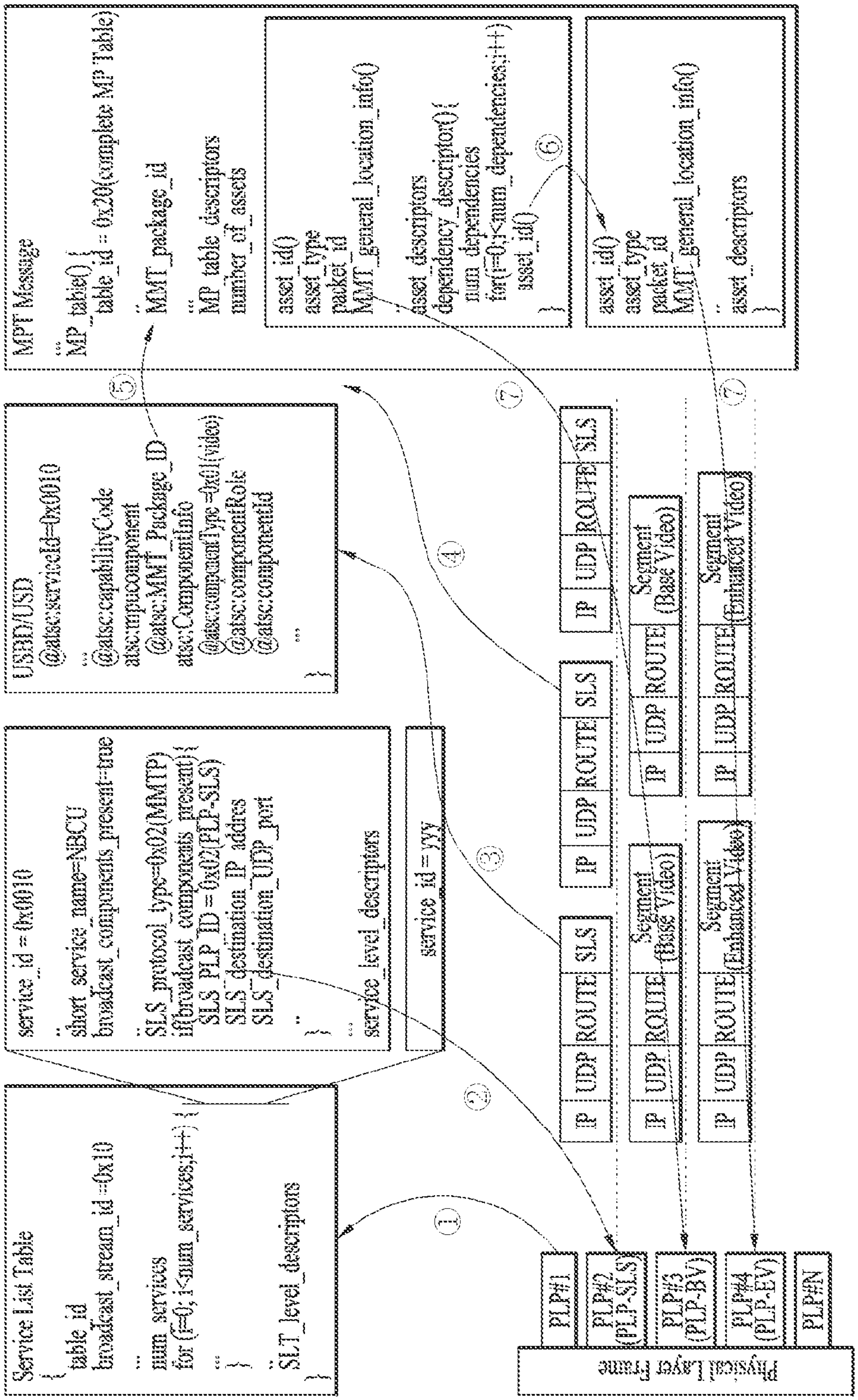
FIG. 14 is a diagram illustrating MMT protocol based signaling flow according to an embodiment of the present invention.

FIG. 14 is a diagram illustrating MMT protocol based signaling flow according to an embodiment of the present invention.

First, a process of acquiring an SLT and acquiring an SLS using the SLT may be identical. In the case of MMT based signaling, the SLS may include a USBD and/or MMTP messages. Information on an MMT package associated with the service may be acquired from the USBD. Using this information, an MPT (MP table) message may be acquired from a service signaling channel. The service components of the service may be acquired through the MPT message. In the illustrated embodiment, information on an asset for a base layer of scalable coding content and/or information on an asset for an enhancement layer may be acquired. In addition, a path (transport session, etc.) capable of acquiring each asset may be acquired. Here, the asset may correspond to the service component of the service. MPUs may be acquired, decoded and played back through the path. The detailed bootstrapping process has been described above.

In some embodiments, MMPT messages other than the MPT message may be defined. Additional information of the service may be delivered through these messages. For example, scalable coding related information, 3D related information, HDR related information, color gamut related information, additional information of service components, etc. may be delivered through these messages. In some embodiments, an MPD for service components delivered over broadband, a table for app signaling and event information may also be delivered through these messages.

Figure 15:
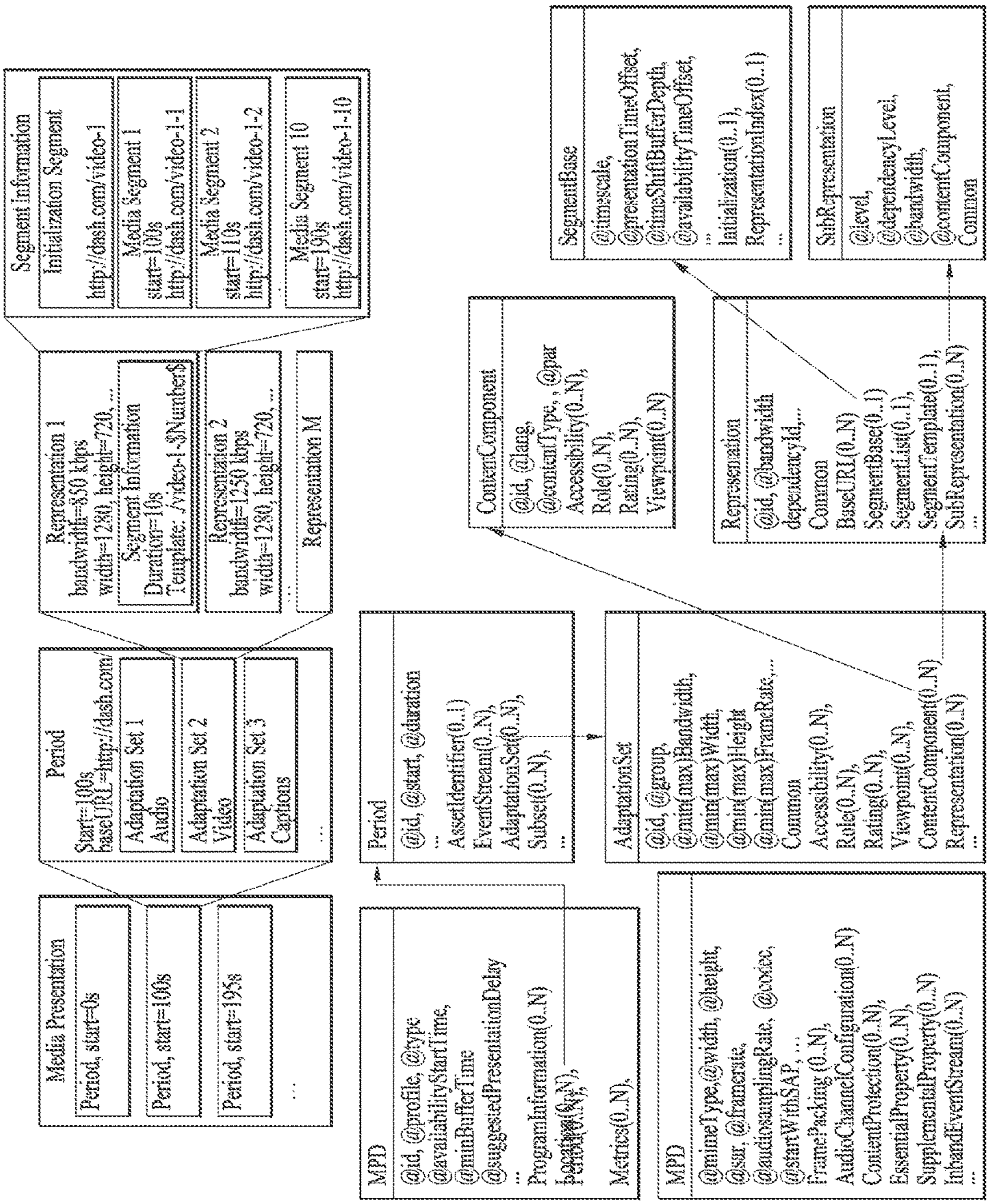
FIG. 15 is a diagram showing a DASH data model according to an embodiment of the present invention.

FIG. 15 is a diagram showing a DASH data model according to an embodiment of the present invention.

The DASH data model may have a hierarchical structure. A media presentation may be defined by an MPD. The MPD has been described above. The MPD may describe the temporal sequence of a plurality of periods for making a media presentation. The period may indicate one section of media content.

In one period, data may be included in adaptation sets. The adaptation set may be a set of a plurality of exchangeable media content components. Adaptation may include a set of representations. The representation may correspond to a media content component. Within one representation, content may be divided into a plurality of segments in terms of time, for appropriate accessibility and delivery. In order to access each segment, the URL of each segment may be delivered.

The MPD may provide information related to the media presentation, and a period element, an adaptation set element and a representation element may describe a period, an adaptation set and a representation, respectively. The representation may be divided into sub-representations, and the sub-representation element may describe the sub-representation.

Here, common attributes/elements may be defined and are applicable to (included in) an adaptation set, a representation, a sub-representation, etc. The common attributes/elements may include an EssentialProperty and/or SupplementalProperty.

The EssentialProperty may be information including elements essential for processing the media presentation related data. The SupplementalProperty may be information including elements to be used to process the media presentation related data. In some embodiments, the below-described descriptors may be defined and delivered within the EssentialProperty and/or SupplementalProperty when delivered through the MPD.

Here, if the @lang attribute for providing language information, the @contentType attribute indicating a content type, the @par attribute for providing picture aspect ratio information, etc. are not included in the adaptation set element, this information may be included in a ContentComponent element. The ContentComponent element may be included in the adaptation set element.

Here, the SegmentBase element provides information related to the segment and, if the SegmentBase element is present, the content of the segment base element of the adaptation set element may be overidden.

FIG. 16 is a diagram showing a capability descriptor according to an embodiment of the present invention.

The present invention proposes a method of signaling a broadcast service and capability information of service components included in the service. The capability or capability group of the service/service component may be signaled and capability information may be signaled according to target device.

The above-described SLT may include capability information. The capability information of all services described in the SLT or the capability information of a service level of each service described in the SLT may be present. The above-described @sltCapabilities attribute or the @svcCapabilities attribute may be included therein. If the SLT has a binary format, the capability information may be included in the SLT as the descriptor of the SLT level or the descriptor of the SLS level.

The illustrated capability descriptors may indicate the above-described capability information in the form of a descriptor. However, in some embodiments, the capability information may be expressed in another format such as XML. In addition, in some embodiments, the information in the illustrated capability descriptor may be included in the @sltCapabilities attribute or @svcCapabilities attribute of the SLT. In this case, a descriptor tag, descriptor length information, etc. may be omitted. Hereinafter, this capability information will be described based on the descriptor.

The capability descriptor of the illustrated embodiment (t16010) may include a descriptor_tag field, a descriptor_length field and/or a num_capability_codes field. The descriptor_tag field and descriptor_length field may provide information for identifying that the descriptor is a capability descriptor and the length information of the descriptor.

The num_capability_codes field may indicate the number of capability information included in the descriptor. In some embodiments, this field may indicate the number of capability codes included in the descriptor. Detailed fields for the capability information may be further included according to the value of the num_capability_codes field. The detailed fields may include an essential_indicator field and/or a capability_code field. In some embodiments, the essential_indicator field may be omitted and only the capability_code field may be present.

The essential_indicator field may indicate whether the following capability codes are essentially supported to play the service and the service component back. When the value of this field is 1, the following capability is essentially supported to play the service or the service component back.

The capability_code field may indicate the capability code indicating the capability information of the service or the service component. Here, the capability code may be a code value specified with respect to each capability, which will be described below.

For example, if one broadcast service provides UHD video based on HEVC, 7.1-channel audio based on MPEG-H, and closed captions based on SMPTE timed text, the descriptor may have capability codes indicating the same. In this case, num_capability_code may have a value of 0x05. Five capability_codes may have values of 0x13 (HEVC), 0x22 (ultra high definition video), 0x40 (MPEG-H audio), 0x52 (7.1 channel) and/or 0x60 (SMPTE timed text), respectively. Here, the essential_indicator field may be omitted.

In the embodiment t16020, along with the capability information, capability category information may be added. The capability category information may classify the categories of the capabilities. In some embodiments, the capability category information may group capabilities equally applicable to the service or the service component. Capabilities equally applied to the component in the service or capability information applied per component may be signaled.

In the embodiment (t16020), a capability_category field may be further added to the above-described capability descriptor. The capability_category may indicate the category of the following capability information. In some embodiment, this field may indicate a target to which the following capability information is applied.

For example, if the value of this field is 0x02, the capabilities may be capabilities related to a video component. That is, it can be seen that the following capability code is related to video related capabilities. For example, this field may be followed by capability codes related to video codec, resolution, video provision method, transport protocol, FEC algorithm and target device.

If the value of this field is 0x03, the capabilities may be capabilities related to an audio component. That is, it can be seen that the following capability code may be related to audio related capabilities. For example, this field may be followed by capability codes related to audio codec, audio channel, transport protocol, FEC algorithm and target device.

If the value of this field is 0x04, the capabilities may be capabilities related to a closed caption. That is, this field may be followed by capability codes related to closed caption type, transport protocol, FEC algorithm and target device.

If the value of this field is 0x05, the capabilities may be capabilities related to an application. That is, this field may be followed by capability codes related to application type, transport protocol, FEC algorithm and target device.

If the value of this field is 0x06 to 0x08, the capabilities may be capabilities related to a transport protocol, an FEC algorithm and a target device. That is, the capabilities may not be capabilities related to the video/audio/closed caption/application. In this case, the transport protocol, the FEC algorithm and the target device indicated by the following capability codes may be equally applicable to all components (video/audio/closed caption/application) of the service.

According to the embodiment (t16030), the above-described capability descriptor may further include a structure of a capability group. The capability group may be a set of one or more capabilities. The capability group may be referred to as a capability set.

Here, the descriptor_tag field may identify that the descriptor is a capability descriptor including information on a capability group. The descriptor_length field may indicate the length of the descriptor. The num_capability_sets field may indicate the number of capability groups included in the descriptor. Information on the capability groups may be included in the descriptor according to the value of the num_capability_sets field.

The capability_category field may indicate the categories of the capabilities included in the capability group. In some embodiments, this field may indicate a target to which the capabilities included in the capability group are applied. The values of this field may be equal to the values of the capability_category field of the above-described embodiment.

The num_capability_in_set field may indicate the number of capabilities included in the capability group. The essential_indicator field and/or the capability_code field of the capabilities may be included in the descriptor according to the value indicated by this field. This has been described above.

According to the embodiment (t16040), the above-described capability descriptor may further include a target_device field. In the present embodiment, although the target_device field may be included in the capability group structure, the target_device field may be included in the above-described embodiments. This field may indicate a target device, to which the capability or the capability group is applicable.

For example, if the value of this field is 0x01, information on the capability or capability group may be capabilities applied to a primary device. If the value of this field is 0x02 or 0x03, the information on capability or capability group may be capabilities applied to a companion device or an inset of a primary screen. Here, the inset of the primary screen may mean picture in picture (PIP).

As described above, capability information may be included in the SLT in the form of XML or a descriptor. In some embodiments, the capability information may be delivered in a USBD according to MMT or ROUTE. In some embodiments, capability information may be defined as one ROUTE SLS and delivered along with other SLSs or may be defined as one MMTP SLS and delivered in one of the above-described MMTP messages.

In some embodiments, if the information on the capability descriptor according to the above-described embodiments is included in the USBD in the form of XML, the hierarchical structure of the capability descriptor of the above-described embodiment may be applicable without change. For example, the USBD may include a capability element as a sub element of a userServiceDescription root element. This capability element may include @essential_indicator, @capability_category and/or @capability_code. In addition, the userServiceDescription root element may include a capabilitySet element as a sub element. The capapbilitySet element may include @targetDevice, @capability_category and/or capability elements. The capability element may include @essential_indicator and @capability_code. Each field may have the above-described definitions. As described above, the @essential_indicator may be omitted.

FIG. 17 is a diagram showing capability codes according to an embodiment of the present invention.

The capability codes may indicate capabilities of the service or service component as described above. The illustrated codes may be values used in the above-described capability_code field. The categories (video, audio, etc.) of the illustrated capability codes may be values used in the capability_category field.

In some embodiments, the front digits (e.g., 0x01, 0x02, 0x03, . . . ) of the illustrated capability codes may be used to identify the capability category. In this case, the remaining digits of the capability codes may be used to identify the capability.

FIG. 18 is a diagram showing the form of a descriptor according to an embodiment of the present invention.

The descriptor according to the illustrated embodiment (t18010) may include an @schemeIdUri field, an @value field and an @id field. The @schemeIdUri field may provide a URL for identifying the scheme of the descriptor. The meaning of this field may be specified by the scheme indicated by this field. The @value field means mean values for the descriptor elements. The meaning of the values of this field may be defined by the scheme identified by the @schemeIdUri field. The @id field may be the identifier of the descriptor. The descriptors having the same @id field are identical and, in this case, only any one descriptor may be processed.

The descriptor according to the illustrated embodiment (ti 8020) may include a descriptor_tag field, a descriptor_length field and/or a service_level_description( ). The descriptor_tag field may be an identifier for identifying the descriptor. The descriptor_length field may indicate the length of the descriptor. The service_level_description( ) may include service level information included in the descriptor. The service level information may include 3D information, caption information, etc. according to type of the descriptor, which will be described in detail below.

The illustrated descriptors may be delivered in XML or binary format. Alternatively, corresponding information may be configured as elements of the other SLS information.

In some embodiments, the descriptors may be delivered in the SLT or USBD. In some embodiments, information on the descriptors may be delivered in the USBD according to MMT or ROUTE. In some embodiments, information on the descriptors may be defined as one ROUTE SLS and delivered along with the other SLSs or be defined as one MMTP SLS and delivered in one of the above-described MMTP messages. In some embodiments, this information may be delivered in the MPD or the above-described EssentialProperty and/or SupplementalProperty.

FIG. 19 is a diagram showing a method of signaling broadcast program related information according to an embodiment of the present invention.

Broadcast program related information or information related to a currently broadcast program may be signaled.

To this end, the @schemeIdURI field of the above-described descriptor may have a value of urn:atsc3.0:program:201x. This may be a value for identifying that the descriptor is a descriptor for program related information.

The @value field of the above-described descriptor may have the same value as the illustrated embodiment (t19010). A start_time value may indicate the playback start time information of the program. A duration value may include playback duration information of the program. A lang value may include language information of the program. A title value may indicate title information of the program.

The broadcast program related information includes program elements and may be delivered in signaling information such as ROUTE, MMT or 3GPP (t19020). The signaling information such as ROUTE, MMT or 3GPP may include the above-described signaling information (USBD, MPD, MMTP message, etc.).

The program elements may include @start_time, @duration, @lang, @moreURL and/or title. The @start_time, @duration, @lang and title may have the same definition as the above description. The @moreURL may provide a URL capable of acquiring information related to the program. It is possible to acquire the program related information through this URL over broadband.

The broadcast program related information is configured in the same format as the illustrated embodiment (t19030) and may be delivered in the signaling information such as ROUTE, MMT or 3GPP delivered in binary format.

The program_start_time field may indicate the playback start time information of the program. In some embodiments, a format such as an NTP timestamp may be used. The program_duration field may include playback duration information of the program. The playback duration may be expressed in seconds in some embodiments. The program_lang value may include the language information of the program. The URL_length field may indicate the length of the following URL_text( ). The URL_text field may provide a URL capable of acquiring information related to the program. It is possible to acquire the program related information through this URL over broadband. The title_length field may indicate the length of the following title_text( ). The title_text field may indicate the title information of the program.

In some embodiments, the values/fields/information of the broadcast program related information may be omitted or may be configured in other formats.

FIG. 20 is a diagram showing a method of signaling caption related information according to an embodiment of the present invention.

Information related to the caption of the broadcast service may be signaled.

To this end, the @schemeIdURI field of the above-described descriptor may have a value of urn:atsc3.0:caption:201x. This may be a value for identifying that the descriptor is a descriptor for caption related information.

The @value field of the above-described descriptor may have the same value as the illustrated embodiment (t20010). A caption_codec value may indicate the encoding value of the caption. In some embodiments, encoding types such as “CEA-608”, “CEA-708” and “SMPTE-TT” may be indicated. A lang value may include language information of the caption. A caption_service_number value may include the service number of the caption if the type of the caption is CEA-708. An easy_reader_flag value may indicate whether the caption is an easy reader type caption. An aspect_ratio value may indicate a display aspect ratio of the caption. In some embodiments, an aspect ratio of “4:3” or “16:9” may be indicated.

The caption related information may include caption elements and may be delivered in signaling information such as ROUTE, MMT and 3GPP (t20020). The signaling information such as ROUTE, MMT and 3GPP may include the above-described signaling information (USBD, MPD, MMTP message, etc.).

The caption elements may include @caption_codec, @lang, @caption_service_number, @easy_reader_flag, @aspect_ratio and/or @moreURL. The @caption_codec, @lang, @caption_service_number and @easy_reader_flag may have the same definitions as the above description. @moreURL may provide a URL capable of acquiring the information related to the caption. It is possible to acquire the information related to the caption through this URL over broadband.

The caption related information may be configured in the same format as the illustrated embodiment (t20030) and may be delivered in the signaling information, such as ROUTE, MMT and 3GPP, delivered in binary format.

A caption_lang field may include language information used in the caption. The caption_codec may indicate encoding format information of the caption. For example, if the value of this field is 0x01, 0x02, 0x03, 0x04 or 0x05, this may indicate that CEA-608, CEA-708, SMPTE timed text, EBU-TT-D or CFF-TT is used as encoding formats. The other values may be reserved for future use. An easy_reader field may indicate whether the caption is an easy reader type caption. A wide_aspect_ratio may indicate the display aspect ratio of the caption. In some embodiments, an aspect ratio of "4:3" or "16:9" may be indicated. A url_flag may indicate whether a URL capable of acquiring the information related to the caption is present and, when the value thereof is 1, a URL_length field, a URL_text field, etc. may be present. The caption_service_number may include the service number of the caption if the type of the caption is CEA-708. The URL_length may indicate the length of the following URL_text( ). The URL_text may include a URL capable of acquiring the information related to the caption. It is possible to acquire the information related to the caption through this URL over broadband.

In some embodiments, the values/fields/information of the broadcast program related information may be omitted or may be configured in other formats.

FIG. 21 is a diagram showing a method of signaling 3-dimensional (3D) related information according to an embodiment of the present invention If a broadcast service supports 3D, the service may include a plurality of video service components and the video service components may include views for providing a 3D service. This view may include a left view or a right view. Information related to 3D of this service may be signaled.

To this end, an @schemeIdURI field of the above-described descriptor may have a value of urn:atsc3.0:3Dvideo:201x. This may be a value for identifying that the descriptor is a descriptor for 3D related information.

An @value field of the above-described descriptor may have the same value as the illustrated embodiment (t21010). A minDisplay value may be the smallest value of the minimum disparity values of the views or pictures included in the service, in order to overlay graphics on a 3D view. In some embodiments, if 3D related information describes a service component, the minDisplay value may indicate the minimum disparity value of the view of the service component. The minDisplay value may be expressed in the form of two's complement integer or most significant bit first in a range of [−128, +127], in some embodiments.

A maxDisplay value may be the largest value of the maximum disparity values of the views included in the service. In some embodiments, if 3D related information describes a service component, the maxDisplay value may indicate the maximum disparity value of the view of the service component or the range of the maximum disparity value. The maxDisplay value may be expressed in the form of two's complement integer or most significant bit first in a range of [−128, +127], in some embodiments.

A disparityTypeTransition value may indicate that the values of the parameters (maxDisparity, minDisparity, etc.) related to the disparity of 3D video in the service or service component may be changed. A 2D3DTransition value may be a flag indicating that the view in the service or service component transitions from 2D to 3D. A 3D2DTransition value may be a flag indicating that the view in the service or service component transitions from 3D to 2D.

In some embodiments, information indicating a view position of the view of the service component may be added. That is, values indicating whether the view is a left view or a right view or the order of the view from the left side may be further added.

3D related information may include 3D elements and may be delivered in signaling information such as ROUTE, MMT or 3GPP (t21020). The signaling information such as ROUTE, MMT or 3GPP may include the above-described signaling information (USBD, MPD, MMTP message, etc.).

The 3D elements may include @minDisplay, @maxDisplay, @disparityTypeTransition, @2D3DTransition and/or @3D2DTransition. These fields may have the same definitions as the above-described values.

The 3D related information may be configured in the same format as the illustrated embodiment (t21030) and may be delivered in the signaling information, such as ROUTE, MMT and 3GPP, delivered in binary format.

An included_region_disparity_info field may indicate whether video sample (e.g., picture, etc.) related region disparity information is included in the signaling information or video data (e.g., SEI message, etc.). A maxDisparity_flag field may indicate whether a maxDisparity field is present in the descriptor. A disparity_type_transition_flag field may indicate that the values of the parameters (maxDisparity, minDisparity, etc.) related to the disparity of 3D video in the service or service component may be changed. A 2d_3d_transition_flag field may be a flag indicating that the video in the service or service component transitions from 2D to 3D. A 3d_2d_transition_flag field may be a flag indicating that the video in the service or service component transitions from 3D to 2D. The minDisparity field and/or maxDisparity field may be equal to the above-described minDisplay field and/or maxDisplay field.

In some embodiments, the values/fields/information of the broadcast program related information may be omitted or may be configured in other formats.

FIG. 22 is a diagram showing a part of a USBD according to another embodiment of the present invention.

The present invention proposes a method of signaling capability information of service components included in a service or a broadcast service. In addition, the present invention proposes a method of signaling video/audio/closed caption information of a service/service component. In addition, the present invention proposes a method of signaling HEVC video related information of a service/service component. In addition, the present invention proposes a method of signaling information on an SMPTE-TT or CEA-809 based closed caption of a service/service component. In addition, the present invention proposes a method of signaling information on 3D, scalable content, component group, real-time/non-real-time content, accessibility and view configuration of a display region and target screen of a service/service component. In addition, the present invention proposes a method of signaling HDR (High Dynamic Range), WCG (wide color gamut), HFR (High Frame Rate) and Pull Down Recovery Configuration information of a service/service component. The present invention proposes a method of signaling 3D audio, AC-4 and MPEG-H related information of a service/service component. In addition, the present invention proposes a method of signaling picture in picture (PIP) related information of a service/service component. Spatial relationship description (SRD) related information of PIP, display priority information, SRD signaling information between different content sources, signaling information of a display region of each view and signaling information of the role of each view may be signaled.

The above-described information may be delivered in the SLT or the other service signaling information, in some embodiments. In some embodiments, this information may be delivered in the USBD according to MMT or ROUTE. In some embodiments, this information may be defined as one ROUTE SLS and delivered along with the other SLSs or be defined as one MMTP SLS and delivered in one of the above-described MMTP messages. In some embodiments, this information may be delivered in the MPD and, in this case, may be delivered in the above-described EssentialProperty and/or SupplementalProperty. In some embodiments, this information may be included in the above-described MPT message of the MMTP message or may be delivered in one of separately defined MMTP messages. In some embodiments, this information may be defined and delivered in various descriptors of XML or binary format and include elements. This information may be delivered in signaling information such as ROUTE, MMT or 3GPP. This information will be described in detail below.

The USBD of the MMT or ROUTE may include a ComponentInfo element in some embodiments. The ComponentInfo element has been described above. In some embodiments, the ComponentInfo element may extend to further include the illustrated fields.

In the illustrated embodiment, the ComponentInfo element may further include @componentGroupId, @essentialIndicator, @dependentComponentID, @protocolType, @rt, @targetDevice, @componentCodec, @componentProfile, @componentLang, @width, @height, Accessibility, Capability, Rating, Targeting, ComponentDescription and/or ComponentProperty. In some embodiments, only some of the added fields may be added to the ComponentInfo element.

The @componentGroupId may be an identifier of a component group. Here, the component group may be a collection of components. The components included in the component group may indicate the same scene or may be combined to generate a representation. For example, service components including music, dialog and sound effects used to provide complete audio may be grouped into one component group. In addition, service components including a left view and a right view of a 3D view may be grouped into one component group.

@essentialIndicator may indicate whether the component is essential for the service. When the value of this field is 1, the component may be essential for the service. A @dependentComponentID may indicate identifier(s) of dependent component(s). For example, in an enhanced video component, this field may indicate identifier(s) of base video component(s).

@protocolType may indicate a transport protocol for delivering the component. For example, this may indicate ROUTE or MMT protocol. @rt may indicate whether the component is a real-time component or not.

@targetDevice may indicate a target device of the component. For example, if the value of this field is 0, 1, 2 or 3, this may indicate that the component is a component for a primary device, a companion device, a primary & companion device or an inset of a primary screen.

@componentCodec may provide codec information of the component. @componentProfile may indicate the profile of the component. @componentLang may indicate a language used in the component. This field may be particularly used in audio and closed caption components. @width may indicate the width of a video media presentation delivered by the video component. @height may indicate the height of the video media presentation delivered by the video component.

Accessibility may provide accessibility related information of the component. Capability may provide capability related information of the component. Rating may provide rating related information of the component. Targeting may provide targeting or personalization related information of the component. ComponentDescription may provide component description information of the component. This information may include codec dependent encoding parameters. ComponentProperty may provide component attributes for processing the component.

The above-described @componentType field of the ComponentInfo element may indicate the type of the component and, when the value thereof is 0, 1, 2 or 3, this may indicate that the components are respectively audio, video caption or application components.

In addition, the @componentRole field may indicate the role of the component. This role may be indicated according to the indicated component type. In the case of an audio component, when the value of this field is 1, 2, 3, 4, 5, 6 or 7, this may indicate that the audio components respectively serve the roles of complete main, music, effect, dialog, commentary, visually impaired, hearing impaired, voice over and subset. Here, the visually impaired/hearing impaired may mean that audio components are audio components for persons who are visually/hearing impaired. The voice over may mean that the audio component serves to describe a video component.

In the case of a video component, the video component may indicate primary video, alternate camera view, sign language, 3D left view, 3D right view, 3D video depth information and video including captioning according to the value of this field. In the case of a caption component, the caption component may indicate roles such as main, alternate, supplementary, normal and easy readers according to the value of this field.

In some embodiments, the remaining portions of the above-described USBD of MMT or ROUTE may also be changed. Such changes may be combined according to the number of cases. In some embodiments, the USBD may further include @providerid, @serviceCategory, @spIndicator, @serviceStatus, @shortServiceName and/or capabilityCode.

The @providerid may identify the service provider of the service. The @serviceCategory may indicate the category of the service. The @spIndicator may be equal to the above-described @protected attribute. The @serviceStatus may be equal to the above-described @servicestatus attribute. The @shortServiceName may indicate the short name of the service. The capabilityCode may indicate capability or capability group necessary for the receiver to provide a meaningful media presentation of the service.

In some embodiments, the USBD may further include @majorChannelNo, @minorChannelNo and/or @serviceLang in addition to the above-described channel elements.

The @majorChannelNo and @minorChannelNo may indicate the major/minor channel number of the service. The @serviceLang may indicate a primary language of the service.

In some embodiments, the USBD may further include a dashComponent element instead of the above-described routeComponent and broadbnadComponet. The dashComponent element may include @fullMPDUri, @sTSIDUri and/or deliveryMethod elements.

The @fullMPDUri may provide reference information of the MPD for the service components delivered over a broadcast network or broadband network. The @sTSIDUri may provide transport session information of the service component of the service. The deliveryMethod may provide delivery related information of the service components of the service. As described above, elements of the components delivered over broadcast/broadband network and/or basePattern information thereof may be further included.

FIG. 23 is a diagram showing a part of an MP table according to an embodiment of the present invention.

The above-described MPT message may deliver an MP table. As described above, information such as accessibility, 3D and captioning may be delivered through the MMTP message. As illustrated, the information may be delivered in the MPT message as a portion thereof or may be delivered through a separately defined MMTP message as MMT signaling. This information and a delivery method thereof will be described in detail below.

This information may be delivered within the MPT message or the other MMTP message in the format of a descriptor and, in some embodiments, these descriptors may correspond to asset descriptors. In addition, these descriptors may be delivered in DVB SI service signaling such as SDT or EIT or may be delivered along with DVB SI service signaling such as SDT or EIT.

In some embodiments, in the MMT, information on a service component (corresponding to an asset) may be signaled as illustrated. The MMTP message may further include the below-described fields.

An asset_role_flag field may indicate whether role information of the service component (asset) is included. An asset_target_flag field may indicate whether target screen information of the service component is included. An asset_group_flag field may indicate whether the service component belongs to a specific component group. When the service component is included in the specific component group, the value of this field may be 1. An rt_flag field may indicate whether the service component is transmitted in real time or in non-real time. If the value of this field is 1, this may indicate that the service component is transmitted in real time.

An asset_role field may indicate the role of the service component. For example, when the value of this field is 0, 1, 2, 3, 4, 5, 6 or 7, this may indicate that the service component serves the role of primary video, alternate camera view, another alternate video component, sign language, follow subject video, 3D left view, 3D right view or 3D depth information.

An asset_target field may indicate a target device of the service component. This may have the same definition as the above-described @targetDevice. The asset_group_id field may provide the identifier of the component group including the service component. The component group has been described above.

FIG. 24 is a diagram showing an asset group descriptor according to an embodiment of the present invention.

The asset group descriptor may describe a component group (asset group) in delivery of a service through an MMT protocol. This descriptor may be delivered through the same path as the above description.

The asset group descriptor may include an asset_group_id field for identifying the component group, a num_of_accessiblity field indicating the number of components (assets) included in the component group and/or an asset_id( ) for identifying each component.

FIG. 25 is a diagram showing accessibility information according to an embodiment of the present invention.

Accessibility information may include information related to accessibility of the service or service component. The accessibility information may be defined in the form of one of the descriptors according to the above-described embodiments or may be defined in the form of an element.

In the illustrated embodiment (t25010), the accessibility information may be defined in the form of a descriptor. @schemeIdUri may be a URI for identifying that the descriptor has an accessibility scheme related to accessibility information. In this case, @schemeIdUri may have a value of urn:atsc3.0:accessibility:201x. @value may have values according to the meaning of accessibility scheme. These values will be described below. @id may indicate the identifier of the descriptor. If the same identifier is used, the same scheme ID, value and parameter may be included.

The illustrated embodiment (t25020) may indicate the parameters of the above-described @value. Visually impaired may indicate that a service component is targeted at a viewer who is visually impaired or a viewer with poor vision. Hearing impaired may indicate that a service component is targeted at a hearing-impaired viewer or a viewer with poor hearing. enhanced-audio-intelligibility may indicate whether the audio service component is an audio service component enhanced in terms of intelligibility. 3D supported may indicate whether the service component supports a 3D function. In some embodiments, this may indicate that the service component is included in a 3D service. Normal may indicate whether the service component is a service component for normal viewers (mainly with respect to the closed caption component). Easy reader may indicate whether the service component is an easy reader type service component (mainly with respect to the closed caption component). The easy reader may mean closed captioning which can be easily read.

In some embodiments, the accessibility information may be defined in the form of an accessibility element having the parameters of the above-described @value as sub fields.

In the illustrated embodiment (t25030), the accessibility information may be defined in the form of a descriptor. This descriptor may be delivered in MMT signaling information as described above. This descriptor may be delivered in the above-described MPT message or the other MMTP message. This descriptor may be a type of asset descriptor.

A num_of_accessiblity field may indicate the number of following accessiblity_codes. The accessiblity_code field may indicate accessibility related information. The accessibility related information may be expressed by an accessibility code. For example, if the accessibility code has a value of 0x00, 0x01 or 0x02, these may indicate visually impaired, hearing impaired or 3D support. The accessibility information was as described above. Values 0x03-0xFF may be reserved for future use.

Figure 26:
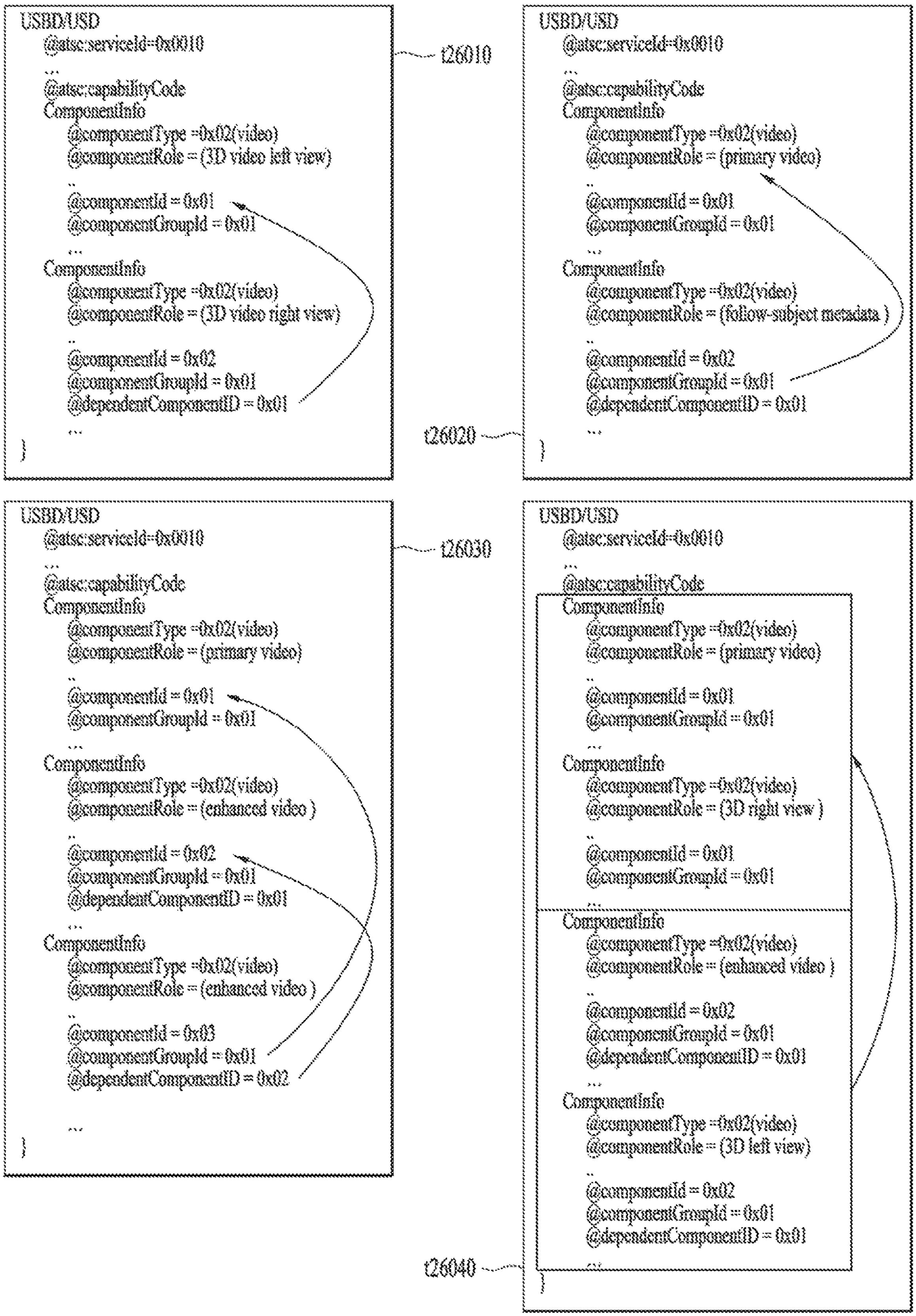
FIG. 26 is a diagram showing ComponentInfo elements in a USBD according to an embodiment of the present invention.

FIG. 26 is a diagram showing ComponentInfo elements in a USBD according to an embodiment of the present invention.

In the illustrated embodiment (t26010), components configuring 3D video are signaled. A first component may be a video component (0x02, video), may indicate that the role of a 3D left view is served (@componentRole=3D video left view) and may have a component ID of 0x01. A second component may also be a video component (0x02, Video), may indicate that the role of a 3D right view is served (@componentRole=3D video right view), and may have a component ID of 0x02.

The two service components may be associated with each other as service components configuring one 3D video and thus may be grouped into the same component group. This component group may have an identifier of 0x01 and this content may be signaled in each componentInfo. Element. If a second component has dependency (dependencyu) on a first component, the @dependentComponentID of the second component may have a value of 0x01 to indicate the component ID of the first component.

In the illustrated embodiment (t26020), follow-subject metadata on another component for a specific video component may be signaled. The first component may be a video component to serve the role of primary video. The second component may be a component which serves the role of the follow-subject metadata of the first component. This role may be signaled and @dependentComponentID may indicate the component ID of the first component. In addition, as the associated components, the first/second component may be included in the same component group (0x01).

In the illustrated embodiment (t26030), one base video component and two enhanced video components may be signaled. If one enhanced video has dependency on the base video and the other enhanced video has dependency on the first enhanced video, as shown, this relation may be signaled using the @dependentComponentID field. In addition, since the video components may configure the same scene, these may be included in the same component group.

In the illustrated embodiment (t26040), the role of a 3D component for two service components and the role in scalable coding are signaled. Since the video components may configure the same scene, these may be included in the same component group.

A first service component (ID=0x01) may serve the roles of a base video component and a right view of a 3D service. For the first service component, two ComponentInfo elements may be described. The elements may have the same service component ID (ID=0x01).

A second service ID (ID=0x02) may serve the roles of an enhanced video component and a left view of a 3D service. Similarly, two ComponentInfo elements may describe the second service component. These elements may have the same service component ID (ID=0x02). In addition, the second service component may have dependency on the first component. The @dependentComponentID may indicate the ID of the first service component.

FIG. 27 is a diagram showing component property information according to an embodiment of the present invention.

The component attribute information may include information related to the attributes of the service or the service component. The component attribute information may be in the form of one of the descriptors according to the above-described embodiments or in the form of an element.

The component attribute information may be referred to as view configuration information in some embodiments. In some embodiments, the component attribute information may mean view configuration information of a video component. Here, the component is a video component and may be a portion of multiview video. If the video component is a portion of a video array, the @role attribute of the view configuration information may indicate the <x, y>-th video component of the <n, m> array.

In the illustrated embodiment (t2710), the component attribute information may be defined in the form of a descriptor. @schemeIdUri may be a URI for identifying that the descriptor has a component attribute scheme related to the component attribute information. In this case, @schemeIdUri may have a value of urn:atsc3.0:view-conf:201x. @value may have values according to the meaning of the component attribute scheme. These values may be referred to as parameters and may be distinguished by ‘,’. These values will be described below. @id may indicate the identifier of the descriptor. If the same identifier is used, the same scheme ID, value and parameter may be included.

The illustrated embodiment (t27020) may indicate the parameters of the above-described @value. View_x and/or View_y may indicate the origin point of the view of the video component based on the top left of the screen. The fields may indicate the x and y coordinates of the origin point of the view. View_width and View_height may indicate the width and/or height of the view of the video component. View_total_width and/or View_total_height may indicate width and/or height of the entire region in which the video array is displayed based on the top left of the screen. View_display_priority may indicate the priority of the view of the video component. Priority may be priority in display of the view. If views overlap, a view having higher priority may be displayed in front of the other views. That is, the view having higher priority may be overlaid on overlapping portions of the other views. As the value of this field decreases, priority may be regarded as increasing. A view having a value of 0 may be displayed foremost on the screen. A Source_id may be an identifier of the source of the video component. If simultaneously displayed multiview (video array) is divided into several video components to be delivered, the source IDs of the video components may be the same.

In some embodiments, the component attribute information may be defined in the form of a component attribute element having the parameters of the above-described @value as subfields.

In the illustrated embodiment (t27030), the component attribute information may be defined in the form of a descriptor. This descriptor may be delivered in MMT signaling information as described above. This descriptor may be delivered in the above-described MPT message or the other MMTP message. This descriptor may be a kind of asset descriptor.

view_x, view_y, view_width, view_height, total_width, total_height, source_id and/or view_priority were as described above, total_width, total_height, and view_priority may be equal to view_total_width, view_total_height, and view_display_priority, respectively.

The source_id_flag may indicate presence of the source_id. The view_total_info_flag field may indicate whether information on the area in which the simultaneously displayed multiview is displayed is included. According to this field, there are total_width and total_height. The view_priority_flag field may indicate whether priority information of the video component is included. According to this field, there is view_priority.

Figure 28:
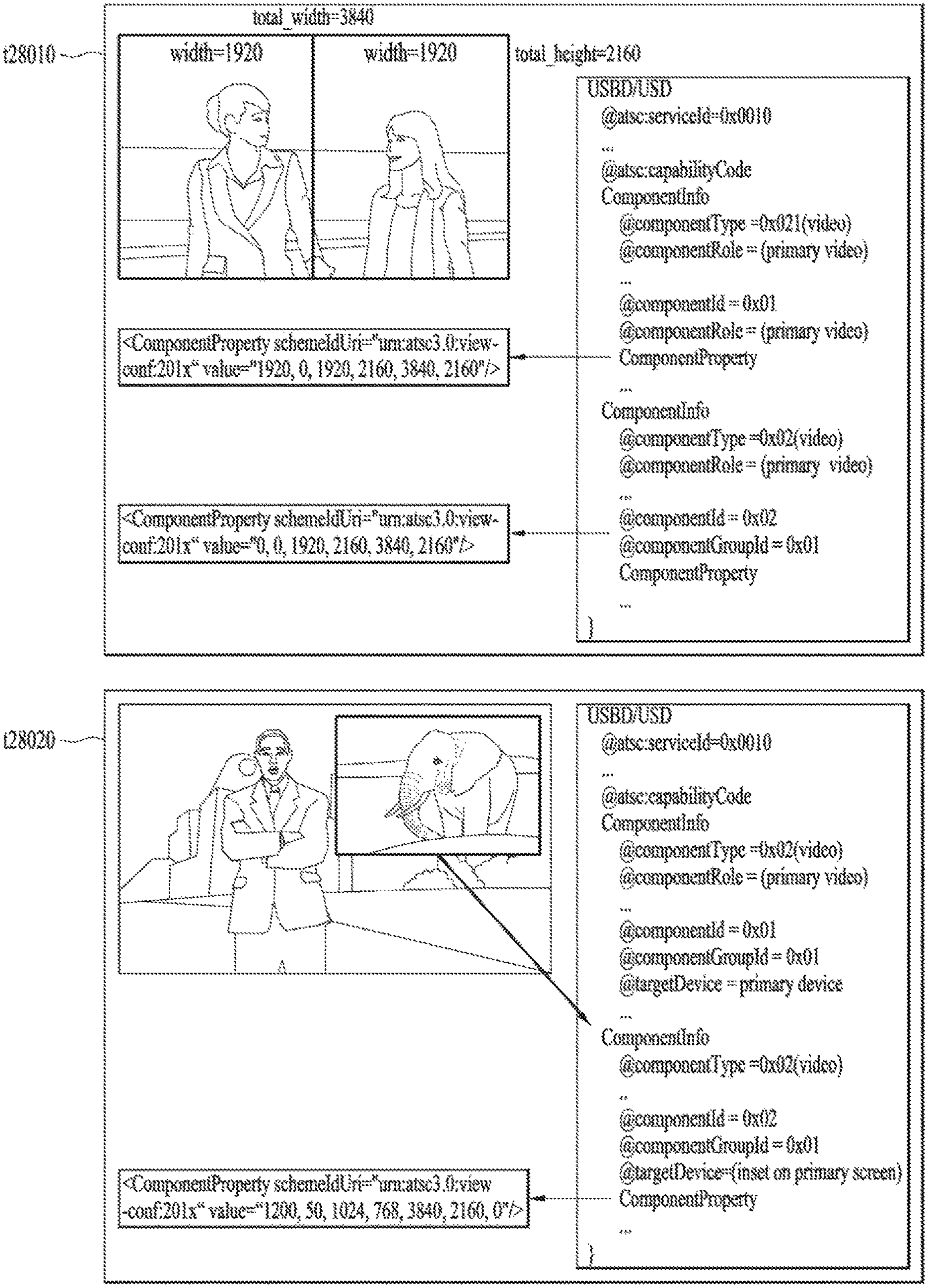
FIG. 28 is a diagram showing usage of component property information according to an embodiment of the present invention.

FIG. 28 is a diagram showing usage of component property information according to an embodiment of the present invention.

In the illustrated embodiment (t28010), one screen may be divided into two video components and delivered. In this case, view configuration information of each video component may be signaled as a componentProperty element as described above. These configure one scene and thus have the same componentGroupId value. The componentProperty element of the ComponentInfo element of each component may have the above-described view configuration information.

Both components have a scheme ID of urn:atsc3.0:view-conf:201x and @value may have "1920, 0, 1920, 2160, 3840, 2160", and "0, 0, 1920, 2160, 3840, 2160". The parameters of @value may have meanings according to the definitions of the above-described parameters in this order.

In the illustrated embodiment (t28020), a video component including sign language may be delivered along with a video component for providing one main video. In this case, the sign language video component may provide information where the sign language view is displayed in a region in which main video is displayed. This information may be signaled in the form of the above-described view configuration information.

Similarly, PIP (Picture in Picture) may also provide view configuration information similarly to the sign language. Here, the sign language or the PIP view is displayed in front of the main video and thus may have higher priority than the main video. These components may be included in the same component group and the sign language component or the PIP component may indicate that the @targetDevice attribute is "inset of the primary screen".

The view configuration information of the sign language component or the PIP component may have a scheme ID of urn:atsc3.0:view-conf 201x and @value may have "1200, 50, 1024, 768, 3840, 2160, 0". The parameters of the @value may have meanings according to the definitions of the above-described parameters in this order.

The above-described capability information may also be signaled. The capability information may be in the form of one of the descriptors according to the above-described embodiments or in the form of an element. The capability scheme ID of the capability information may be defined and the values thereof may be defined. In addition, the capability information may be defined in the form of a capability element having the parameters of @value as sub fields. The capability information may be defined in the form of a descriptor and may be delivered in the MMT signaling information. This descriptor may be delivered in the above-described MPT message or the other MMTP message. This descriptor may be a kind of asset descriptor. The fields, parameters and structure of the capability were as described above.

FIG. 29 is a diagram showing HEVC video component description information according to an embodiment of the present invention.

The HEVC video component description information may include information related to HEVC video of the service or the service component. The HEVC video component description information may be referred to as HEVC video information. The HEVC video information may include a component related encoding parameter or a parameter for rendering the component. The HEVC video information may be in the form of one of the descriptors according to the above-described embodiments or in the form of an element.

In the illustrated embodiment (t29010), the HEVC video information may be defined in the form of a descriptor. @schemeIdUri may be a URI for identifying that the descriptor has an HEVC video scheme related to HEVC video information. In this case, @schemeIdUri may have a value of urn:atsc3.0:hevc:201x. @value may have values according to the meaning of the HEVC video information scheme. These values will be described below. @id may indicate the identifier of the descriptor. If the same identifier is used, the same scheme ID, value and parameter may be included.

The illustrated embodiment (t29020) may indicate the parameters of the above-described @value.

profile_space may be equal to the general_profile_space value included in the SPS of the bitstream with respect to the HEVC video stream. An HEVC temporal video subset or HEVC temporal video sub-bitstream may be equal to the sub_layer_profile_space value included in the SPS of the bitstream.

tier_flag may be equal to the general_tier_flag value included in the SPS of the bitstream with respect to the HEVC video stream. An HEVC temporal video subset or HEVC temporal video sub-bitstream may be equal to the sub_layer_tier_flag value included in the SPS of the bitstream.

profile_idc may be equal to the general_profile_value included in the SPS of the bitstream with respect to the HEVC video stream. An HEVC temporal video subset or HEVC temporal video sub-bitstream may be equal to the sub_layer_profile_idc value included in the SPS of the bitstream.

profile_compatibility_indication may be equal to the general_profile_compatibility_flag[i] value included in the SPS of the bitstream with respect to the HEVC video stream. An HEVC temporal video subset or HEVC temporal video sub-bitstream may be equal to the sub_layer_profile_compatibility_flag[i] included in the SPS of the bitstream.

progressive_source_flag may be equal to the general_progressive_source_flag value included in the SPS of the bitstream with respect to the HEVC video stream. An HEVC temporal video subset or HEVC temporal video sub-bitstream may be equal to the sub_layer_progressive_source_flag value included in the SPS of the bitstream interlaced_source_flag may be equal to the value included in the SPS of the bitstream with respect to the HEVC video stream. An HEVC temporal video subset or HEVC temporal video sub-bitstream may be equal to the sub_layer_interlaced_source_flag value included in the SPS of the bitstream.

non_packed_constraint_flag may be equal to the general_non_packed_constraint_flag value included in the SPS of the bitstream with respect to the HEVC video stream. An HEVC temporal video subset or HEVC temporal video sub-bitstream may be equal to the sub_layer_non_packed_constraint_flag included in the SPS of the bitstream.

frame_only_constraint_flag may be equal to general_frame_only_constraint_flag value included in the SPS of the bitstream with respect to the HEVC video stream. An HEVC temporal video subset or HEVC temporal video sub-bitstream may be equal to the sub_layer_frame_only_constraint_flag included in the SPS of the bitstream.

reserved_zero_44 bits may be equal to the general_reserved_zero_44 bits value included in the SPS of the bitstream with respect to the HEVC video stream. An HEVC temporal video subset or HEVC temporal video sub-bitstream may be equal to the sub_layer_reserved_zero_44 bits included in the SPS of the bitstream.

level_idc may be equal to the general_level_idc value included in the SPS of the bitstream with respect to the HEVC video stream. An HEVC temporal video subset or HEVC temporal video sub-bitstream may be equal to the sub_layer_level_idc value included in the SPS of the bitstream.

HEVC_still_present_flag may indicate whether the HEVC video stream or HEVC highest temporal sub-layer representation includes HEVC still pictures.

HEVC_24 hr_picture_present_flag may indicate whether the HEVC video stream or HEVC highest temporal sub-layer representation includes HEVC 24-hours pictures.

temporal_id_min and/or temporal_id_max may indicate the smallest temporalId value and/or the largest temporalId value among HEVC AUs included in the HEVC video stream.

In some embodiments, the HEVC video information may be defined in the form of an HEVC video information element having the parameters of the above-described @value as sub fields.

In the illustrated embodiment (t29030), the HEVC video information may be defined in the form of a descriptor. This descriptor may be delivered in MMT signaling information as described above. This descriptor may be delivered in the above-described MPT message or the other MMTP message. This descriptor may be a type of asset descriptor. If an MMT asset is an HEVC video stream component, the asset type of the MP table may be assigned a value corresponding to the HEVC video stream.

profile_space, tier_flag, profile_idc, profile_compatibility_indication, progressive_source_flag, interlaced_source_flag, non_packed_constraint_flag, frame_only_constraint_flag, reserved_zero_44 bits, level_idc, HEVC_still_present_flag, HEVC_24 hr_picture_present_flag, temporal_id_min and temporal_id_max may be included in the descriptor and the meanings thereof were as described above.

FIG. 30 is a diagram showing HEVC timing & HRD information according to an embodiment of the present invention.

The HEVC timing & HRD information may include timing information and HRD description associated with the HEVC video stream component. The HEVC timing & HRD information may be in the form of one of the descriptors according to the above-described embodiments or in the form of an element. This may be expressed by the above-described componentProperty element.

In the illustrated embodiment, the HEVC timing & HRD information may be defined in the form of a descriptor. @schemeIdUri may be a URI for identifying that the descriptor has a scheme related to the HEVC timing & HRD information. In this case, @schemeIdUri may have a value of urn:atsc3.0:hevc-timing:201x. @value may have values according to the meaning of the scheme. These values will be described below. @id may indicate the identifier of the descriptor. If the same identifier is used, the same scheme ID, value and parameter may be included.

The illustrated embodiment (t30010) may indicate the parameters of the above-described @value. hrd_management_valid_flag may indicate whether Buffering Period SEI and Picture Timing SEI messages are present in the HEVC video stream or the HEVC highest temporal sub-layer representation. picture_and_timing_info_present_flag may indicate whether 90 kHz_flag for accurate mapping with a 90-kHz system clock and parameters associated therewith are included in this descriptor. 90 kHz_flag may indicate whether frequency of the time base of the HEVC video stream is 90 KHz or not. N and/or K may provide N and K parameter values related to a time scale. In the HEVC video stream or the HEVC highest temporal sub-layer representation, the frequency of the HEVC time base may be defined by the vui_time_scale element of the VUI parameter. A relation between HEVC time_scale and STC may be defined by the N and K parameters and may be expressed by HEVC time_scale=(N×system_clock_frequency)/K. If 90 kHz_flag is 1, N may have a value of 1 and K may have a value of 300. If 90 kHz_flag is 0, N and K values may be provided by the N and K fields. num_units_in_tick may be coded into the vui_num_units_in_tick field of the VUI parameter, and the value of this field is applicable to the HEVC video stream or the HEVC highest temporal sub-layer representation related to the HEVC timing & HRD description information.

In some embodiments, HEVC timing & HRD information may be defined in the form of an HEVC timing & HRD information element having the parameters of the above-described @value as sub fields.

In the illustrated embodiment (t30020), the HEVC timing & HRD information may be defined in the form of a descriptor. This descriptor may be delivered in MMT signaling information as described above. This descriptor may be delivered in the above-described MPT message or the other MMTP message. This descriptor may be a type of asset descriptor.

hrd_management_valid_flag, picture_and_timing_info_present_flag, 90 kHz_flag, N, K and/or num_units_in_tick may be included in this descriptor and the meanings thereof were as described above.

FIG. 31 is a diagram showing caption information according to an embodiment of the present invention.

The caption information may include caption description information if the service component is a closed caption stream component. The caption information may be in the form of one of the descriptors according to the above-described embodiments or in the form of an element. This may be indicated by the above-described componentProperty element.

In the illustrated embodiment, the caption information may be defined in the form of a descriptor. @schemeIdUri may be a URI for identifying that the descriptor has a caption scheme related to the caption information. In this case, @schemeIdUri may have a value of urn:atsc3.0:caption:201x. @value may have values according to the meaning of the caption information. These values will be described below. @id may indicate the identifier of the descriptor. If the same identifier is used, the same scheme ID, value and parameter may be included.

The illustrated embodiment (t31010) may indicate the parameters of the above-described @value. caption_codec may indicate the encoding type of the caption component. In some embodiments, "CEA-608", "CEA-708", "SMPTE-TT", etc. may be indicated. lang may include language information of the caption component. A caption_service_number value may include the service number of the caption if the type of the caption is CEA-708. An easy_reader_flag value may indicate whether the caption component is of an easy_reader type. An aspect_ratio value may indicate a display aspect ratio of the caption component. In some embodiments, an aspect_ratio of "4:3" or "16:9" may be indicated. 3D supported may indicate whether the caption component supports 3D.

In some embodiments, the caption information may be defined in the form of a caption element having the parameters of the above-described @value as sub fields.

In the illustrated embodiment (t31020), the caption information may be defined in the form of a descriptor. This descriptor may be delivered in MMT signaling information as described above. If the MMT asset is a closed caption component, the asset type of the MP table may be assigned a value corresponding to a closed caption stream. In some embodiments, the asset type of the MP table may include a descriptor illustrated as an asset descriptor while indicating the value corresponding to the HEVC video stream. In this case, this may indicate that closed caption data is included in the HEVC video bitstream. This descriptor may be a type of asset descriptor.

caption_lang, caption_codec, easy_reader, wide_aspect_ratio, 3d_supported and/or caption_service_number may be included in this descriptor and the meanings thereof were as described above. caption_lang, easy_reader and wide_aspect_ratio may be equal to the above-described lang, easy_reader_flag, and aspect_ratio. If the value of the caption_codec is 0x01, 0x02, 0x03, 0x04 or 0x05, this may indicate that the encoding types of "CEA-608", "CEA-708", "SMPTE timed text", "EBU-TT-D" or "CFF-TT" were respectively used. The url_flag, URL_length and URL_text fields may be equal to those of the above-described caption information.

For example, if the closed caption component includes an English caption based on SMPTE-TT, the descriptor may have a scheme ID of "urn:atsc3.0:caption:201x" and @value may have values of "SMPTE-TT, ENG, false, 4:3,false". The parameters of @value may have meanings according to the definitions of the above-described parameters in this order.

If the closed caption data based on CEA-708 is included in the bitstream of the HEVC video stream component, the closed caption information may be signaled by the above-described method, along with the above-described HEVC video data related information.

FIG. 32 is a diagram showing HDR information according to an embodiment of the present invention.

The HDR information may include HDR parameter information if the service component is a video component. The HDR information may be in the form of one of the descriptors according to the above-described embodiments or in the form of an element. This may be indicated by the above-described componentProperty element or ComponentDescription element.

In the illustrated embodiment, the HDR information may be defined in the form of a descriptor. @schemeIdUri may be a URI for identifying that the descriptor has an HDR scheme related to the HDR information. In this case, @schemeIdUri may have a value of urn:atsc3.0:hdr:201x. @value may have values according to the meaning of the HDR scheme. These values will be described below. @id may indicate the identifier of the descriptor. If the same identifier is used, the same scheme ID, value and parameter may be included.

The illustrated embodiment (t32010) may indicate the parameters of the above-described @value. OETF_type may indicate the type of the source OETF (opto-electronic transfer function) of this video data. The values 1, 2 and 3 of this field may correspond to ITU-R BT.1886, ITU-R BT.709, and ITU-R BT.2020 types, respectively. The other values may be reserved for future use.

max_mastering_display_luminance may indicate the peak luminance value of the mastering display of this video data. This value may be an integer from 100 to 1000. min_mastering_display_luminance may indicate the minimum luminance value of the mastering display of this video data. This value may be a fractional number from 0 to 0.1.

average_frame_luminance_level may indicate the average value of the luminance value of one video sample. In addition, this field may indicate a maximum value among the average values of the luminance levels of the samples belonging to a video track (stream) or a sample group. max_frame_pixel_luminance may indicate a maximum value of the pixel luminance values of one video sample. In addition, this field may indicate the largest value of the maximum values of the pixel luminance belonging to a video track (stream) or a sample group.

hdr_type_transition_flag may be a flag indicating whether the HDR information of this video data is changed and thus another type of HDR information is applied. For example, if the HDR parameters which were oeft:3, max_lum:100, min_lum:0.5, max_frame_lum:0, max_pixel_lum:0 are changed to oeft:1, max_lum:1000, min_lum:0.05, max_frame_lum:0, max_pixel_lum:0, this field may have a true value. hdr_sdr_transition_flag may be a flag indicating whether this video data transitions from HDR to SDR. sdr_hdr_transition_flag may be a flag indicating whether this video data transitions from SDR to HDR. sdr_compatibility_flag may be a flag indicating whether this video data is compatible with an SDR decoder or an SDR display.

In some embodiments, the HDR information may be defined in the form of an HDR element having the parameters of the above-described @value as sub fields.

In the illustrated embodiment (t32020), the HDR information may be defined in the form of a descriptor. This descriptor may be delivered in MMT signaling information as described above. This descriptor may be delivered in the above-described MPT message or the other MMTP message. This descriptor may be a type of asset descriptor. In addition, this descriptor may be delivered in or along with DVB SI service signaling such as SDT or EIT.

OETF_type, max_mastering_display_luminance, min_mastering_display_luminance, average_frame_luminance_level, max_frame_pixel_luminance, hdr_type_transition_flag, hdr_sdr_transition_flag, sdr_hdr_transition_flag and/or sdr_compatibility_flag may be included in this descriptor and the meanings thereof were as described above.

In some embodiments, HDRTypeTransitionFlag, HDRSDRTransitionFlag, and SDRHDRTransitionFlag may not be simultaneously true. For example, if the HDRSDRTransitionFlag value is true, the HDRTypeTransitionFlag, SDRHDRTransitionFlag value may be false.

FIG. 33 is a diagram showing WCG information according to an embodiment of the present invention.

If the service component is a video component, the WCG information may include WCG information related thereto. The WCG information may be in the form of one of the descriptors according to the above-described embodiments or in the form of an element. This may be indicated by the above-described componentProperty element or ComponentDescription element.

The WCG information may be referred to as color gamut information. The color gamut information may include two types: container color gamut and content color gamut. The container color gamut may include color gamut related information used in an encoding or decoding step and/or a process of mapping a decoded pixel value. The content color gamut may include information on the color gamut of an original source. That is, the content color gamut may indicate a valid color space volume applied to actual content.

In the illustrated embodiment (t33010), the content WCG information may be defined in the form of a descriptor. @schemeIdUri may be a URI for identifying that the descriptor has a content WCG scheme related to the content WCG information. In this case, @schemeIdUri may have a value of urn:atsc3.0:wcg:content:201x. @value may have values according to the meaning of the content WCG scheme. These values will be described below. @id may indicate the identifier of the descriptor. If the same identifier is used, the same scheme ID, value and parameter may be included.

The illustrated embodiment (t33010) may indicate the parameters of the above-described @value.

contentColorGamutType may indicate the type of the color gamut of this video data. That is, this field may indicate chromaticity coordinates of source primaries. This value may be equal to color primaries of VUI (video usability information). If the value of the VUI parameter is not present, the color primary values of the VUI may be unspecified and the below-described parameters may have values.

contentColorPrimaryRx and contentColorPrimaryRy may indicate x and y coordinate values of the R-color of this video source, respectively. This may be a fractional number from 0 to 1. contentColorPrimaryGx and contentColorPrimaryGy may indicate the x and y coordinate values of the B-color of this video source, respectively. This may be a fractional number from 0 to 1. contentWhitePx and contentWhitePy may indicate the x and y coordinate values of the white point of this video source, respectively. This may be a fractional number from 0 to 1.

contentWCGTransition may be a flag whether the content color gamut of this video data transitions from WCG (Wide Color Gamut) to SCG (Standard Color Gamut). In some embodiments, this may indicate the end of the video data supporting WCG may be included in this video component. contentSCGCompatibility may be a flag indicating whether the content color gamut of this WCG video is compatible with the SCG based decoder and display.

In the illustrated embodiment (t33020), the container WCG information may be defined in the form of a descriptor. @schemeIdUri may be a URI for identifying that the descriptor has a container WCG scheme related to the container WCG information. In this case, @schemeIdUri may have a value of urn:atsc3.0:wcg:container:201x. @value may have values according to the meaning of the containerWCG scheme. These values will be described below. @id may indicate the identifier of the descriptor. If the same identifier is used, the same scheme ID, value and parameter may be included.

The illustrated embodiment (t33020) may indicate the parameters of the above-described @value. These parameters may be equal to the parameters of the content color gamut. However, these parameters may describe the container color gamut. For example, containerColorGamutType may indicate the color gamut type of this video. That is, this may indicate chromaticity coordinates of color primaries which are used upon encoding or will be used upon decoding.

containerColorPrimaryRx, containerColorPrimaryRy, containerColorPrimaryGx, containerColorPrimaryGy, containerColorPrimaryBx, containerColorPrimaryBy, containerWhitePx and containerWhitePy may indicate the x and y coordinates of the RGB colors of the color primaries and white point which is used or will be used upon encoding or decoding. That is, the coordinates of the color gamut of the container may be indicated.

containerWCGTransition may be a flag indicating whether the container color gamut of this video data transitions from WCG to SCG. In some embodiments, this may indicate that the end of the video data supporting WCG of the container is included in this video component. containerSCGCompatibility may be a flag indicating whether the container color gamut of this WCG video is compatible with the SCG based decoder and display.

In some embodiments, the content/container WCG information may be defined in the form of a content/container WCG element having the parameters of the above-described @value as sub fields.

In the illustrated embodiment (t33030), the content/container WCG information may be defined in the form of a descriptor. This descriptor may be delivered in MMT signaling information as described above. This descriptor may be delivered in the above-described MPT message or the other MMTP message. If the MMT asset is a video stream component including content supporting WCG, a descriptor illustrated as an asset descriptor may be included. In addition, this descriptor may be delivered in or along with DVB SI service signaling such as SDT or EIT.

This descriptor (t33030) may include the content WCG information and the container WCG information.

color_gamut_type may be equal to the above-described containerColorGamutType. color_space_transition_flag may be a flag indicating whether chromaticity coordinates of color primaries which are used upon encoding or will be used upon decoding transition to other chromaticity coordinates, with respect to the video samples of this video component. wcg_scg_transition_flag may be a flag indicating whether the container color gamut of the video samples of this video component transitions from WCG to SCG. For example, this may indicate whether the container color gamut transitions from BT.2020 to BT.709. scg_wcg_transition_flag may be a flag indicating whether the container color gamut of the video samples of this video component transitions from SCG to WCG. scg_compatibility_flag may be a flag indicating whether the container color gamut of the video samples of this video data is compatible with an SDR based decoder or an SDR display. That is, when an existing SCG decoder or display is used, whether the WCG video can be output without separate mapping information or upgrade while causing quality problems may be determined using this field. Since this is container color gamut information, this field may indicate whether this video data may be decoded even when the SCG based decoder/display does not know a color gamut such as BT.2020. color_primary_flag may be a flag indicating whether detailed information of chromaticity coordinates of color primaries which may be used upon encoding/decoding the video samples of this video content is present. According to the value of the color_primary_flag, a color_primaryRx field, a color_primaryRy field, a color_primaryGx field, a color_primaryGy field, a color_primaryBx field, a color_primaryBy field, a color_whitePx field and/or a color_whitePy field may be included. These fields may indicate the x and y coordinates of the RGB colors of the color primaries and white color which are used or will be used upon encoding or decoding.

content_wcg_flag may indicate whether detailed information of the content color gamut is included in this descriptor with respect to this video component. content_color_gamut_type may indicate the content color gamut type of this video stream. That is, this field may indicate the chromaticity coordinates of the original source primaries of this video data. content_color_space_transition_flag may be a flag indicating whether the chromaticity coordinates transition to other chromaticity coordinates with respect to the original source primaries of the video data of this video component. content_wcg_scg_transition_flag may be a flag indicating whether the content color gamut of the video data of this video component transitions from WCG to SCG. A content_scg_wcg_transition_flag field may be a flag indicating whether the content color gamut of the video data of this video component transitions from SCG to WCG. A content_scg_compatibility_flag field may be a flag indicating whether the content color gamut of the video data of this video component is compatible with an SCG based decoder or display. That is, if the value of this field is 1, this may indicate that the valid color gamut of this video data is compatible with SCG and mapping does not need to be performed. A content_color_primary_flag field may be a flag indicating whether detailed information of chromaticity coordinates of the original source primaries of the video data of this component is present. According to the value of the content_color_primary_flag field, a content_color_primaryRx field, a content_color_primaryRy field, a content color_primaryGx field, a content_color_primaryGy field, a content_color_primaryBx field, a content_color_primaryBy field, a content_color_whitePx field and/or a content_color_whitePy field may be included. These fields may indicate the x and y coordinates of the RGB colors of the original source primaries and white point, respectively.

In some embodiments, the above-described color_gamut_type and/or content_color_gamut_type may have the following meanings.

0: reserved/1: Rec. ITU-R BT.709-5, Rec. ITU-R BT.1361 conventional colour gamut system and extended colour gamut system, IEC 61966-2-1 (sRGB or sYCC), IEC 61966-2-4, Society of Motion Picture and Television Engineers RP 177 (1993)/2: unspecified/3: Reserved for future use/4: Rec. ITU-R BT.470-6 System M (historical), United States National Television System Committee 1953 Recommendation for transmission standards for colour television, United States Federal Communications Commission Title 47 Code of Federal Regulations (2003) 73.682 (a)/5: Rec. ITU-R BT.470-6 System B, G (historical), Rec. ITU-R BT.601-6 625, Rec. ITU-R BT.1358 625, Rec. ITU-R BT.1700 625 PAL and 625 SECAM/6: Rec. ITU-R BT.601-6 525, Rec. ITU-R BT.1358 525, Rec. ITU-R BT.1700 NTSC, Society of Motion Picture and Television Engineers 170M (2004)/7: Society of Motion Picture and Television Engineers 240M (1999)/8: Generic film (colour filters using Illuminant C)/9: Rec. ITU-R BT.2020/10-255: Reserved for future use FIG. 34 is a diagram showing HFR information/pull down information according to an embodiment of the present invention.

If this video service component supports HFR, the HFR information may include HFR information related thereto. The HFT information may be in the form of one of the descriptors according to the above-described embodiments or in the form of an element. This may be indicated by the above-described componentProperty element or ComponentDescription element. As described above, the HFR information may be included in an MPD.

In the illustrated embodiment (t34010), the HFR information may be defined in the form of a descriptor. @schemeIdUri may be a URI for identifying that the descriptor has an HFR scheme related to the HFR information. In this case, @schemeIdUri may have a value of urn:atsc3.0:hfr:201x. @value may have values according to the meaning of the HFR scheme. These values will be described below. @id may indicate the identifier of the descriptor. If the same identifier is used, the same scheme ID, value and parameter may be included.

The illustrated embodiment (t34010) may indicate the parameters of the above-described @value. SFRCompatibility may indicate whether this video component is compatible with a standard frame rate (SFR) or a legacy frame rate. SFR_HFR_Transition may indicate whether this video component includes transition from a normal frame rate (SFR or legacy frame rate) to HFR. HFR_SFR_Transition may indicate whether this video component includes transition from HFR to a normal frame rate (SFR or legacy frame rate).

The pull down information may include pull down recovery configuration information of this service component. The pull down information may be in the form of one of the descriptors according to the above-described embodiments or in the form of an element. This may be indicated by the above-described componentProperty element or ComponentDescription element.

The pull down recovery configuration will now be described. For example, if an original source is a film mode (e.g. 24p), this may be changed to another frame rate for encoding (e.g. 60i). In this case, dirty frames may be generated. The dirty frames may be generated by the following method.

All original film frames may be regarded as including two fields: one frame is for odd-numbered lines of an image and the other frame is for even-numbered lines of the image. Accordingly, there are eight fields every four film frames. Here, the four film frames may be referred to as A, B, C and D, respectively. The eight fields may be stretched to 10 fields. This may be performed by repeating the two fields (top and bottom).

The A frame may be across three fields (At, Ab, Ab), the B frame may be across two fields (Bt, Bb), the C frame may be across three fields (Ct, Ct, Cb), and the B frame may be across two fields (Dt, Db). These may be denoted by At-Ab-Ab-Bt-Bb-Ct-Ct-Cb-Dt-Db, 3-2-3-2 pull down or 3-2 pull down. Here, At may mean the top field of the A frame and Bb may mean the bottom field of the B frame.

In the "At-Ab-Ab-Bt-Bb-Ct-Ct-Cb-Dt-Db" case, the Ab-Bt frame and the Bb-Ct frame may be referred to as dirty frames. However, the receiver can confirm the original frame rate through the pull down recovery configuration. The receiver may restore the original frame rate stream from the encoded/transmitted frame rate stream. Here, restoration may be a process of eliminating the dirty frames.

The term "pull down" may be used in association with a post production process of delivering a film or video in film making/TV production. The film frame rate may be transformed into a broadcast frame rate by a broadcaster. However, the frame rate related information of the system level may include only broadcast frame rate information. Accordingly, in order to restore the original frame rate, system level signaling may signal information related to the original frame rate. For example, the original frame rate (e.g., 24p) information and/or the pull down type information (e.g., 3:2 pull down) may be included in signaling information. In addition, the video level information of the pulled-down video may request restoration to the original video.

In the illustrated embodiment (t34020), the pull down information may be defined in the form of a descriptor. @schemeIdUri may be a URI for identifying that the descriptor has a pull down scheme related to the pull down information. In this case, @schemeIdUri may have a value of urn:atsc3.0:pulldown:201x. @value may have values according to the meaning of the pull down scheme. These values will be described below. @id may indicate the identifier of the descriptor. If the same identifier is used, the same scheme ID, value and parameter may be included.

The illustrated embodiment (t34020) may indicate the parameters of the above-described @value. PullDownType may indicate the type of pull-down applied to the encoded video stream. This may be expressed by a decimal integer which is not a negative number. This field may indicate 0—reserved, 1—2:2 pull-down, 2—2:3 pull down, 3—3:2 pull-down, 4—4:4 pull-down, 5—5:5 pull-down, 6—6:4 pull-down, . . . , according to the value thereof.

PullDownTransition may indicate whether transition from the pulled-down data to the original frame rate is included in this video component. In some embodiments, this field may indicate whether the end of the pulled-down data is included in this video component.

OriginalFrameRate may indicate the original frame rate (captured frame rate) of this video data. This field may be expressed by a decimal integer which is not a negative number. This information may be provided to restore the encoding frame rate to the original frame rate. This field may indicate the original frame rate such as 0—reserved, 1—120, 2—120/1.001, 3—100, 4—60, 5—60/1.001, 6—50, 7—30, 8—30/1.001, 9—25, 10—24, 11—24/1.001, 12~14—reserved, according to the value thereof.

OriginalScanType may indicate the scanning type of the original video corresponding to this video. This field may be expressed by a decimal integer which is not a negative number. This field may indicate types such as 0—reserved, 1—interlaced, 2—progressive, and 3—unspecified according to the value thereof.

In some embodiments, the pull down information may be defined in the form of a pull down element having the parameters of the above-described @value as sub fields.

In the illustrated embodiment (t34030), the HFR information & pull down information may be defined in the form of a descriptor. This descriptor may be delivered in MMT signaling information as described above. This descriptor may be delivered in the above-described MPT message or the other MMTP message. If the MMT asset is a video stream component including content supporting HFR, a descriptor illustrated as an asset descriptor may be included. In addition, this descriptor may be delivered in or along with DVB SI service signaling such as SDT or EIT.

This descriptor (t34030) may include HFR information & pull down information. sfr_compatibility_flag, sfr_hfr_transition_flag, hfr_sfr_transition_flag, pull_down_type, pull_down_transition_flag, original_framerate and/or original_scan_type may be equal to the above-described SFR-Compatibility, SFR_HFR_Transition, HFR_SFR_Transition, PullDownType, PullDownTransition, OriginalFrameRate and OriginalScanType. The original_framerate_flag may indicate whether the original_framerate field is present in this descriptor. The original_scane_type_flag field may indicate whether the original_scane_type field is present in this descriptor.

Figure 35:
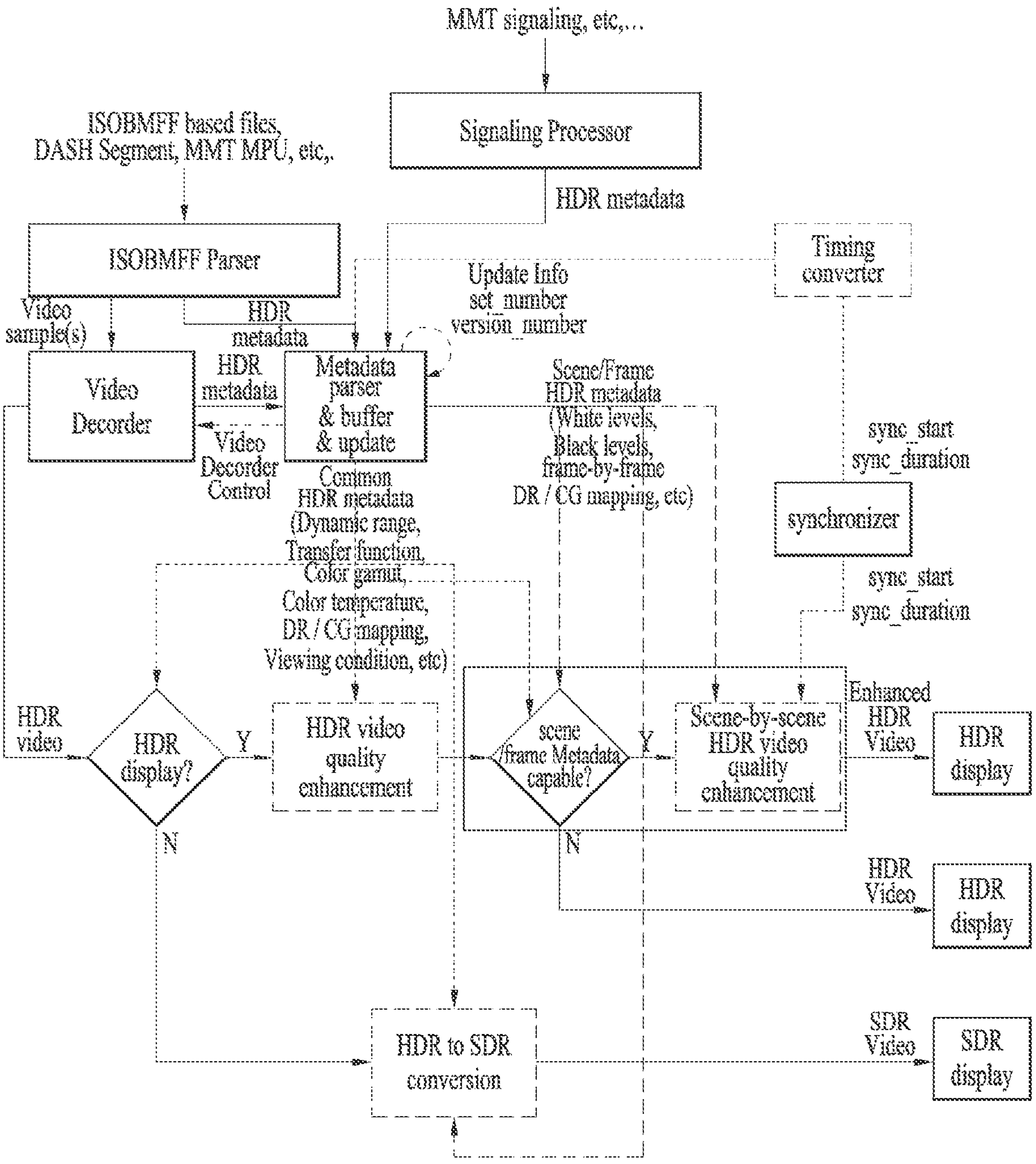
FIG. 35 is a diagram showing media engine operation of a receiver based on HDR information processing capabilities according to an embodiment of the present invention.

FIG. 35 is a diagram showing media engine operation of a receiver based on HDR information processing capabilities according to an embodiment of the present invention.

A parser (ISOBMFF parser) of the receiver may parse an ISOBMFF based media file, a DASH segment and/or an MMT MPU. According to the parsed result, video samples may be delivered to a video decoder and HDR information (metadata) may be delivered to a metadata parser.

The video decoder may decode the video samples and acquire HDR video data. The HDR information acquired in this process may be delivered to the metadata parser. When a signaling message such as DASH/MMT is received, a signaling processor may extract HDR metadata from the signaling message and deliver the extracted HDR metadata to the metadata parser. The metadata parser may parse the received HDR metadata. Using the metadata acquired herein, control information necessary for the video decoder may be delivered to the video decoder. The metadata parser may serve as a buffer or perform metadata update. Update may be performed using set_number, version_number, etc.

Different cases may occur depending on whether the receiver performs HDR display. If display of the HDR video is impossible, the HDR video data may be delivered to an SDR display block through HDR-SDR conversion. The SDR display block is a hardware block for receiving and playing the converted SDR video back. At this time, information received from the metadata parser may be used for conversion.

If the receiver may perform HDR display, quality enhancement may be performed with respect to the HDR video. At this time, quality enhancement may be performed using common HDR information (dynamic range, transfer function, color gamut, color temperature, DR/CG mapping, viewing condition, etc.) received from the metadata parser.

Different cases may occur depending on whether the receiver may process scene-by-scene/frame-by-frame metadata. If the scene-by-scene/frame-by-frame metadata cannot be processed, the HDR display block of the receiver may play the received HDR video data back.

If the scene-by-scene/frame-by-frame metadata can be processed, scene-by-scene HDR video quality enhancement may be performed. At this time, quality enhancement may be performed using the scene/frame HDR metadata (White levels, Black levels, frame-by-frame, DR/CG mapping, etc.) received from the metadata parser. In this case, the HDR display block of the receiver may play the enhanced HDR video data back. The HDR display block may be a hardware block.

A timing converter may deliver time related information to the metadata parser, a synchronizer, etc. The synchronizer may provide information necessary for scene-by-scene HDR video quality enhancement operation using information such as sync_start, and sync_duration.

Figure 36:
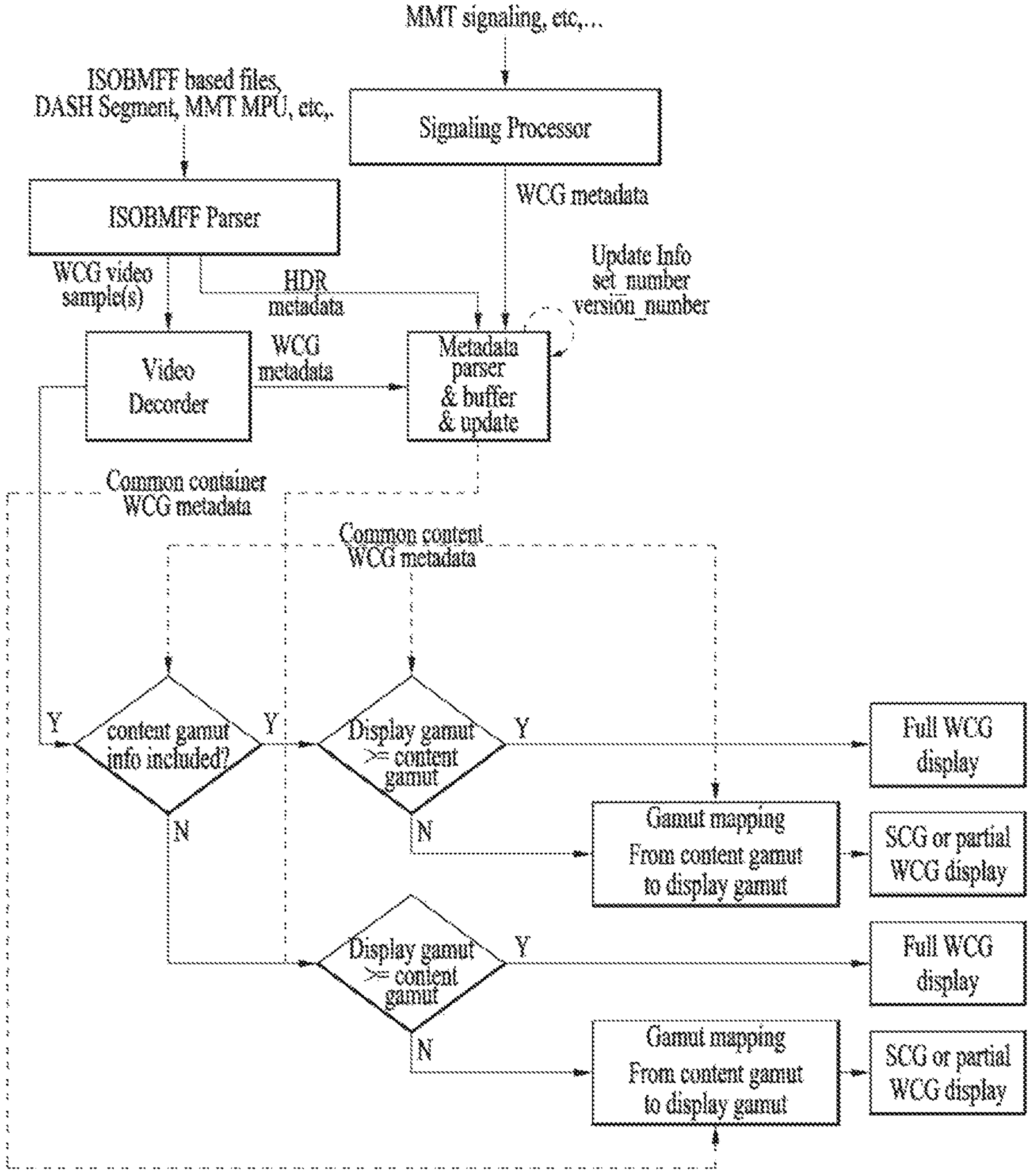
FIG. 36 is a diagram showing media engine operation of a receiver based on WCG information processing capabilities according to an embodiment of the present invention.

FIG. 36 is a diagram showing media engine operation of a receiver based on WCG information processing capabilities according to an embodiment of the present invention.

A parser (ISOBMFF parser) of the receiver may parse an ISOBMFF based media file, a DASH segment and/or an MMT MPU. According to the parsed result, WCG video samples may be delivered to a video decoder and color gamut information (metadata) may be delivered to a metadata parser.

The video decoder may decode the video samples and acquire WCG video data. The color gamut related information acquired in this process may be delivered to the metadata parser. When a signaling message such as DASH/MMT is received, a signaling processor may extract color gamut metadata from the signaling message and deliver the extracted color gamut metadata to the metadata parser. The metadata parser may parse the received color gamut metadata. The container/content color gamut information acquired herein may be used in a receiver processing procedure. The metadata parser may serve as a buffer or perform metadata update. Update may be performed using set_number, version_number, etc.

Different cases may occur depending on whether the content color gamut information is included in the received data. If the content color gamut information is not included, the receiver may determine whether a display color gamut is greater than or equal to the container color gamut. If the display color gamut is greater than or equal to the container color gamut, the receiver may provide full WCG display. If the display color gamut is less than the container color gamut, the receiver may perform gamut mapping from the container color gamut to the display color gamut. Thereafter, the receiver may perform SCG display or partial WCG display. In this procedure, common container color gamut related information received from the metadata parser may be used.

In contrast, if content color gamut information is included in the received data, the receiver may determine whether the display color gamut is greater than or equal to the content color gamut. If the display color gamut is greater than or equal to the content color gamut, the receiver may provide full WCG display. If the display color gamut is less than the content color gamut, the receiver may perform gamut mapping from the content color gamut to the display color gamut. Thereafter, the receiver may SCG display or partial WCG display. In this procedure, common container color gamut related information received from the metadata parser may be used.

Figure 37:
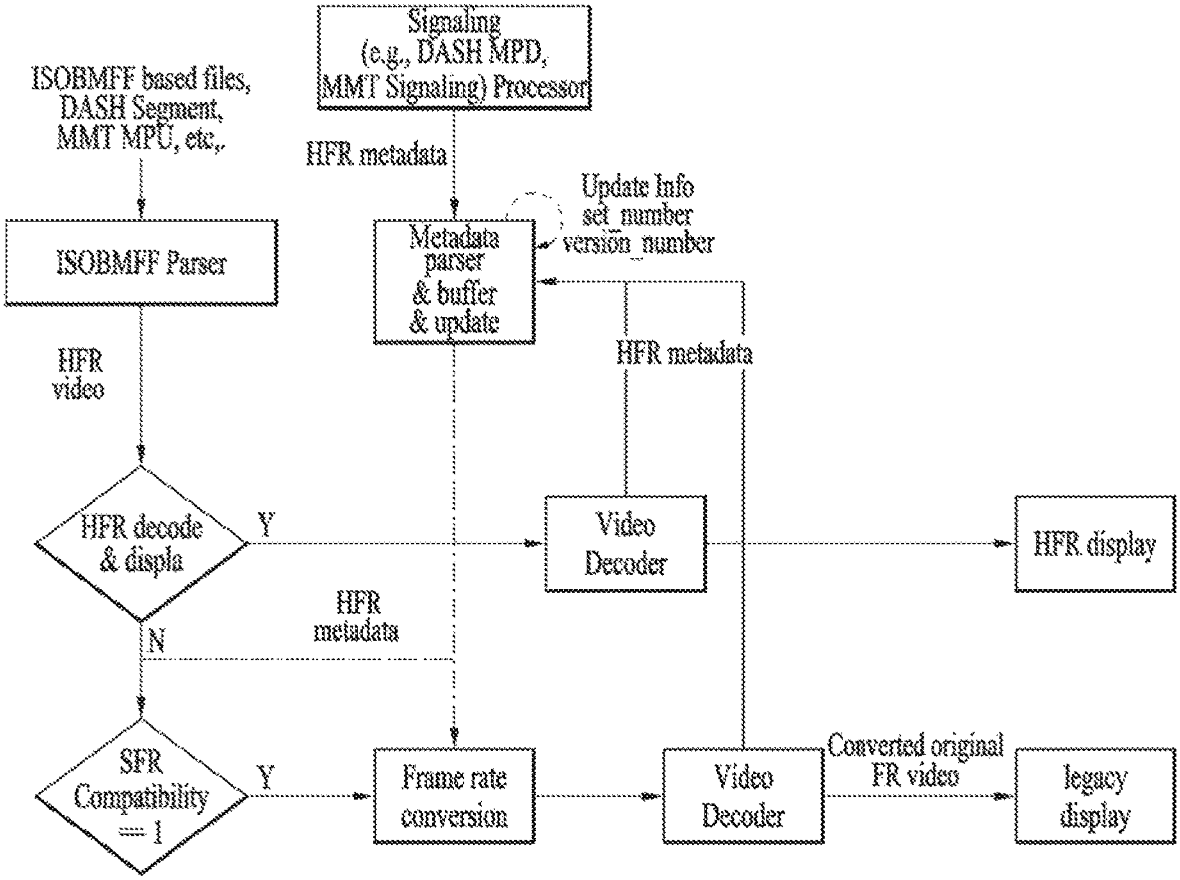
FIG. 37 is a diagram showing media engine operation of a receiver based on HFR information processing capabilities according to an embodiment of the present invention.

FIG. 37 is a diagram showing media engine operation of a receiver based on HFR information processing capabilities according to an embodiment of the present invention.

A parser (ISOBMFF parser) of the receiver may parse an ISOBMFF based media file, a DASH segment and/or an MMT MPU. According to the parsed result, HFR video data may be acquired.

When a DASH MPD or MMT based signaling message is received, a signaling processor may extract HFR metadata from the signaling message and deliver the HFR metadata to a metadata parser. The metadata parser may parse the received HFR metadata. The HFR information acquired herein may be used in a receiver processing procedure. The metadata parser may serve as a buffer or perform metadata update. Update may be performed using set_number, version_number, etc.

If HFR decoding/display is performed with respect to HFR video data, the HFR video data may be delivered to a video decoder. The HFR video decoder may decode video samples. At this time, when the HFR metadata is acquired, the HFR metadata may be delivered to a metadata parser. The HFR video decoder may deliver the decoded data to an HFR display and the HFR display may display the data.

If HFR decoding/display may not be performed, compatibility with SFR may be checked. If SFRCompatibility has a value of 1, there is compatibility and frame rate conversion may be performed. The converted data may be delivered to an SFR or legacy video decoder. In this procedure, HFR metadata received from the metadata parser may be used. In a video decoding procedure, if HFR metadata is acquired, the HFR metadata may be delivered to a metadata parser. The video decoder may deliver the HFR metadata to a legacy display. This video data may be video data converted into an original frame rate. The legacy display may display the video data.

Figure 38:
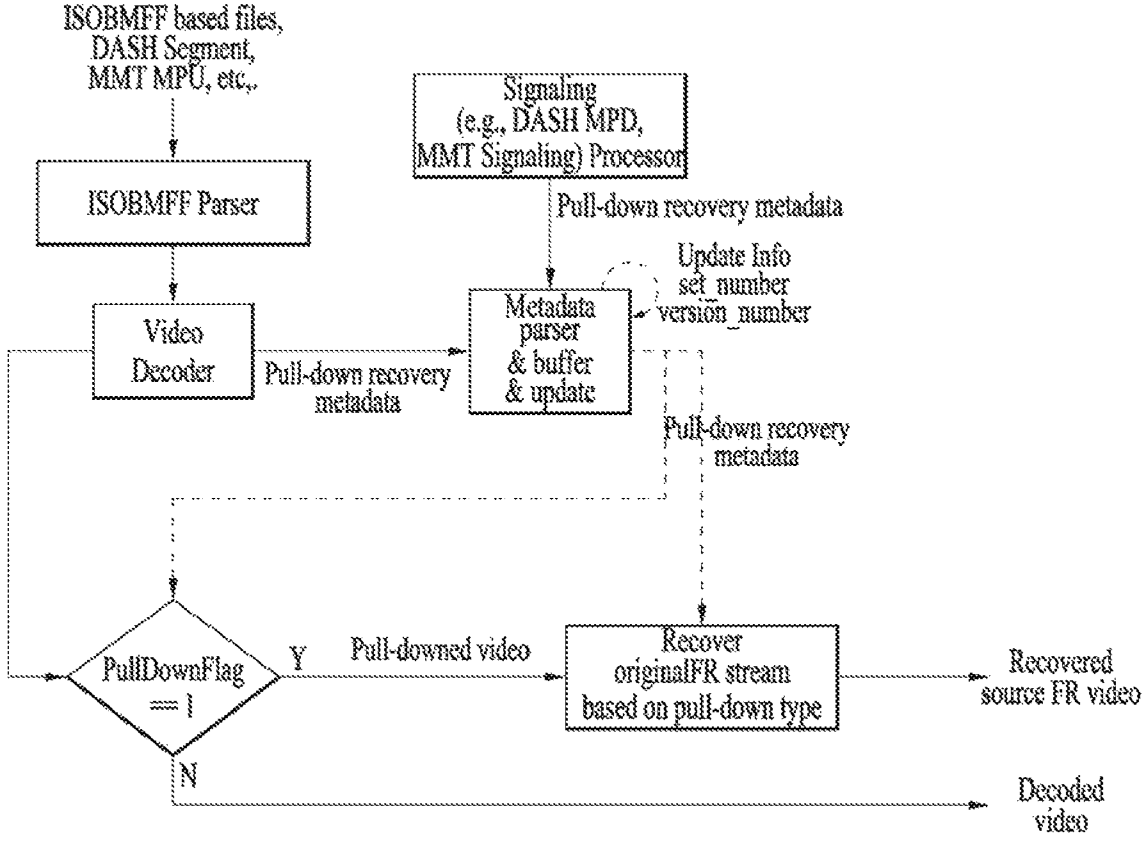
FIG. 38 is a diagram showing media engine operation of a receiver based on pull down recovery information processing capabilities according to an embodiment of the present invention.

FIG. 38 is a diagram showing media engine operation of a receiver based on pull down recovery information processing capabilities according to an embodiment of the present invention.

A parser (ISOBMFF parser) of the receiver may parse an ISOBMFF based media file, a DASH segment and/or an MMT MPU. According to the parsed result, video samples may be delivered to and decoded by a video decoder.

When a DASH MPD or MMT based signaling message is received, a signaling processor may extract pull down recovery related metadata from the signaling message and deliver the pull down recovery related metadata to a metadata parser. The metadata parser may parse the received pull down recovery related metadata. The pull down recovery related information acquired herein may be used in a receiver processing procedure. The metadata parser may serve as a buffer or perform metadata update. Update may be performed using set_number, version_number, etc.

The receiver may check PullDownFlag to determine whether the decoded video is pulled-down video or not. The receiver may restore an original FR stream using information such as a pulled-down type, if the decoded video is pulled-down video. In this procedure, pull down recovery related information of the metadata parser may be used. If the decoded video is not pulled-down video, this procedure may not be performed. Recovered source FR video or decoded video data may be delivered to and displayed on a display.

FIG. 39 is a diagram showing 3D audio information according to an embodiment of the present invention.

If the audio service component is a 3D audio component, the 3D audio information may include 3D audio information related thereto. The 3D audio information may be defined in the form of one of the descriptors according to the above-described embodiments or may be defined in the form of an element. This may be indicated by the above-described componentProperty element or ComponentDescription element.

As described above, if a DASH representation includes 3D audio data (AC-4, MPEG-H, etc.), this information may be included as the essential property descriptor and/or supplementary property descriptor of the DASH MPD.

In the illustrated embodiment, the 3D audio information may be defined in the form of a descriptor. @schemeIdUri may be a URI for identifying that the descriptor has a 3D audio scheme related to the 3D audio information. In this case, @schemeIdUri may have a value of urn:atsc3.0:3d-audio:201x. @value may have values according to the meaning of the 3D audio scheme. These values will be described below. @id may indicate the identifier of the descriptor. If the same identifier is used, the same scheme ID, value and parameter may be included.

The illustrated embodiment (t39010) may indicate the parameters of the above-described @value. codec may indicate the encoding format, that is, codec information of this audio component. In some embodiments, the values 1 and 2 of this field may indicate AC-4 and MPEG-H Audio, respectively. The values 3 to 255 of this field may be reserved for future use. profile may indicate information on the profile and level of the encoding format of the audio component. dialog_enhancement_enabled may indicate whether dialog enhancement information is included in this audio component. channel_mode may indicate the channel mode of this audio component. The values 0, 1 and 2 of this field may indicate mono content, stereo content and multi-channel content, respectively.

object_enabled may indicate whether an object signal is included in this audio component. HOA_enabled may indicate that a higher order ambisonics (HOA) signal is included in this audio component. SAOC_enabled may indicate whether a spatial audio object coding (SAOC) signal is included in this audio component.

referenceLayout may describe a loudspeaker layout intended upon manufacturing or the original design of the audio stream of this audio component. targetLayout may describe a target loudspeaker layout which is an actual loudspeaker constellation for rendering this audio content. If the target layout cannot be confirmed, it is assumed that the target layout is equal to a reference layout. Decoder_configuration may include audio decoder related information according to the encoding format of this audio component. In some embodiments, in the case of an AC-4 audio stream, ac4_dsi_byte included in AC-4 TOC may be included in this field. In some embodiments, in the case of an MPEG-H audio stream, mpegh3daConfig( ) in this bitstream may be included in this field.

In some embodiments, the 3D audio information may be defined in the form of a 3D audio element having the parameters of the above-described @value as sub fields.

In the illustrated embodiment (t39020), the 3D audio information may be defined in the form of a descriptor. This descriptor may be delivered in MMT signaling information as described above. This descriptor may be delivered in the above-described MPT message or the other MMTP message. This descriptor may be a type of asset descriptor. In this case, the asset type may indicate a value corresponding to an MPEG-H audio component or an AC-4 audio component. In addition, this descriptor may be delivered in or along with DVB SI service signaling such as SDT or EIT.

codec, ProfileLevelIndication, dialog_enhancement_enabled, channel_mode, object_enabled, HOA_enabled, SAOC_enabled, referenceLayout and targetLayout may be included in this descriptor and the meanings thereof were as described above. ProfileLevelIndication may be equal to the above-described profile.

config_flag may indicate whether channel_mode, dialog_enhancement_enabled, object_enabled, HOA_enabled, and/or SAOC_enabled are included in this descriptor. If these fields are included, config_flag may be set to 1. referenceLayout_flag may indicate whether referenceLayout is included in this descriptor. If the value of this field is 1, referenceLayout may be present. targetLayout_flag may indicate whether targetLayout is included in this descriptor. If the value of this field is 1, targetLayout may be present.

ConfigLength may indicate the length of the following ac4_dsi_byte or mpegh3daConfig_bytes( ). ac4_dsi_byte may include ac4_dsi including information on AC-4 TOC. mpegh3daConfig_bytes may include mpegh3daConfig( ) information in the MPEG-H bitstream. additional_info_byte may be reserved for future use.

FIG. 40 is a diagram showing AC-4 audio information according to an embodiment of the present invention.

If the audio service component is an AC-4 audio component, the AC-4 audio information may include AC-4 audio information related thereto. The AC-4 audio information may be defined in the form of one of the descriptors according to the above-described embodiments or may be defined in the form of an element. This may be indicated by the above-described componentProperty element or ComponentDescription element.

As described above, if a DASH representation includes AC-4 audio data, this information may be included as the essential property descriptor and/or supplementary property descriptor of the DASH MPD.

In the illustrated embodiment, the AC-4 audio information may be defined in the form of a descriptor. @schemeIdUri may be a URI for identifying that the descriptor has an AC-4 audio scheme related to the AC-4 audio information. In this case, @schemeIdUri may have a value of urn:atsc3.0:ac-4:201x. @value may have values according to the meaning of the AC-4 audio scheme. These values will be described below. @id may indicate the identifier of the descriptor. If the same identifier is used, the same scheme ID, value and parameter may be included.

The illustrated embodiment (t40010) may indicate the parameters of the above-described @value. ac4_dialog_enhancement_enabled, ac4_channel_mode, ac4_object_enabled, ac4_HOA_enabled, referenceLayout, targetLayout and ac4_dsi_byte may be included as parameters. The respective fields have the definitions as dialog_enhancement_enabled, channel_mode, object_enabled, HOA_enabled, referenceLayout and/or targetLayout described above, for the AC-4 audio stream, and may describe the information according to the definitions. ac4_dsi_byte was as described above.

In some embodiments, the AC-4 audio information may be defined in the form of an AC-4 audio element having the parameters of the above-described @value as sub fields.

In the illustrated embodiment (t40020), the AC-4 audio information may be defined in the form of a descriptor. This descriptor may be delivered in MMT signaling information as described above. This descriptor may be delivered in the above-described MPT message or the other MMTP message. This descriptor may be a type of asset descriptor. In this case, the asset type may indicate a value corresponding to an AC-4 audio component. In addition, this descriptor may be delivered in or along with DVB SI service signaling such as SDT or EIT.

ac4_config_flag, referenceLayout_flag, targetLayout_flag, ac4_dialog_enhancement_enabled, ac4_channel_mode, ac4_object_enabled, ac4_HOA_enabled, referenceLayout, targetLayout and/or additional_info_byte may be included in this descriptor. The respective fields may have the same definitions as config_flag, referenceLayout_flag, targetLayout_flag, dialog_enhancement_enabled, channel_mode, object_enabled, HOA_enabled, referenceLayout, targetLayout and/or additional_info_byte described above, for the AC-4 audio stream, and may describe the information according to the definitions.

ac4_toc_flag may indicate whether AC-4 TOC information is present in this descriptor. ac4_toc_len may indicate the length of the AC-4 TOC information. If the value of ac4_toc_flag is 1, this field may be present. ac4_dsi_byte is an eight-bit field and the sequence of the ac4_dsi_byte fields may specify the ac4_dsi field. The ac4_dsi field may include AC-4 TOC information. This field may be present if ac4_toc_len is present and may have a value greater than 0.

FIG. 41 is a diagram showing MPEG-H audio information according to an embodiment of the present invention.

If the audio service component is an MPEG-H audio component, the MPEG-H audio information may include MPEG-H audio information related thereto. The MPEG-H audio information may be defined in the form of one of the descriptors according to the above-described embodiments or may be defined in the form of an element. This may be indicated by the above-described componentProperty element or ComponentDescription element.

As described above, if a DASH representation includes MPEG-H audio data, this information may be included as the essential property descriptor and/or supplementary property descriptor of the DASH MPD.

In the illustrated embodiment, the MPEG-H audio information may be defined in the form of a descriptor. @schemeIdUri may be a URI for identifying that the descriptor has an MPEG-H audio scheme related to the MPEG-H audio information. In this case, @schemeIdUri may have a value of urn:atsc3.0:mpeg-h:201x. @value may have values according to the meaning of the MPEG-H audio scheme. These values will be described below. @id may indicate the identifier of the descriptor. If the same identifier is used, the same scheme ID, value and parameter may be included.

The illustrated embodiment (t41010) may indicate the parameters of the above-described @value. profile, dialog_enhancement_enabled, channel_mode, object_enabled, HOA_enabled, SAOC_enabled, referenceLayout, targetLayout and/or Decoder_configuration may be included as parameters. The respective fields have the definitions as profile, dialog_enhancement_enabled, channel_mode, object_enabled, HOA_enabled, SAOC_enabled, referenceLayout, targetLayout and/or Decoder_configuration described above, for the MPEG-H audio stream, and may describe the information according to the definitions. Decoder_configuration may include the above-described mpegh3daConfig( ).

In some embodiments, the MPEG-H audio information may be defined in the form of an MPEG-H audio element having the parameters of the above-described @value as sub fields.

In the illustrated embodiment (t41020), the MPEG-H audio information may be defined in the form of a descriptor. This descriptor may be delivered in MMT signaling information as described above. This descriptor may be delivered in the above-described MPT message or the other MMTP message. This descriptor may be a type of asset descriptor. In this case, the asset type may indicate a value corresponding to an MPEG-H audio component. In addition, this descriptor may be delivered in or along with DVB SI service signaling such as SDT or EIT.

mpegh3daProfileLevelIndication, mpegh_config_flag, referenceLayout_flag, targetLayout_flag, dialog_enhancement_enabled, channel_mode, object_enabled, HOA_enabled, SAOC_enabled, referenceLayout, additional_info_byte and/or targetLayout may be included in this descriptor. The respective fields may have the same definitions as ProfileLevelIndication, config_flag, referenceLayout_flag, targetLayout_flag, dialog_enhancement_enabled, channel_mode, object_enabled, HOA_enabled, SAOC_enabled, referenceLayout, additional_info_byte and/or targetLayout described above, for the MPEG-H audio stream, and may describe the information according to the definitions.

mpegh3daConfigLength may indicate the length of mpegh3daConfig_bytes( ) information. mpegh3daConfig_bytes may include mpegh3daConfig( ) in the MPEG-H bitstream.

Figure 42:
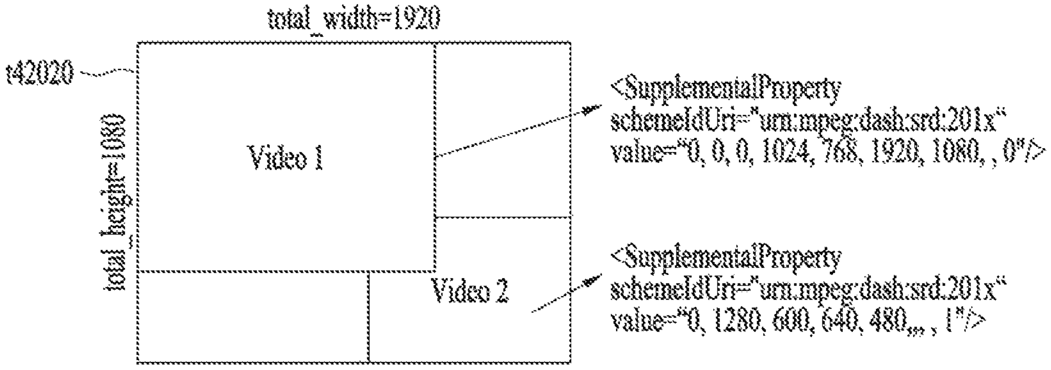
FIG. 42 is a diagram showing view configuration information according to another embodiment of the present invention.

FIG. 42 is a diagram showing view configuration information according to another embodiment of the present invention.

As described above, the present invention proposes a method of providing a multi-view service including one or more views based on the DASH, ROUTE or MMT protocol. The multi-view service may include a PIP function.

View configuration information was described above. The illustrated embodiment (t42010) may be another embodiment of the above-described view configuration information. The view configuration information may include information on a spatial relation between the views of each video component. The view displayed in a specific region of a screen may be referred to as a spatial object. The video data of this view may be delivered through each video component.

The view configuration information may be defined in the form of one of the descriptors according to the above-described embodiments or may be defined in the form of an element. This may be indicated by the above-described componentProperty element or ComponentDescription element.

As described above, the view configuration information may be included as the essential property descriptor and/or supplementary property descriptor of the DASH MPD. This descriptor may be included in an adaptation set, representation and sub representation level of the MPD.

In addition, this descriptor may be delivered in MMT signaling information as described above. This descriptor may be delivered in the above-described MPT message or the other MMTP message. This descriptor may be a type of asset descriptor. In this case, the asset type may indicate a value corresponding to a video component. In addition, this descriptor may be delivered in or along with DVB SI service signaling such as SDT or EIT.

In the illustrated embodiment (t42010), the view configuration information may be defined in the form of a descriptor. @schemeIdUri may be a URI for identifying that the descriptor has a view configuration scheme related to the view configuration information. In this case, @schemeIdUri may have a value of urn:mpeg:dash:srd:201x. @value may have values according to the meaning of the view configuration scheme. These values will be described below. @id may indicate the identifier of the descriptor. If the same identifier is used, the same scheme ID, value and parameter may be included.

The illustrated embodiment (t42010) may indicate the parameters of the above-described @value.

source_id, object_x, object_y, object_width, object_height, total_width, total_height and/or object_display_priority may be included in this descriptor. The respective fields may be equal to Source_id, View_x, View_y, View_width, View_height, View_total_width, View_total_height, and View_display_priority in the above-described view configuration information. Each value may be a decimal integer which is not a negative number. Here, the above-described view may be referred to as a spatial object.

Here, source_id may define a coordinate system related to this source. The coordinate system may use an arbitrary origin (0, 0), wherein an x axis proceeds from the left to the right and a y axis proceeds from top to bottom. SRD information having the same source_id may use the same origin and axis.

In addition, if a total_width value is present, a total_height field may be present and, if a total_height value is present, a total_width field may be present.

spatial_set_id may be further included and may be the identifier of a group of views (spatial object). If a spatial_set_id value is present, total_height and total_width fields may be present.

In some embodiments, the view configuration information may be defined in the form of a view configuration element having the parameters of the above-described @value as sub fields.

In the illustrated embodiment (t42020), a cascaded mosaic video service including three video components is displayed on one screen. Each video component may have a spatial object. SRD information thereof may be delivered as an essential property and/or supplemental property descriptor. The object_display_priority value of video 1 may be less than object_display_priority of video 2 such that video 1 is displayed in front of video 2.

The relation between spatial objects having the same source_id may be defined using object_x, object_y, object_width, and object_height information of the spatial object, as compared to total_width and total_height.

The top-left of video 2 may be located at (1280, 600) on the basis of (0, 0). The width/height of video 2 may have values of 640 and 480 on the basis of that point.

Figure 43:
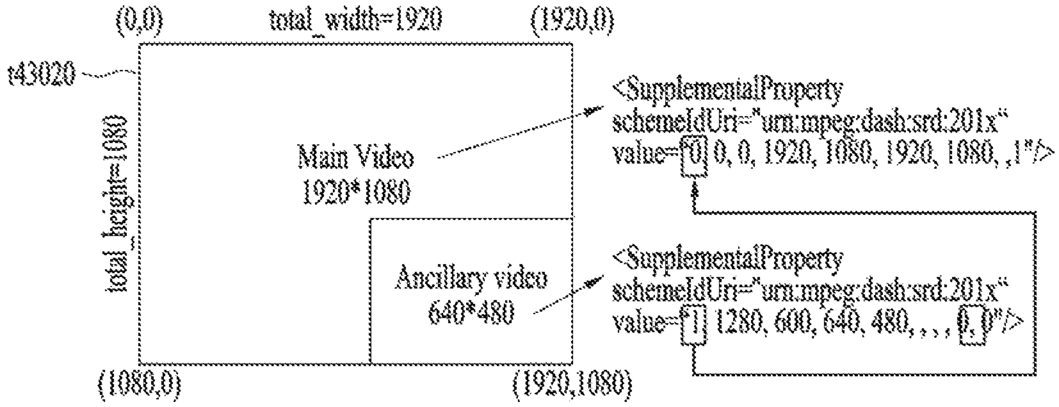
FIG. 43 is a diagram showing view configuration information according to another embodiment of the present invention.

FIG. 43 is a diagram showing view configuration information according to another embodiment of the present invention.

In some embodiments, one broadcast service may deliver not only main video data but also ancillary video data including sign language video data. In this case, the ancillary video data may be another content source. A spatial relation between regions in which the ancillary video and the main video are displayed may be signaled.

If the same source_id is used, the same coordinate system may be used. If the ancillary video data is received through the same source, a relation between views may be described only using the source_id and the above-described SRD information. However, if the ancillary video data is received through another source, information on a relation between views (spatial objects) having different source_ids may be further signaled.

The above-described view configuration information may extend to further have dependent_source_id. If the coordinate system of the spatial object dependent on an external content source, dependent_source_id may provide the identifier of the external content source. Here, depending on the external content source may mean depending on the coordinate system of main video, etc.

If dependent_source_id is present, the position of the top-left corner of the spatial object may be determined based on the coordinate system used by the external content source. This position may be confirmed by (object_x, object_y) of this descriptor. In addition, the width/height of the spatial object may be determined according to the object_width and object_height values of this descriptor.

In some embodiments, if only one of the spatial objects sharing the same source_id has dependent_source_id, the spatial objects sharing the same source_id may follow the coordinate system of the content source indicated by the dependent_source_id.

In the illustrated embodiment (t43020), main video having different sources and ancillary video including sign language video are displayed. The SRD information of each spatial object may be delivered as an essential property and/or supplemental descriptor.

Since ancillary video may be displayed depending on the coordinate system of the main video, the SRD information of the ancillary video may indicate that dependent_source_id is the source_id of the main video. In addition, the top-left corner of the ancillary video may be located at a position (1280, 600) on the coordinate system of the main video. The width/height of ancillary video may have values of 640 and 480 on the basis of that position. The object_display_priority value of the ancillary video may have a value less than the object_display_priority value of the main video such that the ancillary video is displayed in front of the main video.

In addition, in some embodiments, the above-described view configuration information may extend to further have Coord_type. Coord_type may indicate in which manner the view (spatial object) is displayed on the screen. The value of this field may be expressed by a positive integer.

In some embodiments, if the value of this field is 0, the view configuration may be described using a pixel value based on the top-left corner of the screen. If the value of this field is 1, the view configuration may be described using a ratio (percent) relative to the display based on the top-left corner of the screen. If the value of this field is 2, the view configuration may be described using a size relative to the display based on the top-left corner of the screen.

If the value of this field is 0, the above-described View_x, View_y, View_width, View_height, View_total_width and/or View_total_height may describe respective information according to the definitions thereof in pixel units.

If the value of this field is 1, the above-described View_x, View_y, View_width, View_height, View_total_width and/or View_total_height may describe respective information according to the definitions thereof using the percent value for the entire display. For example, View_width and View_height may be the percent value for the width/height of the entire display and may indicate the width/height of the view. If the entire screen is filled with all video arrays, View_total_width and View_total_height may be set to 100 percent. If the entire screen is not filled with video arrays, the width/height of the displayed region may be indicated by the percent value for the entire display.

If the value of this field is 2, the above-described View_x, View_y, View_width, View_height, View_total_width and/or View_total_height may be values relative to the display and describe the information according to definitions.

In this case, view_x may have a field value such that the value acquired through an equation such as (display_width/view_total_width)*view_x becomes a pixel offset value of the x axis on the basis of (0, 0) on the entire screen. Here, display_width may mean the width of the entire screen.

Similarly, view_y may have a field value such that the value acquired through an equation such as (display_height/view_total_height)*view_y becomes a pixel offset value of the y axis on the basis of (0, 0) on the entire screen.

view_width may have a field value such that the value acquired through an equation such as (display_width/view_total_width)*view_width becomes the width of the region in which this view is displayed.

view_height may have a field value such that the value acquired through an equation such as (display_height/view_total_height)*view_height becomes the height of the region in which this view is displayed.

view_total_width may indicate the total width of the video array and may match the pixel value corresponding to the width of the entire screen. For example, if the width of the entire screen is 3840 pixels and the view_total_width value is 1920, one unit of the view_width may be expressed by two pixels.

view_total_height may indicate the total height of the video array and may match the pixel value corresponding to the width of the entire screen. For example, if the width of the entire screen is 2160 pixels and the view_total_width value is 1080, one unit of the view_width may be expressed by two pixels.

FIG. 44 is a diagram showing an embodiment describing the above-described view configuration information of the present invention as a descriptor on an MPD.

If main video and ancillary video are present, these may be signaled. A spatial relation thereof may be signaled.

For the main video, SRD information in an adaptation set corresponding to the video component of the main video may be described. In supplemental properties included in the adaptation set, the above-described descriptor may be included to describe SRD information.

<SupplementalProperty schemeIdUri="urn:mpeg:dash:srd:201x" value="0, 0, 0, 1920, 1080, 1920, 1080,"/>

In some embodiments, the supplemental properties may be included at representation and subrepresentation levels to describe the SRD covering the scope thereof. As described above, the SRD information may be defined in the essential properties.

For the ancillary video, SRD information in an adaptation set corresponding to the video component of the ancillary video may be described. In supplemental properties included in the adaptation set, the above-described descriptor may be included to describe SRD information.

<SupplementalProperty schemeIdUri="urn:mpeg:dash:srd:201x" value="1, 1280, 6000, 640, 480, . . . , 0"/>

In addition, in order to indicate that the ancillary video serves the role of sign language video, the above-described role information may be described in the Role element of the adaptation set in the form of a descriptor. This information may have a value of "sign".

<Role schemeIdUri="urn:mpeg:dash:role:2100" value="sign"/>

FIG. 45 is a diagram showing role information according to an embodiment of the present invention.

The role information may include information describing the role of the service component. The detailed role of the service component was described above. The role information may be defined in the form of one of the descriptors according to the above-described embodiments or may be defined in the form of an element. This may be indicated by the above-described componentProperty element or ComponentDescription element.

As described above, the role information may be included as the above-described essential property descriptor and/or supplemental property descriptor of the DASH MPD. This descriptor may be included at the adaptation set, representation and sub representation sets of the MPD.

In addition, this descriptor may be delivered in MMT signaling information as described above. This descriptor may be delivered in the above-described MPT message or the other MMTP message. This descriptor may be a type of asset descriptor. In addition, this descriptor may be delivered in or along with DVB SI service signaling such as SDT or EIT.

In the illustrated embodiment, the role information may be defined in the form of a descriptor. @schemeIdUri may be a URI for identifying that the descriptor has a role scheme related to the role information. In this case, @schemeIdUri may have a value of urn:mpeg:dash:rolef:201x. @value may have values according to the meaning of the role scheme. These values will be described below. @id may indicate the identifier of the descriptor. If the same identifier is used, the same scheme ID, value and parameter may be included.

The illustrated embodiment (t45010) may indicate the parameters of the above-described @value. If these values are used as @value, this may indicate that the service data to be described has the role. Here, the service data to be described may be changed according to the location where the role element or the role information is located. That is, if this is included in the adaptation set or representation, the service data may mean a service component. If this included in a sub representation, the service data may mean a specific part of the service component.

caption may indicate whether the service data serves the role of the caption. subtitle may indicate whether the service data serves the role of the subtitle. In the case of open captioning or hard coded subtitles burned, the service component may be expressed by "video". However, in this case, the descriptor may indicate that the content indicates caption or subtitle.

main may indicate that the service data is a main media component. The main media component may be a media component intended to be presented without other information. alternate may indicate whether the service data is an alternative media component. The alternative component may replace the same type of main media component. The alternative component may have another descriptor including information on a difference from the main component. For example, this role may be served by the video point descriptor or the role descriptor. In particular, when a plurality of alternative components provides a plurality of supplementary media content, this descriptor may be needed. supplementary may indicate that the service data is supplementary information for providing supplementary information to different types of media components.

In the case of normal audio/video content, a primary audio/video component may be expressed by "main". However, a less important component such as video provided to provide visual experience of a music track or peripheral audio provided in a live sport video scene may be expressed by "supplementary".

commentary may indicate that the service data is commentary information. This role may be mainly given to audio data. dub may indicate dub data presented using a language different from that of an original media. That is, this role may be given to the dubbed audio or translated caption. description may indicate that the service data is data for providing a text descriptor or data for providing an audio descriptor describing a visual component. sign may indicate data for providing sign language information of audio corresponding to the service data. metadata may indicate information intended such that the service data is processed by an application. enhanced-audio-intelligibility may indicate that the service data is audio service data enhanced in intelligibility. multiple may indicate whether the service data is a media component including a plurality of media data. For example, in the case of a video mosaic, since a plurality of video data components may be included, multiple may be indicated. The meaning of the multiple may be variously changed according to the type of the media component described by the MPD, etc.

In the illustrated embodiment (t45020), the role information may be defined in the form of a role element. This role element may have the parameters of the above-described @value as subfields. The role element may also be included at the adaptation set, representation and sub representation levels as the common attribute/element. This element may describe role information of the data by the scope according to location.

FIG. 46 is a diagram showing an embodiment describing the above-described role information of the present invention as a descriptor on an MPD.

In the illustrated embodiment (t46010), if role@value is multiple, this may indicate that one representation includes one or more videos or audios. For example, if the representation includes one main video and one or more ancillary videos, the role of the adaptation set may be signaled as follows.

<Role schemeIdUri="urn:mpeg:dash:role:2014" value="multiple"/>

However, in this case, the role of each video/audio included in one representation may not be signaled. Here, each video/audio may correspond to a sub representation. To this end, the role information may be included in the sub representation to be signaled.

In the illustrated embodiment (t46020), the role of each sub representation is signaled. For example, one sub representation may be main video and another sub representation may be ancillary video (sign language video, etc.). These may be signaled under the sub representation as follows.

<Role schemeIdUri="urn:mpeg:dash:role:2011" value="multiple"/>

<Role schemeIdUri="urn:mpeg:dash:role:2011" value="sign"/>

As described above, although the role information of each sub representation may be signaled through the role element, in some embodiments (not shown), the role information may be delivered using the supplemental properties of each sub representation. These may be signaled under the sub representation as follows.

<SupplementaryProprty schemeIdUri="urn:mpeg:dash:role:201x" value="main"/>

<SupplementaryProprty schemeIdUri="urn:mpeg:dash:role:201x" value="sign"/>

Figure 47:
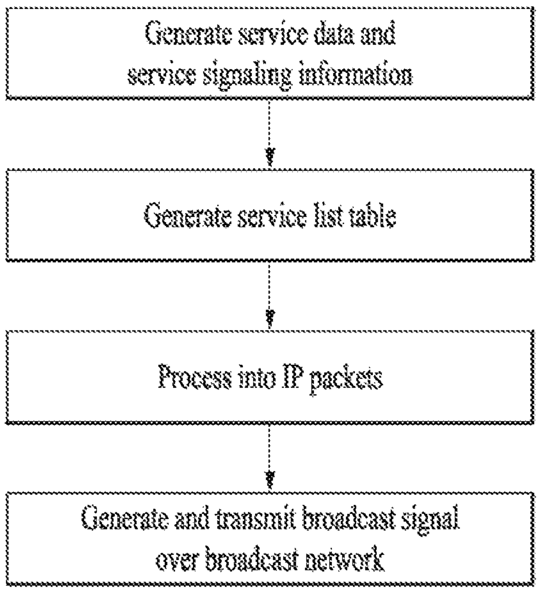
FIG. 47 is a flowchart illustrating a method of transmitting a broadcast signal according to an embodiment of the present invention.

FIG. 47 is a flowchart illustrating a method of transmitting a broadcast signal according to an embodiment of the present invention.

The method of transmitting the broadcast signal according the embodiment of the present invention may include generating service data and service signaling information, generating a service list table, processing the service data, the service signaling information and the service list table into Internet protocol (IP) packets and/or generating and transmitting a broadcast signal over a broadcast network.

First, a service data generator of a transmitter may generate the service data of the broadcast service and/or the service signaling information for signaling the broadcast service. Here, the service data may include media data, NRT data, streaming data, etc. of the broadcast service. The service data may include the service components of the service. Here, the service signaling information may correspond to the above-described SLS. The service data generator is a hardware block for generating data related to an actual service in order for a service provider to provide a service and may be a hardware element.

A low-level signaling generator of the transmitter may generate a service list table. The service list table may correspond to the above-described SLT. The service list table may include bootstrap information for identifying a transport session for delivering the service signaling information as described above. Here, the bootstrap information was as described above. The transport session may be an MMTP session and/or ROUTE session in some embodiments. The low-level signaling generator may manage generation of a low level signaling (LLS) such as SLT and may be a hardware element.

A transport layer processor of the transmitter may process the generated service components, the service signaling information and/or the service list table into IP packets. Prior to such processing, the data may be processed according to UDP. The transport layer processor may be a block for processing the data of a higher layer for transmission and may be a hardware element.

A physical layer processor of the transmitter may process the generated IP packets to generate a broadcast signal and transmit the broadcast signal over the broadcast network. In this process, other operations may be first performed on the above-described link layer, such that the higher layer data (IP packets, etc.) may be encapsulated into link layer packets. Thereafter, the link layer packets may be processed into the broadcast signal through the encoding/interleaving process according to operations defined at the physical layer. The generated broadcast signal may be transmitted over the broadcast network. In some embodiments, the above-described data may be delivered over broadband. The physical layer processor may be a block for managing the above-described link layer and/or physical layer and may be a hardware element.

In a method of transmitting a broadcast signal according to another embodiment of the present invention, service signaling information may include a USBD. As described above, the USBD may operate as a signaling hub describing technical information related to the broadcast service.

In a method of transmitting a broadcast signal according to another embodiment of the present invention, a service list table or USBD may further include capability information. The capability information may describe at least one or more capabilities required to meaningfully present a broadcast service. Here, the capability information may be described using a predetermined capability code. In some embodiments, the capability information may be described by a capability category code indicating the category of the capability. In some embodiments, the capability category code and a capability code indicating the meaning of certain capability information within the category may be combined to describe the capability information. The capability information was as described above.

In a method of transmitting a broadcast signal according to another embodiment of the present invention, if the service signaling information of a broadcast service is delivered by an MMT protocol, the service signaling information may further include a signaling message including caption information of the broadcast service. As described above, if an SLS is delivered according to MMTP, signaling information may be delivered through an MMTP message. In some embodiments, a variety of information (caption, 3D, WCG, HDR, etc.) may be delivered within an MPT message or a newly defined MMTP message. In some embodiments, one MMTP message may simultaneously include a plurality of information.

This caption information may include language information indicating the language of the caption of the broadcast service, role information indicating the role of the caption, aspect ratio information indicating the aspect ratio of the caption, easy reader information indicating whether the caption is an easy reader caption and/or 3D support information indicating whether the caption supports 3D. The caption information was as described above. As described above, the caption information may be included in an MPD.

In a method of transmitting a broadcast signal according to another embodiment of the present invention, a signaling message may further include 3D related information of the service components of the broadcast service. Here, the signaling message may mean one of the MMTP messages. The 3D related information may include minimum disparity information between the view of the service component and an adjacent view thereof and/or maximum disparity information between the view and the adjacent view thereof. The 3D information was as described above. In some embodiments, the 3D related information may further include view position information indicating the order of views of the service component. In some embodiments, the view position information may be delivered through another MMTP message or MPD.

In a method of transmitting a broadcast signal according to another embodiment of the present invention, a USBD may include component information of the service components of the broadcast service. The component information was as described above. The component information may include component type information indicating the type of the service component and/or component role information indicating the role of the service component according to the type of the service component. Each information may correspond to the above-described @componentType attribute and/or @componentRole attribute. The component role information may indicate whether the audio or video component of the broadcast service is a service component for visually impaired persons or hearing impaired persons. That is, this information may indicate whether the component is a component for hearing impaired/visually impaired persons.

In a method of transmitting a broadcast signal according to another embodiment of the present invention, if the service signaling information of a broadcast service is delivered by a ROUTE protocol, a USBD may further include information referencing an MPD. The MPD may include resource identifiers of the service data of the broadcast service and/or context information of the resources as described above. As described above, this MPD may include the above-described information of the component. In some embodiments, the MPD may further include the caption information and/or 3D related information of the broadcast service.

A method of receiving a broadcast signal according to an embodiment of the present invention will now be described. This method is not shown in the figure.

The method of receiving the broadcast signal according to the embodiment of the present invention may include a physical layer processor of a receiver processing a broadcast signal, acquiring IP packets therefrom, a low-level signaling processor acquiring an SLT and acquiring bootstrap information therefrom, identifying a transport session for delivering an SLS using the bootstrap information and accessing the transport session to acquire the SLS, acquiring service components of the broadcast service using the SLS and/or a display providing the broadcast service using the acquired service components. In some embodiments, the above-described caption, 3D, HDR, WCG, etc. may be acquired from the SLT and/or SLS. The information may be acquired from the MMTP message of the SLS or the MPD of the SLS depending on which of the MMTP or ROUTE protocol is used. The physical layer processor, low-level signaling processor and/or display of the receiver may be hardware elements.

The methods of receiving the broadcast signal according to the embodiments of the present invention may correspond to the methods of transmitting the broadcast signal according to the embodiments of the present invention. The methods of receiving the broadcast signal may be performed by the hardware modules corresponding to the modules (e.g., the service data generator, the transport layer processor, the low-level signaling generator, the physical layer processor, etc.) used in the method of transmitting the broadcast signal. The method of receiving the broadcast signal may have embodiments corresponding to the embodiments of the method of transmitting the broadcast signal.

The above-described steps may be omitted or replaced by the other steps of performing similar/equal operations in some embodiments.

Figure 48:
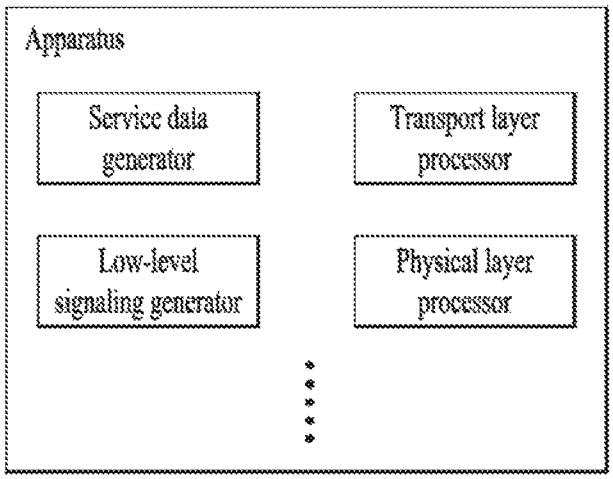
FIG. 48 is a diagram showing an apparatus for transmitting a broadcast signal according to an embodiment of the present invention.

FIG. 48 is a diagram showing an apparatus for transmitting a broadcast signal according to an embodiment of the present invention.

The apparatus for transmitting the broadcast signal according to the embodiment of the present invention may include the service data generator, the transport layer processor, the low-level signaling generator and/or the physical layer processor. The blocks and modules were as described above.

The apparatus for transmitting the broadcast signal according to the embodiment of the present invention and the modules/blocks included therein may perform the embodiments of the method of transmitting the broadcast signal of the present invention.

An apparatus for receiving a broadcast signal according to an embodiment of the present invention will now be described. This apparatus is shown in the figure.

The apparatus for receiving the broadcast signal according to the embodiment of the present invention may include the physical layer processor, the low-level signaling processor and/or the display. The blocks and modules were as described above.

The apparatus for receiving the broadcast signal according to the embodiment of the present invention and the modules/blocks included therein may perform the embodiments of the method of receiving the broadcast signal of the present invention.

The blocks/modules of the apparatus may be processors for performing consecutive processes stored in a memory and may be hardware elements located inside/outside the apparatus.

The above-described steps may be omitted or replaced by the other steps of performing similar/equal operations in some embodiments.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method of transmitting a broadcast signal, the method comprising:

processing one or more Internet Protocol (IP) packets into link layer packets, the one or more IP packets carrying components of one or more services and service signaling information for signaling the components of one or more services;

processing the link layer packets to output the broadcast signal including Physical Layer Pipes (PLPs), wherein:

a PLP of the PLPs includes a service list table, the service list table includes a service identifier for identifying a service, capabilities information for representing required capabilities for decoding a content of the service, protocol information for representing a type of protocol used to deliver the service signaling information, the type of protocol representing either a Real-Time Object delivery over Unidirectional Transport (ROUTE) protocol or an MPEG Media Transport (MMT) protocol (MMTP), and an IP address for an IP packet carrying the service signaling information for the service, the service signaling information for the ROUTE includes a User Service Bundle Description (USBD) for the ROUTE, description information and a Media Presentation Description (MPD), the USBD providing the service identifier and delivery method information for the service, the delivery method information representing whether the service is delivered via broadcast or broadband, the MPD including a DASH (Dynamic Adaptive Streaming over HTTP) representation for DASH formatted data, the description information including a transport session identifier for identifying a transport session and an identifier associated with the DASH representation, the service signaling information for the MMTP includes a USBD for the MMTP providing the service identifier, and an IP address for an IP packet carrying the service list table is different from the IP address for the IP packet carrying the service signaling information for the service; and transmitting the broadcast signal.

2. The method of claim 1, wherein the USBD for the MMTP further includes component information about a component available in the service and wherein the component information includes type information representing a type of the component, role information representing a role of the component and an identifier for identifying the component.

3. A device for transmitting a broadcast signal, the device comprising:

a packet generator to generate one or more Internet Protocol (IP) packets into link layer packets, the one or more IP packets carrying components of one or more services and service signaling information for signaling the components of one or more services;

a processor configured to process the link layer packets to output the broadcast signal including Physical Layer Pipes (PLPs), wherein:

a PLP of the PLPs includes a service list table, the service list table includes a service identifier for identifying a service, capabilities information for representing required capabilities for decoding a content of the service, protocol information for representing a type of a protocol used to deliver the service signaling information, the type of protocol representing either a Real-Time Object delivery over Unidirectional Transport (ROUTE) protocol or an MPEG Media Transport (MMT) protocol (MMTP), and an IP address for an IP packet carrying the service signaling information for the service, the service signaling information for the ROUTE includes a User Service Bundle Description (USBD) for the ROUTE, description information and a Media Presentation Description (MPD), the USBD providing the service identifier and delivery method information for the service, the delivery method information representing whether the service is delivered via broadcast or broadband, the MPD including a DASH (Dynamic Adaptive Streaming over HTTP) representation for DASH formatted data, the description information including a transport session identifier for identifying a transport session and an identifier associated with the DASH representation, the service signaling information for the MMTP includes a USBD for the MMTP providing the service identifier, and an IP address for an IP packet carrying the service list table is different from the IP address for the IP packet carrying the service signaling information for the service; and a transmitter configured to transmit the broadcast signal.

4. The device of claim 3, wherein the USBD for the MMTP includes component information about a component available in the service, the component information includes type information representing a type of the component, role information representing a rope of the component and an identifier for identifying the component.

5. A method of receiving a broadcast signal, the method comprising:

receiving the broadcast signal;

processing the received broadcast signal including Physical Layer Pipes (PLPs) to output link layer packets, wherein:

a PLP of the PLPs includes a service list table, the service list table includes a service identifier for identifying a service, capabilities information for representing required capabilities for decoding a content of the service, protocol information for representing a type of protocol used to deliver service signaling information for signaling components of the service, the type of protocol representing either a Real-Time Object delivery over Unidirectional Transport (ROUTE) protocol or an MPEG Media Transport (MMT) protocol (MMTP), and an Internet Protocol (IP) address for an IP packet carrying the service signaling information for the service; and processing the link layer packets to output one or more IP packets, the one or more IP packets carrying the components of the service and the service signaling information, wherein:

the service signaling information for the ROUTE includes a User Service Bundle Description (USBD) for the ROUTE, description information and a Media Presentation Description (MPD), the USBD providing the service identifier and delivery method information for the service, the delivery method information representing whether the service is delivered via broadcast or broadband, the MPD including a DASH (Dynamic Adaptive Streaming over HTTP) representation for DASH formatted data, the description information including a transport session identifier for identifying a transport session and an identifier associated with the DASH representation, the service signaling information for the MMTP includes a USBD for the MMTP providing the service identifier, and an IP address for an IP packet carrying the service list table is different from the IP address for the IP packet carrying the service signaling information for the service.

6. The method of claim 5, wherein the USBD for the MMTP further includes component information about a component available in the service and wherein the component information includes type information representing a type of the component, role information representing a role of the component and an identifier for identifying the component.

7. A device for receiving a broadcast signal, the device comprising:

a receiver configured to receive the broadcast signal;

a processor configured to process the received broadcast signal including Physical Layer Pipes (PLPs) to output link layer packets, wherein:

a PLP of the PLPs includes a service list table, the service list table includes a service identifier for identifying a service, capabilities information for representing required capabilities for decoding a content of the service, protocol information for representing a type of protocol used to deliver service signaling information for signaling components of the service, the type of protocol representing either a Real-Time Object delivery over Unidirectional Transport (ROUTE) protocol or an MPEG Media Transport (MMT) protocol (MMTP), and an Internet Protocol (IP) address for an IP packet carrying the service signaling information for the service; and a packet processor configured to process the link layer packets to output one or more IP packets, the one or more IP packets carrying the components of the service and the service signaling information, wherein:

the service signaling information for the ROUTE includes a User Service Bundle Description (USBD) for the ROUTE, description information and a Media Presentation Description (MPD), the USBD providing the service identifier and delivery method information for the service, the delivery method information representing whether the service is delivered via broadcast or broadband, the MPD including a DASH (Dynamic Adaptive Streaming over HTTP) representation for DASH formatted data, the description information including a transport session identifier for identifying a transport session and an identifier associated with the DASH representation, the service signaling information for the MMTP includes a USBD for the MMTP providing the service identifier, and an IP address for an IP packet carrying the service list table is different from the IP address for the IP packet carrying the service signaling information for the service.

8. The device of claim 7, wherein the USBD for the MMTP further includes component information about a component available in the service and wherein the component information includes type information representing a type of the component, role information representing a role of the component and an identifier for identifying the component.

* * * * *